US007954090B1

(12) United States Patent
Qureshi et al.

(10) Patent No.: US 7,954,090 B1
(45) Date of Patent: May 31, 2011

(54) SYSTEMS AND METHODS FOR DETECTING BEHAVIORAL FEATURES OF SOFTWARE APPLICATION DEPLOYMENTS FOR AUTOMATED DEPLOYMENT MANAGEMENT

(75) Inventors: Waheed Qureshi, Pleasanton, CA (US); Kelly Brian Roach, Palo Alto, CA (US); Tanvir Hassan, Alameda, CA (US)

(73) Assignee: Zenprise, Inc., Fremont, CA (US)

( * ) Notice: Subject to any disclaimer, the term of this patent is extended or adjusted under 35 U.S.C. 154(b) by 1527 days.

(21) Appl. No.: 11/316,396

(22) Filed: Dec. 21, 2005

Related U.S. Application Data

(60) Provisional application No. 60/638,006, filed on Dec. 21, 2004.

(51) Int. Cl.
*G06F 9/44* (2006.01)
*G01R 31/28* (2006.01)

(52) U.S. Cl. .............. 717/127; 714/25; 714/47; 714/48; 714/736

(58) Field of Classification Search ........................ None
See application file for complete search history.

(56) References Cited

U.S. PATENT DOCUMENTS 4,642,782 A 2/1987 Kemper et al.
4,815,076 A 3/1989 Denney et al.
4,916,612 A * 4/1990 Chin et al. ........................ 701/3
5,063,523 A 11/1991 Vrenjak
5,107,497 A 4/1992 Lirov et al.
5,109,380 A 4/1992 Ogino
5,295,230 A 3/1994 Kung
5,309,448 A 5/1994 Bouloutas et al.
5,317,677 A 5/1994 Dolan et al.
5,335,291 A 8/1994 Kramer et al.
5,367,473 A 11/1994 Chu et al.
5,440,742 A 8/1995 Schwanke
5,528,516 A 6/1996 Yemini et al.
5,687,290 A 11/1997 Lewis
5,715,386 A 2/1998 Fulton et al.
5,732,240 A * 3/1998 Caccavale ..................... 711/118
5,778,184 A 7/1998 Brownmiller et al.
5,796,736 A 8/1998 Suzuki
5,799,297 A 8/1998 Goodridge et al.

(Continued)

FOREIGN PATENT DOCUMENTS

EP 1498813 1/2005

(Continued)

OTHER PUBLICATIONS

Automated Performance Management in a Distributed System Francis Alexander Gardner Victoria University of Wellington; Technical Report CS-TR-94-23 Feb. 1994.*

(Continued)

*Primary Examiner* — Emerson C Puente
*Assistant Examiner* — Paul Mills
(74) *Attorney, Agent, or Firm* — Knobbe, Martens, Olson & Bear LLP

(57) ABSTRACT

A system for monitoring and analyzing a deployment of a software application is disclosed. The system includes a monitoring component that collects streams of data values of time-variant state metrics associated with the deployment, and a feature detector that analyzes the streams to identify features known to be associated with potential problems. Detected features can include deviations of a signal from a normalcy band, a rising or descending trend in signal behavior, deviations from seasonal or cyclical normalcy bands, and the like.

46 Claims, 34 Drawing Sheets

U.S. PATENT DOCUMENTS

| | | | | |
|---|---|---|---|---|
| 5,845,258 | A | 12/1998 | Kennedy | |
| 5,908,383 | A | 6/1999 | Brynjestad | |
| 5,949,677 | A * | 9/1999 | Ho | 700/80 |
| 5,950,183 | A | 9/1999 | Minobe et al. | |
| 6,012,152 | A | 1/2000 | Douik et al. | |
| 6,018,300 | A * | 1/2000 | Dowden et al. | 340/635 |
| 6,088,587 | A | 7/2000 | Abbadessa | |
| 6,108,700 | A | 8/2000 | Maccabee et al. | |
| 6,119,047 | A | 9/2000 | Eryurek et al. | |
| 6,170,065 | B1 | 1/2001 | Kobata et al. | |
| 6,175,956 | B1 | 1/2001 | Hicks et al. | |
| 6,216,119 | B1 | 4/2001 | Jannarone | |
| 6,269,099 | B1 | 7/2001 | Borella et al. | |
| 6,289,330 | B1 | 9/2001 | Jannarone | |
| 6,353,902 | B1 | 3/2002 | Kulatunge et al. | |
| 6,356,885 | B2 | 3/2002 | Ross et al. | |
| 6,378,128 | B1 | 4/2002 | Edelstein et al. | |
| 6,393,386 | B1 * | 5/2002 | Zager et al. | 703/25 |
| 6,418,469 | B1 | 7/2002 | Justice, Jr. et al. | |
| 6,446,058 | B1 | 9/2002 | Brown | |
| 6,446,136 | B1 | 9/2002 | Pohlmann et al. | |
| 6,490,617 | B1 | 12/2002 | Hemphill et al. | |
| 6,490,722 | B1 | 12/2002 | Barton et al. | |
| 6,513,129 | B1 | 1/2003 | Tentij et al. | |
| 6,550,057 | B1 | 4/2003 | Bowman-Amuah | |
| 6,556,983 | B1 | 4/2003 | Altschuler et al. | |
| 6,598,033 | B2 | 7/2003 | Ross et al. | |
| 6,615,367 | B1 | 9/2003 | Unkle et al. | |
| 6,622,264 | B1 | 9/2003 | Bliley et al. | |
| 6,629,106 | B1 | 9/2003 | Narayanaswamy et al. | |
| 6,633,835 | B1 | 10/2003 | Moran et al. | |
| 6,636,771 | B1 | 10/2003 | Varma et al. | |
| 6,654,914 | B1 | 11/2003 | Kaffine et al. | |
| 6,675,128 | B1 | 1/2004 | Hellerstein | |
| 6,708,104 | B2 * | 3/2004 | Avery et al. | 701/110 |
| 6,715,097 | B1 | 3/2004 | Kidder et al. | |
| 6,735,597 | B1 | 5/2004 | Paradies | |
| 6,738,928 | B1 | 5/2004 | Brown | |
| 6,738,933 | B2 | 5/2004 | Fraenkel et al. | |
| 6,742,141 | B1 | 5/2004 | Miller | |
| 6,792,393 | B1 | 9/2004 | Farel et al. | |
| 6,801,940 | B1 | 10/2004 | Moran et al. | |
| 6,847,970 | B2 | 1/2005 | Keller et al. | |
| 6,856,905 | B2 * | 2/2005 | Pasturel et al. | 701/214 |
| 6,856,942 | B2 | 2/2005 | Garnett et al. | |
| 6,859,893 | B2 | 2/2005 | Hines | |
| 6,882,271 | B2 | 4/2005 | Hendrickson | |
| 6,892,163 | B1 * | 5/2005 | Herzog et al. | 702/181 |
| 6,931,644 | B2 | 8/2005 | Riosa et al. | |
| 6,941,557 | B1 | 9/2005 | Jakobson et al. | |
| 6,944,759 | B1 | 9/2005 | Crisan | |
| 7,024,476 | B1 | 4/2006 | Page et al. | |
| 7,027,996 | B2 | 4/2006 | Levinson | |
| 7,051,243 | B2 | 5/2006 | Helgren et al. | |
| 7,055,062 | B2 | 5/2006 | Shah et al. | |
| 7,058,617 | B1 | 6/2006 | Hartman et al. | |
| 7,076,695 | B2 * | 7/2006 | McGee et al. | 714/47 |
| 7,079,984 | B2 * | 7/2006 | Eryurek et al. | 702/185 |
| 7,079,986 | B2 * | 7/2006 | Sieracki | 702/189 |
| 7,082,381 | B1 | 7/2006 | Saghier et al. | |
| 7,096,074 | B2 * | 8/2006 | Yulevitch et al. | 700/21 |
| 7,096,459 | B2 | 8/2006 | Keller et al. | |
| 7,100,085 | B2 | 8/2006 | Miller | |
| 7,103,874 | B2 | 9/2006 | McCollum et al. | |
| 7,107,187 | B1 | 9/2006 | Saghier et al. | |
| 7,137,041 | B2 | 11/2006 | Kaminsky et al. | |
| 7,146,536 | B2 | 12/2006 | Bingham, Jr. et al. | |
| 7,165,116 | B2 | 1/2007 | Grove et al. | |
| 7,194,445 | B2 | 3/2007 | Chan et al. | |
| 7,240,325 | B2 | 7/2007 | Keller | |
| 7,260,743 | B2 | 8/2007 | Fellenstein et al. | |
| 7,280,988 | B2 * | 10/2007 | Helsper et al. | 706/26 |
| 7,325,030 | B2 | 1/2008 | Wright et al. | |
| 7,334,222 | B2 | 2/2008 | Keller | |
| 7,380,172 | B2 | 5/2008 | Srinivas et al. | |
| 7,441,154 | B2 * | 10/2008 | Klotz et al. | 714/39 |
| 7,451,403 | B1 | 11/2008 | Srinivasan et al. | |
| 7,505,872 | B2 | 3/2009 | Keller | |
| 2001/0042229 | A1 * | 11/2001 | James | 714/48 |
| 2003/0084379 | A1 | 5/2003 | Bingham, Jr. et al. | |
| 2003/0204781 | A1 * | 10/2003 | Peebles et al. | 714/25 |
| 2003/0220926 | A1 | 11/2003 | Huelsman et al. | |
| 2003/0225520 | A1 | 12/2003 | Hoglund et al. | |
| 2004/0039968 | A1 | 2/2004 | Hatonen et al. | |
| 2004/0163079 | A1 | 8/2004 | Noy et al. | |
| 2004/0249720 | A1 | 12/2004 | Wookey et al. | |
| 2004/0249914 | A1 | 12/2004 | Flocken et al. | |
| 2005/0091227 | A1 | 4/2005 | McCollum et al. | |
| 2005/0114494 | A1 | 5/2005 | Beck et al. | |
| 2005/0216793 | A1 * | 9/2005 | Entin et al. | 714/38 |
| 2006/0101402 | A1 * | 5/2006 | Miller et al. | 717/124 |

FOREIGN PATENT DOCUMENTS

| | | |
|---|---|---|
| GB | 2368681 | 8/2002 |

OTHER PUBLICATIONS

A method of signal processing in a TWS information processing system Guo-Long Wan; Chen-Yang Yang; Shao-Hong Li; Shi-Yi Mao May 1994.*

Adaptive and Automated Detection of Service Anomalies in Transaction-Oriented WANs Network Analysis, Algorithms, Implementation, and Deployment Ho, L.L.; Cavuto, D.J.; Papavassillou, S.; Zawadzki, A.G. May 2000.*

The Phi Accrual Failure Detector Hayashibara, N.; Defago, X.; Yared, R.; Katayama, T. Oct. 2004.*

Fault detection and diagnosis using statistical control charts and artificial neural networks R. P. Leger, Wm. J. Garland and W. F. S. Poehlman Artificial Intelligence in Engineering vol. 12, Issues 1-2 1998.*

Signal Anomaly Detection Using Modified Cusum Method Morgenstern, V.M.; Upadhyaya, B.R.; Benedetti, M. Dec. 1988.*

Notification of Concurrently-Filed Applications.

Notification of Related Applications.

Gonzalez et al. "Anomaly Detection Using Real-Valued Negative Selection," Apr. 9, 2003, Kluwer Academic Publishers, vol. 4, pp. 383-403.

Hangal et al., "Tracking Down Software Bugs," May 2002, ACM, ICSE 2002, pp. 291-301.

IBM Technical Disclosure, "User-Sensitive Multimedia Presentation System," Mar. 1, 1996, IBM, vol. 39, Issue 3, pp. 93-94.

Liu et al., "An Expert System for Machine Fault Diagnosis", Springer, 2003.

Block et al., Frank, "An Expert System to Teach Troubleshooting of Common Problems Associated with the Automated Anesthesia Recordkeeper", 1995.

* cited by examiner

Example Knowledge Base Article

Public folder hierarchy messages are stuck in outgoing queues in Exchange 2000 Server

Article ID: 815759
Last Review: November 10, 2004
Revisions: 1.0

SYMPTOMS

Public folder messages may become stuck in outgoing queues and the following warning or information messages may be logged in the application log: Event Type: Warning
Event Source: MSExchange Transport
Event Categorie: (3)
Event ID: 4000
Date: *Date:*
Time: *Time*
User: N/A
Computer: *Computer Name*
Description: Message delivery to the remote *DomainName* failed for the following reason: Unable to open the message for delivery.
Data: 0000: e0 02 04 c0 a..A Event Type: Information
Event Source: EXOLEDB
Event Category: General
Event ID: 122
Date: *Date:*
Time: *Time*
User: N/A
Computer: *ComputerName*
Description: Microsoft Exchange OLEDB was unable to initialize property table.

CAUSE

This issue may occur when the Everyone group is explicitly denied permissions on both of the following two objects:

- Create top level public folder (CF4B9D46-AFE6-11D2-AA04-00C04F8EEDD8)
- Create named properties in the information store (D74A8766-22B9-11D3-AA62-00C04F8EEDD8)

RESOLUTION

To resolve this issue, configure the permissions correctly. To do so, following these steps.

Warning If you use the ADSI Edit snap-in, the LDP utility, or any other LDAP version 3 client, and you incorrectly modify the attributes of Active Directory objects, you can cause serious problems. These problems may require you to reinstall Microsoft Windows 2000 Server, Microsoft Windows Server 2003, Microsoft Exchange 2000 server, Microsoft Exchange Server 2003, or both Windows and Exchange. Microsoft cannot guarantee that problems that occur if you incorrectly modify Active Directory object attributes can be solved. Modify these attributes at your own risk.

1. Start ADSI Edit, and then locate the following container in the CN=Configuration container, where *Organization* is the name of Exchange 2000 or Exchange 2003 organization, and where *administrative_group* is the name of your administrative group:

CN=Services, CN=Microsoft Exchange, CN= *Organization*, CN= Administrative Groups, CN= *Administrative_group,* CN=Folder Hierarchies, CN=Public Folders

*FIG. 22A*

2. Right-click CN=Public Folders, and then click Properties.

3. Click the Security tab.

4. Make sure that the Allow inheritable permissions from parent to propagate to this object check box is selected.

5. Make sure that the Everyone group has the following Allow permission:
   - Create named properties in the information store
   - Create top level public folder If the Allow inheritable permissions from parent to propagate to this object check box is selected, the Everyone group should already have these permissions. Make sure that the Deny check boxes are not selected.

MORE INFORMATION

To install ADSI Edit together with many other support tools, double-click Setup.exe in the Support\Tools folder on your Windows 2000 Server CD-ROM.

APPLIES TO: Microsoft Exchange 2000 Server Standard Edition.

*FIG. 22B*

*Application Model*

Active Directory

Exchange Configuration

Windows Services

IIS Services

Exchange Services

Routing

Storage Groups

Database

3rd Party Software

FIG. 40 User

SYSTEMS AND METHODS FOR DETECTING BEHAVIORAL FEATURES OF SOFTWARE APPLICATION DEPLOYMENTS FOR AUTOMATED DEPLOYMENT MANAGEMENT

CLAIM FOR PRIORITY

This application claims priority under 35 U.S.C. §119(e) to Provisional Application No. 60/638,006, filed Dec. 21, 2004, the entire disclosure of which (including appendices) is incorporated by reference herein.

BACKGROUND

1. Field

This application relates generally to software management and more specifically to systems and methods for programmatically monitoring and managing deployments of software applications.

2. Description of the Related Art

A variety of commercially available software tools exist for monitoring and providing information about software deployments. These products typically (1) allow a user to statically specify certain aspects about a specific software deployment, (2) monitor those aspects, and (3) alert the user when the monitored aspects cross specified performance thresholds. These products do not provide any automated analysis of monitored data. They are best suited for simple automated monitoring tasks and then presentation of the monitored information in reports, which requires the user to manually analyze the reports to extract relevant conclusions about the specific deployment. Examples of these types of products include NetIQ's AppManager™ and Microsoft's MOM™.

The following well-known equation describes the availability (A) of a system:

$$A = \frac{1}{1 + \frac{MTTR}{MTTF}}$$

wherein MTTF is the Mean Time to Failure and MTTR is the Mean time to Repair. Based on this equation, the availability of the system is increased by a decreasing MTTR and an increasing MTTF. Currently available tools provide monitoring capabilities that alert IT staff when problems occur. A single problem can result in multiple problematic events. As a result, IT staff have to manually triage the problems to pinpoint the root-cause problem that caused the set of problems. This manual triage increases MTTR. It also reduces the operational efficiency of the IT staff, because they have to spend a significant portion of their time troubleshooting the problems. Also, currently available tools are extremely limited in their ability to continuously optimize a system or alert the IT staff to possible impending failures (for example due to the possible exhaustion of resources), thereby resulting in a limited MTTF. Therefore, currently available tools have a significant MTTR and limited MTTF, resulting in a relatively low availability A.

SUMMARY

The present invention provides systems and methods for programmatically managing deployments of software applications, including those in distributed environments. In particular, the present application discloses and describes various embodiments and inventive features of a "meta-application" that monitors and manages a deployment of another software application.

In a preferred embodiment, the meta-application creates and dynamically updates an application model that includes data about the specific configuration of the deployed software application, the relationships between the various objects thereof, diagnostic troubleshooting procedures for the represented objects, and other useful information. The application model can preferably be queried by the other components of the meta-application, to assist such other components in performing their respective functions.

The meta-application preferably includes a knowledge base comprising encoded knowledge about the managed application, the knowledge being stored in a format that the meta-application can use to detect the existence of "problems" with the managed deployment. The encoded knowledge preferably maps known problems to logical combinations of "features" (as used herein, "features" may be anomalous or benign conditions) or other conditions associated with the managed deployment. The specific deployment conditions that map to a known problem can be weighted relative to each other, to reflect their relative importance. The knowledge base also preferably includes, for each problem, one or more high-level remedies for curing the problem. The encoded knowledge may include a variety of different types of knowledge, including, without limitation, knowledge base articles, diagnostic methods, best practices, and the like. Methods are also disclosed for automated encoding of mass amounts of knowledge into a machine-readable format that can be used by the meta-application.

The meta-application gathers information, or "telemetry," from the managed application, and uses the telemetry to create mathematical models that describe normal behavior of the managed deployment. The models are used to detect anomalous behavior (which may a type of feature) of the managed deployment, and also to predict possible future problems. The meta-application includes a number of problem detection algorithms, one of which ("Problem Logic") efficiently maps logical combinations of conditions (e.g., features and deployment state information) to known problems, the conditions comprising declarative knowledge stored in the knowledge base. The meta-application can preferably report problems that are either fully or partially "matched," along with a confidence level associated with each matched problem. The problem-detection algorithms can advantageously leverage the deployment information compiled in the application model.

When the meta-application determines the existence of problems, it preferably ranks the problems by severity and determines an overall resolution strategy comprising high-level remedies. The meta-application can report the problems and create low-level, deployment-specific plans (again, preferably by leveraging the deployment information in the application model) that can be manually executed by a human administrator or automatically executed by the meta-application. As remedies and plans are executed, the meta-application preferably notes their success or failure and, optionally, uses such information to adaptively refine the encoded knowledge.

If detected problems do not have associated remedies, or if the remedies fail to cure the problems, the meta-application can preferably conduct root cause analysis to determine an underlying source of the problems or to simply gain further insight. In a preferred approach, root cause analysis involves correlating the problems to objects of the application model, using pattern recognition techniques to identify objects as root cause candidates, and conducting diagnostic tests associated with the root cause candidate objects.

For purposes of summarizing the disclosure and the advantages achieved over the prior art, certain objects and advantages of the meta-application have been described above and are further described below. Of course, it is to be understood that not necessarily all such objects or advantages may be achieved in accordance with any particular embodiment of the meta-application. Thus, for example, those skilled in the art will recognize that the meta-application may be embodied or carried out in a manner that achieves or optimizes one advantage or group of advantages as taught herein without necessarily achieving other objects or advantages as may be taught or suggested herein. Further, it will be recognized that the disclosed meta-application embodies a number of distinct inventions, many of which may be implemented and practiced without others.

Accordingly, neither this summary nor the following detailed description purports to define the invention. The invention is defined only by the claims.

BRIEF DESCRIPTION OF THE DRAWINGS

FIGS. 22A-B show a knowledge base article for Microsoft Exchange™.

DETAILED DESCRIPTION OF THE PREFERRED EMBODIMENTS

Overview

The present invention includes systems and methods for programmatically managing deployments of software applications, including those in distributed environments. In preferred embodiments, the systems and methods of the present invention are embodied in a "meta-application," i.e., an application that at least partially automates the management of one or more other applications. In various embodiments, these systems and methods provide meaningful predictive analysis of deployed software applications, enforce best practices on each deployment, detect the existence of "features" and problem states of the deployment, execute remedial actions associated with the problem states, and/or perform root cause analysis. Preferred embodiments of the meta-application provide numerous advantages, including, without limitation, increased deployment uptime, decreased software management costs, reduced need for (potentially erroneous) human intervention, and automatic and continuous leverage of the latest public knowledge about the deployed application.

Systems and methods of the present invention are preferably designed to assist system administrators by at least partially automating the entire lifecycle of a managed application, including configuration, provisioning, maintenance, patching, problem diagnosis, healing, and day-to-day operations. By analyzing system behavior and selecting remedial and "best practice" actions to perform, the meta-application improves and seeks to optimize application stability and performance while also optimizing system resources. Preferably, the meta-application is in charge of many of the system administrator activities associated with the managed application(s), including monitoring, updating, configuring, problem pinpointing, repairing, ongoing optimization, and protecting. In particular, the meta-application is preferably configured to quickly pinpoint the cause of a problem and then either automatically repair it or direct manual repair via a human being. Either way, MTTR is significantly reduced. In this context, the MTTR equals MTTI (mean time to identify root cause of a problem) plus MTTH (mean time to heal the identified problem). The meta-application advantageously significantly reduces MTTI (which is usually the larger component of MTTR) and, in many cases, MTTH. Moreover, the meta-application helps to eliminate human errors that often occur during deployment healing.

The various functions and methods described herein are preferably embodied within software modules executed by one or more general-purpose computers. These software modules, and the associated databases, may be stored on any appropriate type or types of computer storage device or computer-readable medium. In certain cases, some of the various functions and methods described herein can be embodied within hardware, firmware, or a combination or sub-combination of software, hardware, and firmware.

Figure 1:
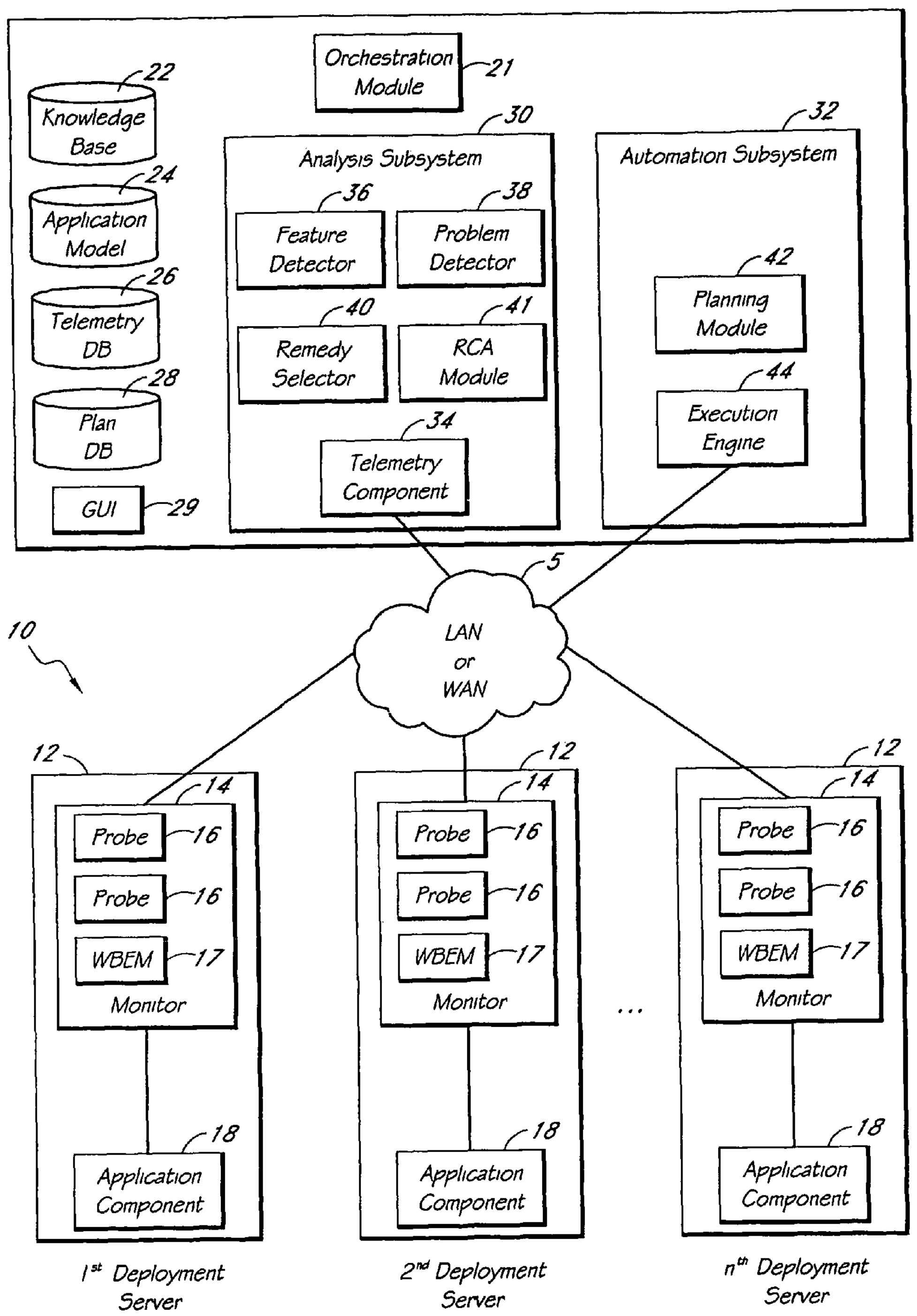
FIG. 1 is a schematic illustration of a meta-application that manages a deployed software application, in accordance with one embodiment of the invention.

FIG. 1 illustrates a preferred embodiment of the invention, comprising a meta-application 20 that monitors and manages a deployment 10 (also referred to herein as a "managed application") of a software application hosted on one or more servers 12 over a computer network 5, such as a local or wide area network. Each server 12 may include at least one monitor 14 with one or more probes 16, and at least one component 18 of the managed application. It is also possible for monitors 14 to reside on the same server(s) as the meta-application 20, to facilitate "touchless" monitoring (see FIG. 7). The monitors 14 and probes 16 assist the meta-application 20 in obtaining information from, executing actions upon, and executing application analysis in a distributed fashion on, the servers 12. Preferably, the monitors 14 and probes 16 interact with the application components 18 by standardized communication protocols, such as WBEM (Web Based Enterprise Management) elements 17. Also, monitors 14 and probes 16 can be deployed within servers that do not include application components 18. For example, in embodiments in which the meta-application 20 manages a deployment of Microsoft Exchange™, monitors 14 may be deployed within Active Directory and DNS servers. Further details of the configuration and operation of the monitors 14 and probes 16 are described below.

The meta-application 20 can be configured to monitor and manage a wide variety of different types of deployments 10. Examples of software applications and hardware environments that the meta-application 20 can monitor and manage include, without limitation, servers and storage subsystems, databases such as Oracle Database 10g™ and MSSQL™, email and/or messaging applications such as Microsoft Exchange™, application servers such as Weblogic™ and Websphere™, and web servers such as Microsoft IIS™ and Apache™. The meta-application 20 is preferably configured to monitor and beneficially manage any application (hardware, software, firmware, or a combination thereof) governed by the equation set forth in the Background of the Invention section of this application.

The managed application 10 is preferably a software application or system that has interfaces or tools for gathering state metrics and for controlling system state. The managed application 10 may include a number of sub-applications and services. In some cases, the deployment 10 can be distributed across servers 12 that are located remotely from one another. It will be appreciated that the meta-application 20 can be located remotely from the deployment 10. It will also be appreciated that the meta-application 20 can be configured to monitor and manage more than one deployment 10. In one embodiment, the meta-application 20 is configured to manage only one type of software application or system (e.g., only versions of Microsoft Exchange™). In an alternative embodiment, the meta-application 20 can manage different types of software applications. The illustrated meta-application 20 comprises an orchestration module 21, a knowledge base 22, application model 24, telemetry database 26, plan database 28, user interface 29 (illustrated as a graphical user interface or "GUI"), analysis subsystem 30, and automation subsystem 32, each of which is described below. The meta-application 20 can reside on one or more servers.

The orchestration module 21 preferably runs a master algorithm over all other algorithms of the meta-application 20. All other algorithms are preferably called as subroutines or run in independent threads managed by the orchestration algorithm. The orchestration module 21 is preferably responsible for starting and stopping major activity threads of the meta-application 20, such as Problem Logic (described below), when the meta-application as a whole starts and stops, and in between.

In a preferred embodiment, the orchestration module 21 establishes the relative priorities of all the major components of the meta-application 20 and evaluates the performance of the system as a whole via an evaluation algorithm. The evaluation algorithm applies group rewards and punishment to continuing tunable system parameter adjustments so as to optimize system performance.

The orchestration module 21 preferably performs scheduling and initiates occasional maintenance, security, backup, and software rejuvenation activities of the meta-application 20 and the managed application deployment 10. The orchestration module 21 preferably also communicates and cooperates with orchestration modules 21 of other cohort meta-applications 20, if any, in a distributed network of meta-applications managing multiple application deployments 10.

The knowledge base 22 preferably comprises a repository of encoded knowledge about the deployed software application 10. Encoded knowledge can comprise, without limitation, known problem states or "problems" associated with the deployed application 10. As used herein, a "problem" is a known problematic condition or behavior of an application or application deployment (portions of Provisional Application No. 60/638,006, to which the present application claims priority, refer to "problems" as "symptoms"). The knowledge is preferably encoded in a form that facilitates automated or computer-implemented analysis of the deployment 10. The task of encoding knowledge can be performed by human operators (referred to as Knowledge Engineers or "encoders"), but it may also be partially or fully automated within software. Knowledge can be encoded from knowledge base articles of the type commonly used by IT personnel to manually resolve problems. For example, a particular knowledge base article may describe a problem that occurs when a particular logical combination of conditions or states exist within a deployed software application, and may specify one or more possible remedial actions for addressing this problem. The remedial actions may similarly be encoded in a format that enables the meta-application 20 to parameterize or configure a remedy for use within the particular deployment 10 of the managed application, and to otherwise control the execution of remedies. One example of a source of knowledge that can be encoded and stored in the knowledge base 22 is a Microsoft™ Knowledge Base Article (see FIGS. 22A-B for an example of a MSKB article). Knowledge can also be encoded from other sources, such as documented errors associated with the managed application 10, best practices that specify recommended configurations of the managed application 10, existing or customized diagnostic tools, and feedback data collected over time from deployment sites (i.e., knowledge learned from the deployments 10 themselves). The knowledge base 22 is preferably configured to receive periodic updates as new knowledge becomes available (see FIG. 2). Knowledge can be encoded in any suitable format. In a preferred embodiment, knowledge is encoded in XML. Knowledge that can be used by the meta-application 20 may also comprise algorithms that dynamically detect problems at runtime. Such algorithms can also be stored in the knowledge base 22.

In a preferred format, the knowledge is encoded as a plurality of logic rules that describe problems with the deployment 10 and/or deviations from best practices. Logic rules are described further below. In a preferred embodiment, logic rules are statements that include logical formulae and subformulae whose arguments comprise data describing the deployment configuration and behavior. In the preferred embodiment, a logic rule can be thought of as a logical combination of conditions; if each condition is met, the rule itself is true. A logic rule can specify the existence of a specific deployment configuration or behavior of the deployment 10. Thus, logic rules may contain queries for information from the deployment 10 or application model 24 (described below). A logic rule can also specify the existence of "features," which are described below. The meta-application 20 interprets the truth of a logic rule as an indication of a problem or problematic symptom associated with the deployment 10. Note that "truth" can be considered in relative degrees (i.e., logic rules can be less than 100% true), and the meta-application 20 can be configured to deal with relative degrees of truth. Therefore, while the present disclosure refers in most instances to the "truth" or falsity of rules, it should be understood that, in many cases, it may be appropriate to consider the "relative truth" of such rules. Thus, the meta-application 20 automatically detects problems with the deployment 10 by analyzing the logic rules stored in the local knowledge base 22. As described below, when the meta-application 20 confirms the truth of a logic rule, it can execute one or more remedial actions associated with the logic rule to attempt to cure the detected problem.

Figure 2:
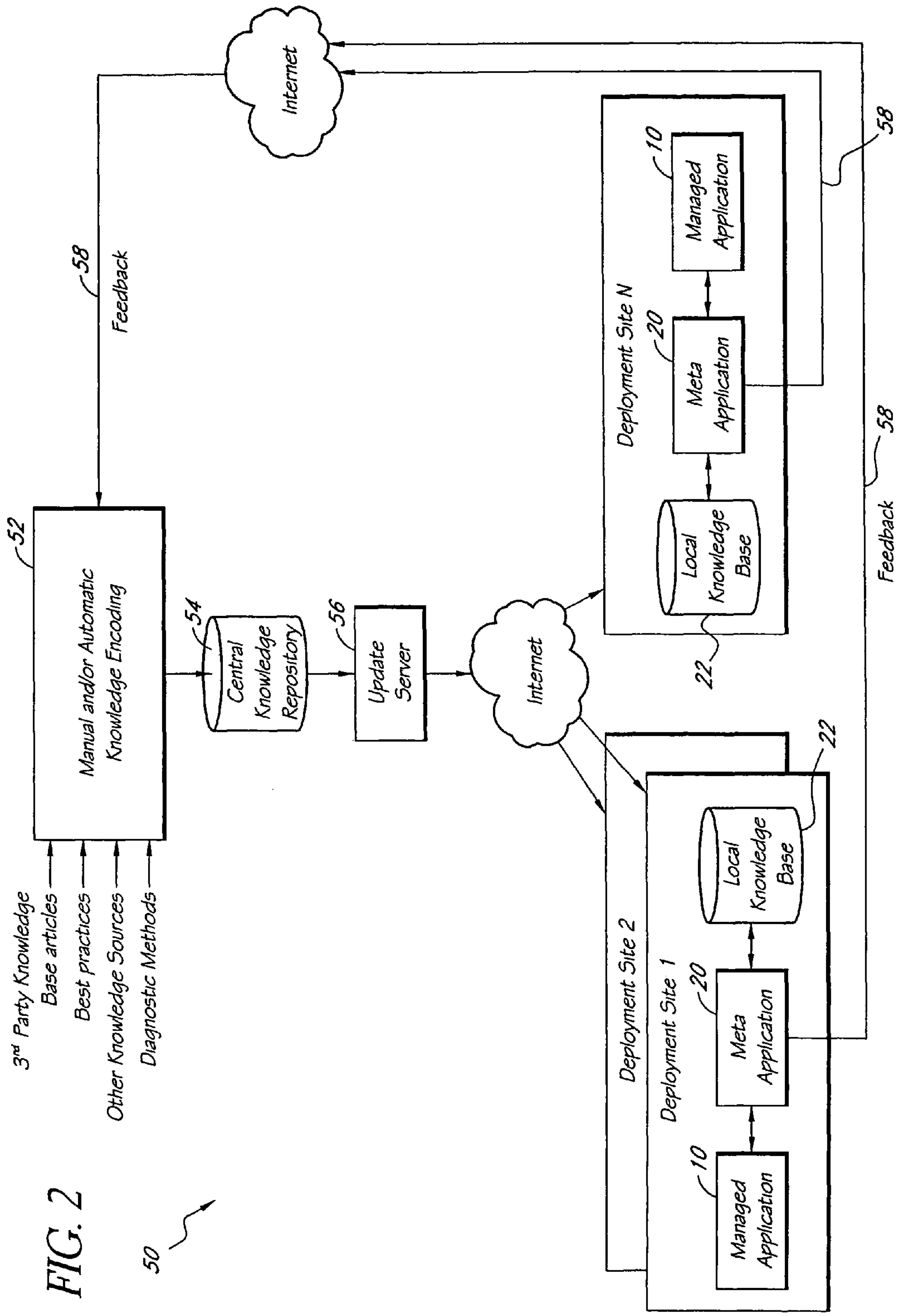
FIG. 2 is a schematic illustration of an embodiment of a system and method of allowing a plurality of deployment sites to leverage encoded knowledge, each deployment site having a meta-application and a managed application.

FIG. 2 illustrates a preferred system 50 and method of managing and updating the content of local knowledge bases 22 of a plurality of different meta-applications 20 that monitor and manage a plurality of applications 10 in different deployment sites. In the illustrated embodiment, each deployment site includes a managed application 10, a meta-application 20, and a local knowledge base 22. In one embodiment, the various managed applications 10 are the same (e.g., all the applications 10 are versions of Microsoft Exchange™). In another embodiment, the various managed applications 10 can be completely different. Each managed application 10 may comprise a single software application or a set of software applications.

The method preferably involves the encoding 52 of knowledge about the managed applications 10. As explained above, the knowledge to be encoded can comprise known problems, remedies, best practices, and other knowledge about the managed applications 10. The encoding can be done manually, automatically, or a combination of both. Further details about preferred encoding methods are described below. The encoded knowledge is stored in a central knowledge repository 54. Skilled artisans will appreciate that the central knowledge repository 54 can contain knowledge about all of the different types of applications 10 that are managed by the group of meta-applications 20. Alternatively, there can be a different central knowledge repository 54 for each different type of managed application 10. In either case, any number of central knowledge repositories 54 can be provided.

Preferably, one or more update servers 56 disseminate knowledge updates or patches to various deployment sites of the managed application 10, via the Internet or another suitable communications network. The disseminated updates or patches may comprise, for example, updated knowledge or changes to the local knowledge bases 22, new or updated monitors 14, revised algorithms, and the like. For example, when a new knowledge base article is published and encoded by a human encoder, an update may be sent to all of the deployment sites to add a newly created logic rule and associated remedies to each of the local knowledge bases 22. The update servers 56 can be programmed to send new patches of encoded knowledge to the local knowledge bases 22 according to various different criteria. For example, the update servers 56 can send knowledge updates according to set periods (e.g., once a day, week, month, etc.) or based upon the amount of new and unsent knowledge stored in the central knowledge repository 54. The update servers 56 can also send knowledge updates based upon the importance of the unsent knowledge. For example, logic rules can be rated according to relative importance, so that the most important knowledge rules get sent first. In any case, it will be understood that it is ordinarily preferable to send newly encoded knowledge to the local knowledge bases 22 as soon as possible. In some embodiments, the update server 56 can instruct the meta-applications 20 to remove unneeded knowledge (e.g., older, no longer relevant logic rules) from the knowledge bases 22, by sending software updates containing removal algorithms.

Although each deployment site shown in FIG. 2 has a locally installed meta-application 20, it will be recognized (particularly in view of FIG. 1) that the meta-application 20 need not run locally with respect to the managed application 10. In addition, there need not be a one-to-one correspondence between meta-applications 20 and managed applications 10. Thus, for example, a single instance of the meta-application 20 could be operated as a hosted application that monitors multiple deployment sites from a remote location.

With reference again to FIG. 1, the application model 24 is preferably a distilled representation of the deployment 10, augmented with additional information. When the meta-application 20 is first installed or configured for management of the deployment 10, the meta-application conducts a "discovery" process to populate the application model 24 with useful information about the deployment 10. The meta-application 20 preferably runs its discovery process periodically or continuously to dynamically keep the application model 24 up to date. In a preferred embodiment, the application model 24 represents all of the objects of the deployment 10 (like software objects, servers, routers, storage subsystems, etc.) and all of the physical and logical dependencies of these objects. For example, in an embodiment in which the meta-application 20 is configured to manage deployments of Microsoft Exchange™, the application model 24 might store the fact that an Exchange™ server S1 has a Storage Group X, which contains a Database Y, which resides on SAN "foo" on Logical Disk D.

The application model 24 also preferably contains metadata for each object, such as data related to the "golden" or most preferred configuration for that object, as well as the object's current configuration. The application model 24 also preferably contains information about what telemetry "metrics" are relevant to an object, as well as parameterized troubleshooting procedures ("unit tests"), or references to such procedures (which can reside elsewhere), that can be used to measure the health of an object. The application model 24 can further include information about the relationships between various objects, as well as the normal flow of data and control signals therebetween. Thus, the application model 24 is a "cached" view of the topology of the deployment 10. Without the application model 24, the meta-application 20 would have to always obtain state/configuration information from the deployment 10, which can overburden the network and the resources of the deployment environment. In a preferred embodiment, the application model 24 is kept in a database and only updated when the deployment state or configuration changes. Note that the application model 24 can advantageously be used by algorithms contained within the problem detector 38 to detect rules-based problems and problems found by conducting encoded diagnostic methodologies, as well as by the root cause analysis module 41 to detect root-causes of problematic conditions. In preferred embodiments, most or all of the components of the meta-application 20 use the application model 24 to perform their associated functions.

As explained below, the application model 24 can be used by the analysis subsystem 30 and the automation subsystem 32 to dynamically obtain knowledge about the deployment 10, analyze the deployment 10 for the existence of problems, create deployment-specific plans for remedial actions against the deployment, and perform root cause analysis. The application model 24 gives the meta-application 20 the context often required for correct analysis. For example, if the meta-application 20 wants to restart an important application service that has failed, the application model 24 can be used to locate the server of that service and to determine all the dependencies of that service, including whether other important services are resident on that particular server. If there are no other important services on the server, then the meta-application 20 can send a restart message to the service. If the restart message does not work, the meta-application 20 can restart the entire server. However, if there are other important services on that server, it may not be desirable to restart the server and disrupt those services. Without this context provided by the application model 24, the meta-application 20 might mistakenly restart the server and cause additional unwanted problems.

In a preferred embodiment, the analysis subsystem 30 is configured to request and receive data from the deployment 10, analyze the received data, detect "features" (described below) in the data, detect problems with the deployment, select high-level remedies to execute against the deployment, and/or perform root cause analysis (RCA). The illustrated analysis subsystem 30 comprises a telemetry component 34, feature detector 36, problem detector 38, remedy selector 40, and root cause analysis (RCA) module 41.

The analysis subsystem 30 preferably includes a telemetry component 34 that monitors and collects data values of various state metrics associated with the managed deployment 10. The term "state metric," as used herein, refers to a characteristic, condition, or state than can be measured or tested to generate a data value. State metrics can be time-variant metrics, such as CPU utilization, available disk space, and service availability. A state metric data value refers to a data value of a particular state metric; for example, CPU utilization=90%, or service available="unavailable." The collected data is referred to herein as "telemetry" or "telemetry data." The term "telemetry," as used herein, is not intended to imply that data is necessarily collected from a remote source. Rather, the source or sources of the telemetry data may be local to the machine or machines on which the meta-application 20 runs. A "telemetry stream" is a data signal for one state metric.

The telemetry component 34 preferably operates with the assistance of the monitors 14 and probes 16, which reside on the servers 12 of the managed application deployment 10, on the same server(s) as the meta-application 20, or on other components. The monitors 14 and probes 16 provide the infrastructure for the telemetry component 34 to request and gather application state metrics (i.e., telemetry) from the deployment 10. As explained below, the monitors 14 and probes 16 also provide the infrastructure for the automation subsystem 32 to execute remedial actions against the deployment 10. The monitors 14 may also be used to distribute execution of analysis tasks that are then communicated back to the analysis subsystem 30. In a preferred embodiment, the monitors 14 and probes 16 comprise software components. However, hardware components or a combination of hardware and software can be provided for cooperating with the telemetry component 34 and automation subsystem 32 for the purposes described herein.

The meta-application 20 preferably stores collected telemetry data in the telemetry database 26. The analysis subsystem 30 uses the stored telemetry data to analyze past (often recent) behavior of the deployment 10. In a preferred embodiment, the telemetry database 26 manages its own storage and automatically removes aged data. However, the management of the data within the telemetry database 26 could alternatively be done by other components, such as the telemetry component 34. In a preferred embodiment, since many telemetry analyses operate only on recent telemetry data, the telemetry database 34 includes a caching mechanism to more quickly respond to those data queries. The meta-application 20 preferably also stores features in the telemetry database 26. Like the telemetry data itself, the features are also preferably automatically removed as they age, albeit preferably at a slower rate than the raw telemetry data. The telemetry database 26 can form a subcomponent of the telemetry component 34.

After the above-described discovery process and the population of the application model 24, the meta-application 20 runs "best practice plans" that are customized for this deployment 10. Executing these plans serves to verify that there are no known configuration problems, and that the deployment 10 is in a consistent state and is in conformity with best practices (e.g., the deployment 10 has downloaded and is running the latest patches from the maker of the managed application).

The feature detector 36 continuously analyzes collected telemetry data to detect "features." As used herein, a feature is a condition or behavior of the managed application 10 that is known to be associated with a potential problem therewith. A feature can be benign, i.e., not in itself being unusual or anomalous. However, a feature often represents an unusual (but not necessarily problematic) condition or behavior of the deployment 10. A feature might indicate the existence of one or more problems, depending on whether other defined features exist. Examples of features are unusual spikes in CPU utilization, error log entries, loss of network connectivity, failure of a component or subcomponent, storage exhaustion, unusual delays in network transactions, abnormal performance of synthetic transactions, abnormal resource consumption, etc. The existence of a feature preferably causes the problem detector 38 to employ algorithms to (1) review the encoded knowledge for problems that are known to possibly cause the detected feature, and (2) possibly initiate more detailed telemetry gathering and direct more extensive troubleshooting of a known problematic component of the deployment 10. One way that the meta-application 20 detects features is to create "baselines" of various state metrics associated with the managed application 10. A baseline is a mathematical model that describes the behavior of a state metric during "normal" operation of the managed application 10, wherein the meta-application 20 determines what is "normal" based on observation of the managed application for a suitable time period. The construction of baselines (also referred to herein as "baselining") can be ongoing and dynamic, to continually reflect the current operation of the managed application 10. For example, a baseline can be a graph of the normal upper and lower bounds of a state metric as a function of time. If the monitored state metric deviates to a prescribed extent from its baseline, the feature detector 36 registers a new feature in the telemetry database 26. Baselining methods are described in further detail below. The meta-application 20 preferably uses baselines in subsequent calculations for optimization, recovery, and root cause analysis. The feature detector 36 preferably detects features by analyzing telemetry data stored in the telemetry database 26 or telemetry data received directly from the telemetry component 34.

The problem detector 38 preferably contains algorithms that request and process telemetry and features and identify deployment problems. These algorithms preferably identify proper deployment 10 configuration, procedures to heal the deployment 10 when it has problems, procedures to optimize the deployment when sub-optimal conditions are recognized, and procedures to protect the deployment when it is compromised. These algorithms may also orchestrate other peer algorithms in the problem detector 38. One algorithm, "Problem Logic," preferably analyzes the logic rules stored in the knowledge base 22 to detect whether any rules are currently "matched" or "true" (i.e., currently exist within the deployment 10). As explained above, a logic rule can specify the existence of specific deployment configuration parameters and state metric values. Preferably, logic rules can also specify the existence of one or more features. Thus, logic rules map logical combinations of deployment configuration parameters, state metric values, and/or features to known problems associated with the managed application 10. In one embodiment, the problem detector 38 only analyzes logic rules that specify features discovered by the feature detector 36. In other embodiments, the problem detector 38 systematically analyzes some or all of the logic rules in accordance with schedules that are either preprogrammed or set by a system administrator of the managed application 10. The problem detector 38 can also be configured to automatically select logic rules to evaluate based on currently identified features and/or problems, thereby troubleshooting the rules in an optimal way. Also, the feature detector 36 can itself be configured to independently detect problems by dynamically analyzing the deployment 10 based on data gleaned from the application model 24. In this case, the feature detector 36 can employ algorithms that analyze the deployment 10 without resort to the encoded logic rules. In some embodiments, the problem detector 38 is configured to use the RCA module 41 to orchestrate the processing of logic rules, dynamically determining the best set of rules to analyze based on relevance, cost, and benefit.

In addition to storing logic rules for mapping deployment states to problems, the knowledge base 22 preferably stores information about remedial actions, or "remedies," that may be performed to eliminate specific problems. Each remedy is stored in the local knowledge base 22 in association with a particular problem. In some cases, a detected problem has more than one remedy, and the remedy selector 40 determines the preferred order in which to execute the remedies (i.e., if the first remedy fails to correct the problem, then the second is executed; if the second remedy fails, then the third is executed; etc.).

Another form of knowledge that the meta-application 20 can use is a "plan," which is an encoded administrative procedure. Each remedy can have one or more plans that contain instructions on how to fix each type of problem. In this context, a remedy can be thought of as a set of plans and a policy for executing the plans. A plan is a specific order of steps to address a problem in a specific fashion. The plans encode the various actions that the meta-application 20 or the administrator may want to take against the deployment 10, including management actions like "delete a user from the system," troubleshooting actions like "restart a non-responding software component," and remedy actions associated with knowledge base articles. The plans are preferably stored in an abstract format that encodes all of the specific actions required and the decision factors that allow the meta-application 20 to customize a plan to a specific deployment 10. In the illustrated embodiment, the plans are stored in the plan database 28.

In one embodiment, as problems are detected, they are reported by the meta-application 20 to associated IT personnel, together with associated remedial actions and their plans that may be executed to address the detected problem. Alternatively, the meta-application 20 may be designed or configured to automatically execute remedial actions associated with detected problems. When a given remedial action is executed, the meta-application 20 preferably evaluates whether the associated problem still persists, and logs the result.

In the illustrated embodiment, the automation subsystem 32 includes a planning module 42 and an execution engine 44. The planning module 42 preferably accepts high-level remedies and converts associated abstract or generalized plans into deployment-specific low-level actions. The execution engine 44 preferably executes those actions in a consistent and reversible manner against the deployment 10, and it preferably allows such execution of such actions to be paused and resumed in a consistent manner. The automation subsystem 32 can preferably also accept high-level management tasks directly from a human administrator of the deployment 10, convert them into deployment-specific actions, and execute them. In this manner the automation subsystem 32 leverages encoded application knowledge (for example, a plan that encapsulates all the steps required to restore a Microsoft Exchange™ server to a new machine). Remedies and plans are described in further detail below.

In a preferred embodiment, the meta-application 20 is also adapted to predict future values of certain data streams associated with the deployment 10. For example, the meta-application 20 can be adapted to predict the exhaustion of fixed resources (e.g., disk space), optimize resource utilization (together with provisioning), and/or optimize performance.

As described below, the meta-application 20 may also implement a root cause analysis (RCA) process for resolving less common, or coexisting problems. Accordingly, the analysis subsystem 30 can include a root cause analysis module 41 that implements the RCA process. The RCA process may be used where, for example, no logic rules exist for mapping a particular problem or set of problems to a corresponding cause or remedy. RCA may also be used in a fault-storm, which is a case where many problems are detected within a short period of time. In this case, the RCA module 41 would determine the most important faults to address first.

Those skilled in the art will also recognize that the functionality of the meta-application 20 can be integrated with or "built into" the associated managed application 10. Thus, the meta-application 20 and the managed application 10 need not be provided as separate components.

Referring again to FIG. 2, each meta-application 20 can be configured to provide feedback 58 that can be used in the knowledge encoding process 52. The feedback 58 provided by a particular deployment site may include, for example, some or all of the following information for each problem detection event: the problem detected, the associated logic rule that triggered, the underlying features and/or telemetry data that caused the rule to trigger, the associated configuration state of the managed application 10 at the time the rule triggered, the remedy or remedies executed in response to the problem detection event, and the outcome of each remedy execution event. This information may be used over time by human personnel and/or automated rules generation and analysis software to adaptively refine the logic rules and remedies stored in the local knowledge bases 22.

Figure 3:
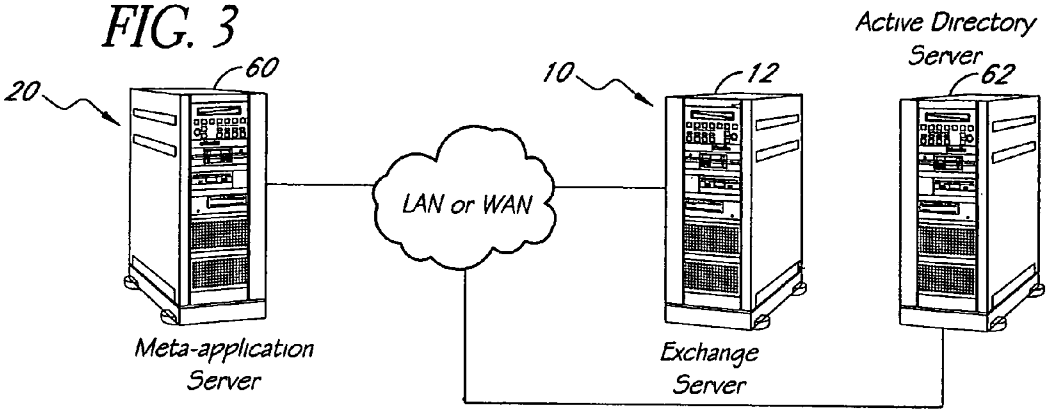
FIG. 3 is a schematic illustration of an embodiment in which a meta-application manages a deployment of Microsoft Exchange™.

In an exemplary embodiment, illustrated in FIG. 3, the meta-application 20 is adapted to manage a deployment 10 of Microsoft Exchange™. The deployment 10 is provided on one or more servers 12, as explained above. The meta-application 20 preferably runs on a dedicated server 60, and monitors and manages the Exchange Servers 12 and Active Directory servers 62 over a local area network (LAN) or wide area network (WAN). The meta-application 20 can also monitor other related components, like a DNS server, SMTP, etc. Skilled artisans will appreciate that the number of servers 12 can be relatively large (e.g., ten to twenty servers 12). While a meta-application 20 can be employed to manage a wide variety of different types of applications 10, specific examples of a meta-application are described herein in the context of managing Microsoft Exchange™. However, it should be understood that the concepts described herein are not limited to any specific type of application 10.

Consider again the above-mentioned equation describing a system's availability:

$$A = \frac{1}{1 + \frac{MTTR}{MTTF}}$$

It will be appreciated that the meta-application 20 advantageously increases the availability A of the deployment 10. The meta-application 20 seeks to reduce MTTR by providing quick insights to the system administrator on the root causes of problems and providing plans to quickly repair the deployment 10. In addition, by continually optimizing the running deployment 10, enforcing best practices, and analyzing the available resources, the meta-application 20 reduces unexpected failures, thereby increasing MTTF. A reduction in MTTR coupled with an increase in MTTF increases the overall availability A of the deployment 10.

Application Model

Application Model Information

The application model 24 (FIG. 1) includes detailed knowledge about the application 10 that is managed by the meta-application 20. The application model 24 comprises metadata describing the static and dynamic aspects of the environment being managed. In a preferred embodiment, the application model 24 comprises the information listed below. Skilled artisans will appreciate that the application model 24 can consist of more or less than what is listed below.

1) A list of all objects (physical and logical) that define the domain of the managed application 10, the objects' key attributes (e.g., what is the critical state of the object), and the objects' behavior (e.g., actionable things that the object can do). This includes the application 10, various other subcomponents, infrastructure objects (including networking, storage, and security objects), and the current and historical configuration information of each of these objects.

2) A set of inter- and intra-object dependencies, including the order in which objects (e.g., services) are launched, the order in which various dynamic runtime libraries (or DLL's) are loaded by each of the objects, etc. Also preferably included is the set of valid commands that can be sent to these objects. Any command that is not valid is preferably prevented from being executed.

3) The relationships between the objects and metadata about those relationships, including telemetry "metrics" that can be used to determine the health of the relationship. The meta-application 20 is preferably initially provided with a predefined "abstract" application model that includes all possible allowed configurations and topologies. Once discovery is completed, the meta-application 20 uses this information to validate and instantiate the actual topology and configuration of the deployment 10. Each relationship can have three types of metadata: arity, directionality, and type. The arity describes the number of objects of a specific type at each end of the relationship. Possible arities are 1-to-1, 1-to-n, n-to-1, and n-to-n. The directionality determines which object type is the "from" side of the relation and which object type is the "to" side of the relation. The "type" of the relationship determines the semantic meaning of the relationship. There are at least five types of relationships: dependency, delegation, containment, policy propagation, and event. For example, in a well designed Exchange™ server there is a one-to-n dependency relationship to an Active Directory from an Exchange™ server. With this a priori defined rule, the discovery module is aware that there will be at least one active directory and one or more Exchange™ servers. If this rule is violated, the event is logged for future analysis and reporting as a violation of best practices to the administrator.

4) Constraints on the values for properties of each type of object. These constraints represent "sanity checks" on the values detected during discovery. For example, a server IP address must be four positive integers between 0 and 255 separated by periods.

5) Flow of data and control signals between objects in the application model 24. Data flow is the path taken by the data payload between objects. For example, if the managed application is Exchange™, these two objects might be an Outlook™ client and the Exchange™ server. Control flow describes the "signaling" that controls the flow of data. For example, a request to DNS (Domain Name Service) for name resolution is a control flow.

6) For preferably each object, all telemetry metrics that can be used by various algorithms, including RCA algorithms, to map problems to the object, even when there is a feature detected but no rule is associated with the feature.

7) Troubleshooting procedures associated with an object, which can be used by various algorithms, including RCA algorithms, to determine the current health of a object.

The information defined above can be captured in the application model 24, which can be represented as an object graph. Define G and G* as follows: G is the abstract graph that describes the complete environment to be managed by the meta-application 20 (it is preferably provided with the uninstalled version of the meta-application), while G* is computed through discovery and populated with actual information. All key components of the meta-application 20 (e.g., monitoring, analysis, automation) can preferably use the application model 24.

Figure 28:
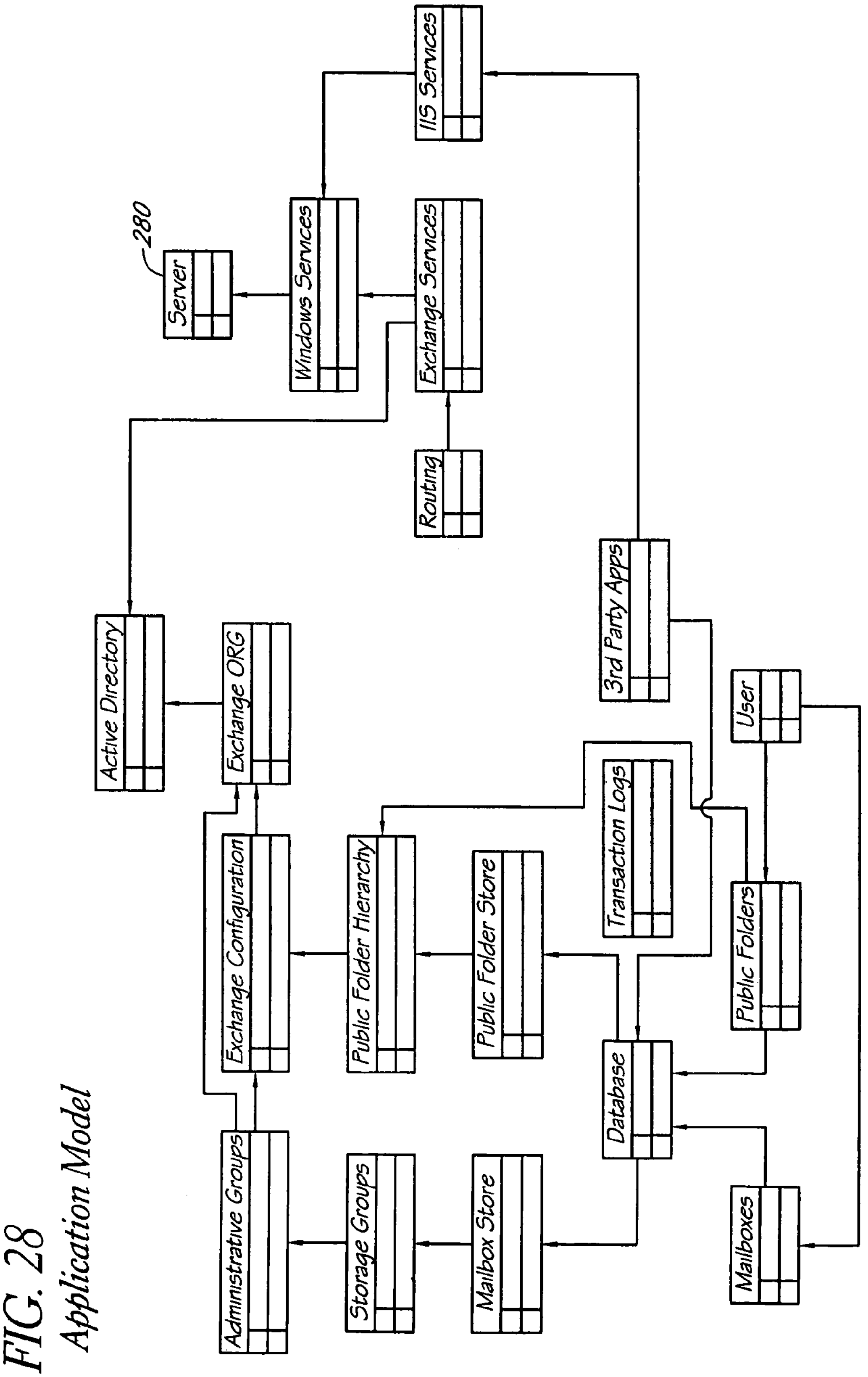
FIG. 28 shows an exemplary application model schema for one embodiment of a meta-application, which manages a deployment of Microsoft Exchange™.

FIG. 28 shows an exemplary application model schema, or object graph, for a meta-application 20 that manages a deployment 10 of Microsoft Exchange™. FIG. 28 shows, at a high level, the topology of the deployment 10. The various boxes represent objects of the deployment 10, and the arrows represent links therebetween. The links between the boxes can also be considered as objects of the application model 24. A preferred application model 24 stores various metadata, described above, with these objects, including the links. Unit tests can be stored in connection with the illustrated boxes and links.

Figure 29:
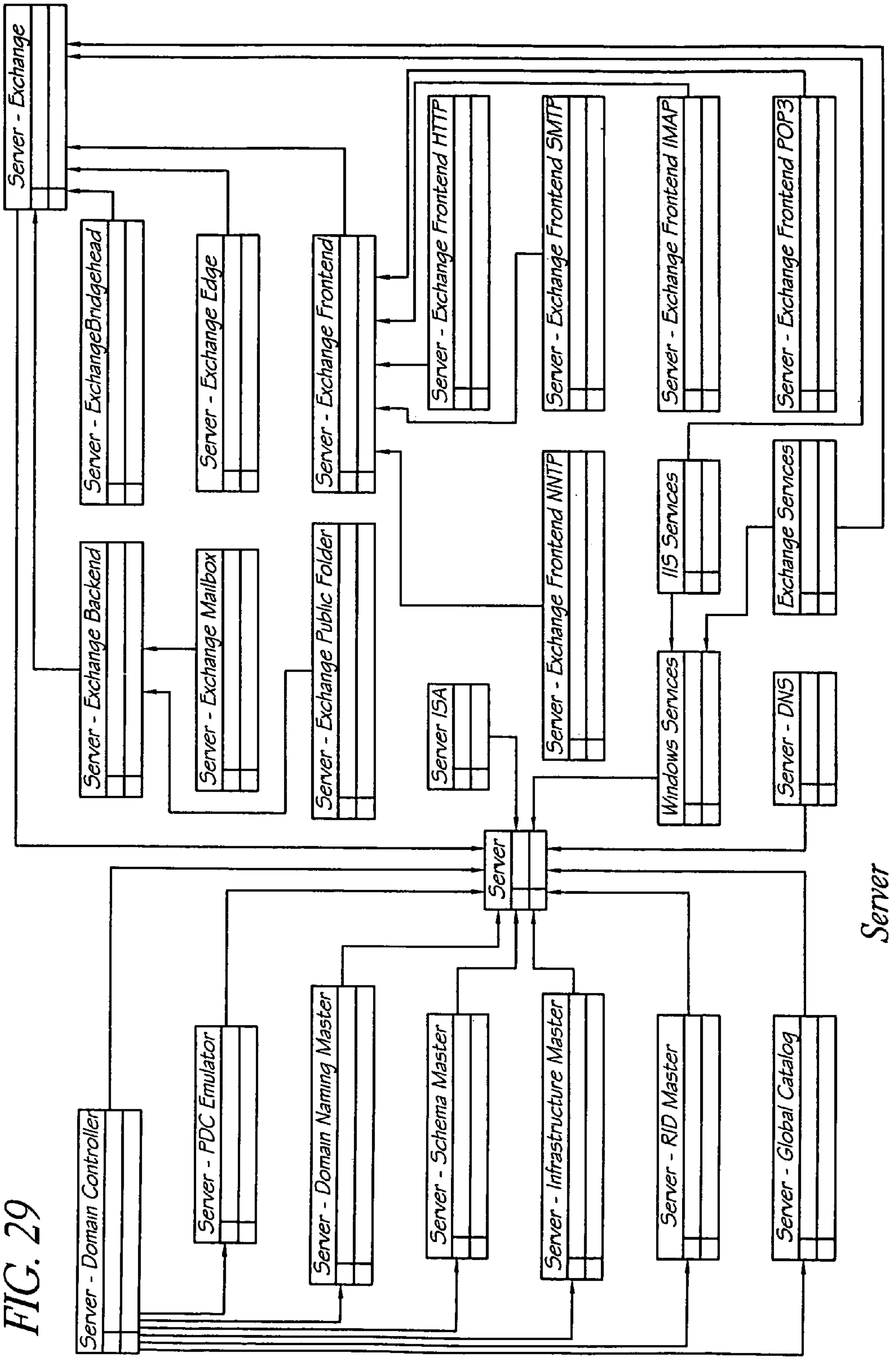
FIGS. 29-40 show sub-topological application model schema for specific components of the application model schema shown in FIG. 28, corresponding to servers, Active Directory, Exchange™ configuration, Windows™ services, IIS services, Exchange™ services, routing, storage groups, public folder hierarchy, databases, third party software, and users associated with the managed deployment.
Figure 30:
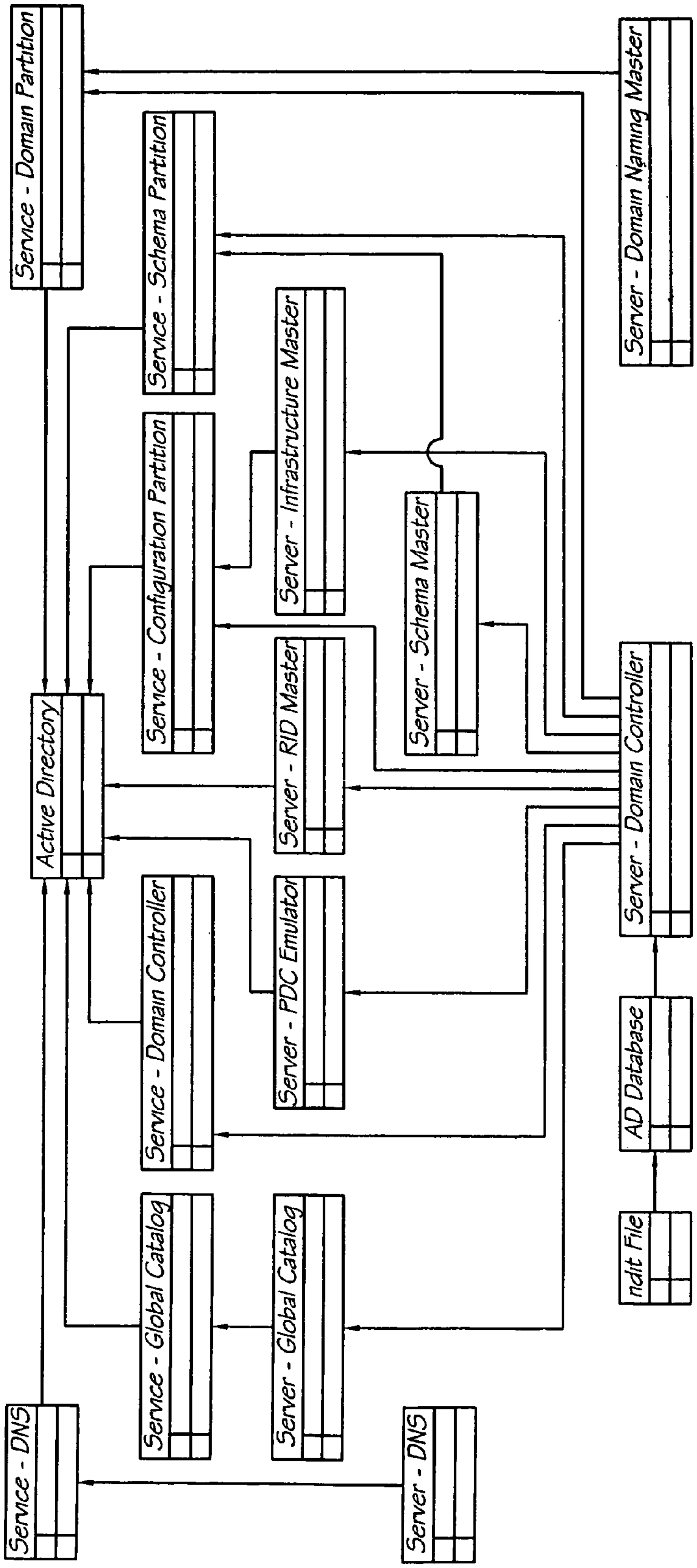
Figure 31:
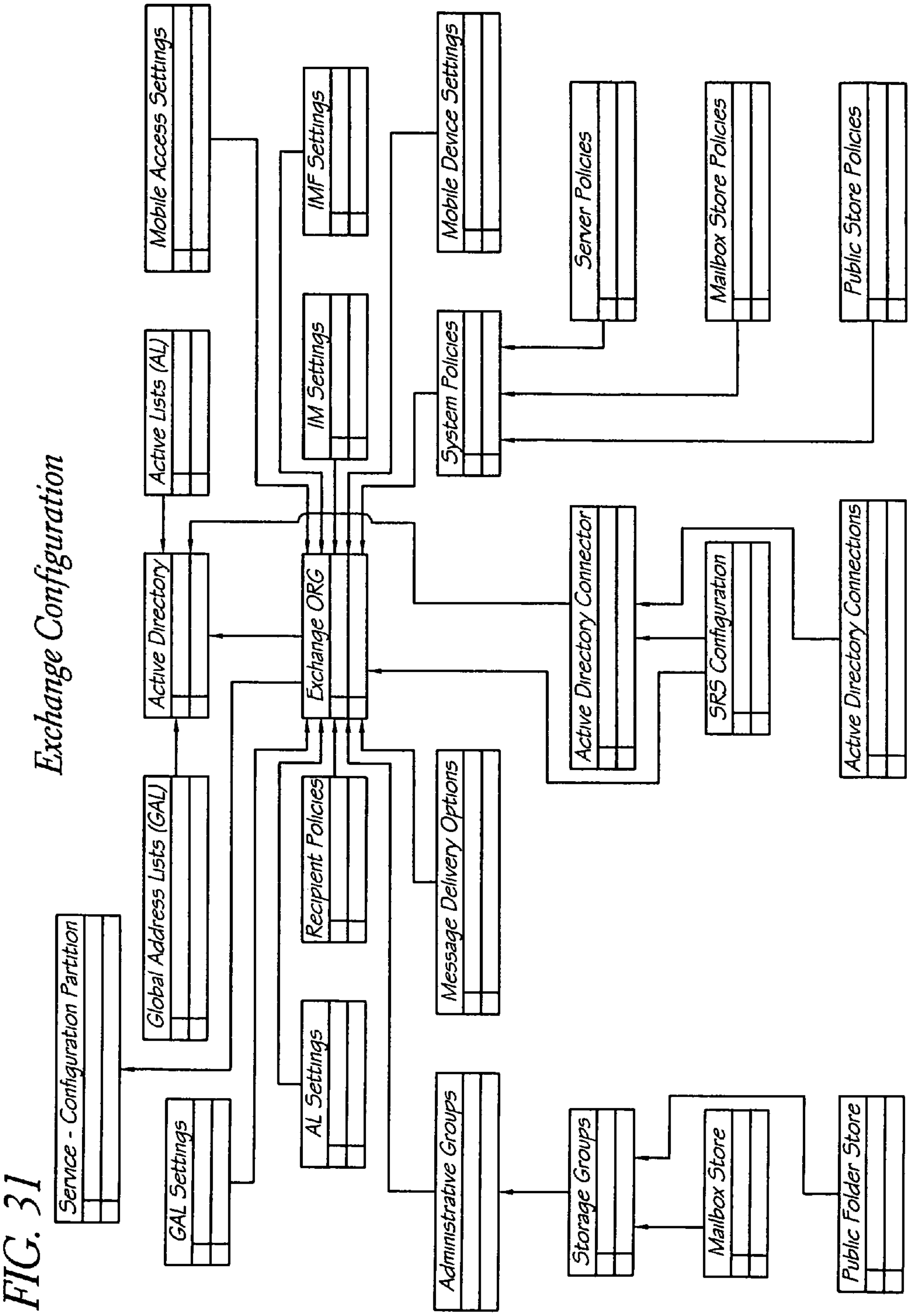
Figure 32:
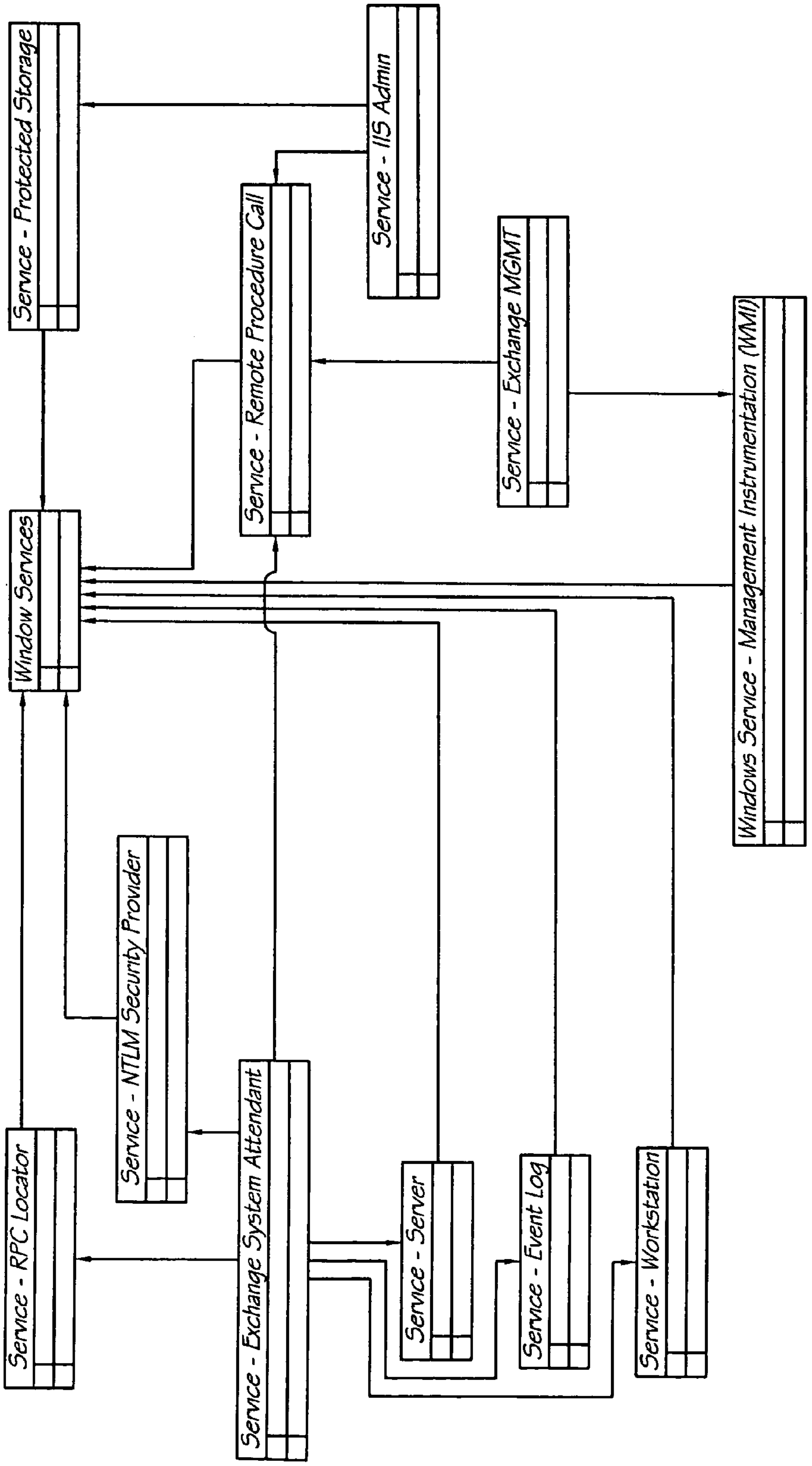
Figure 33:
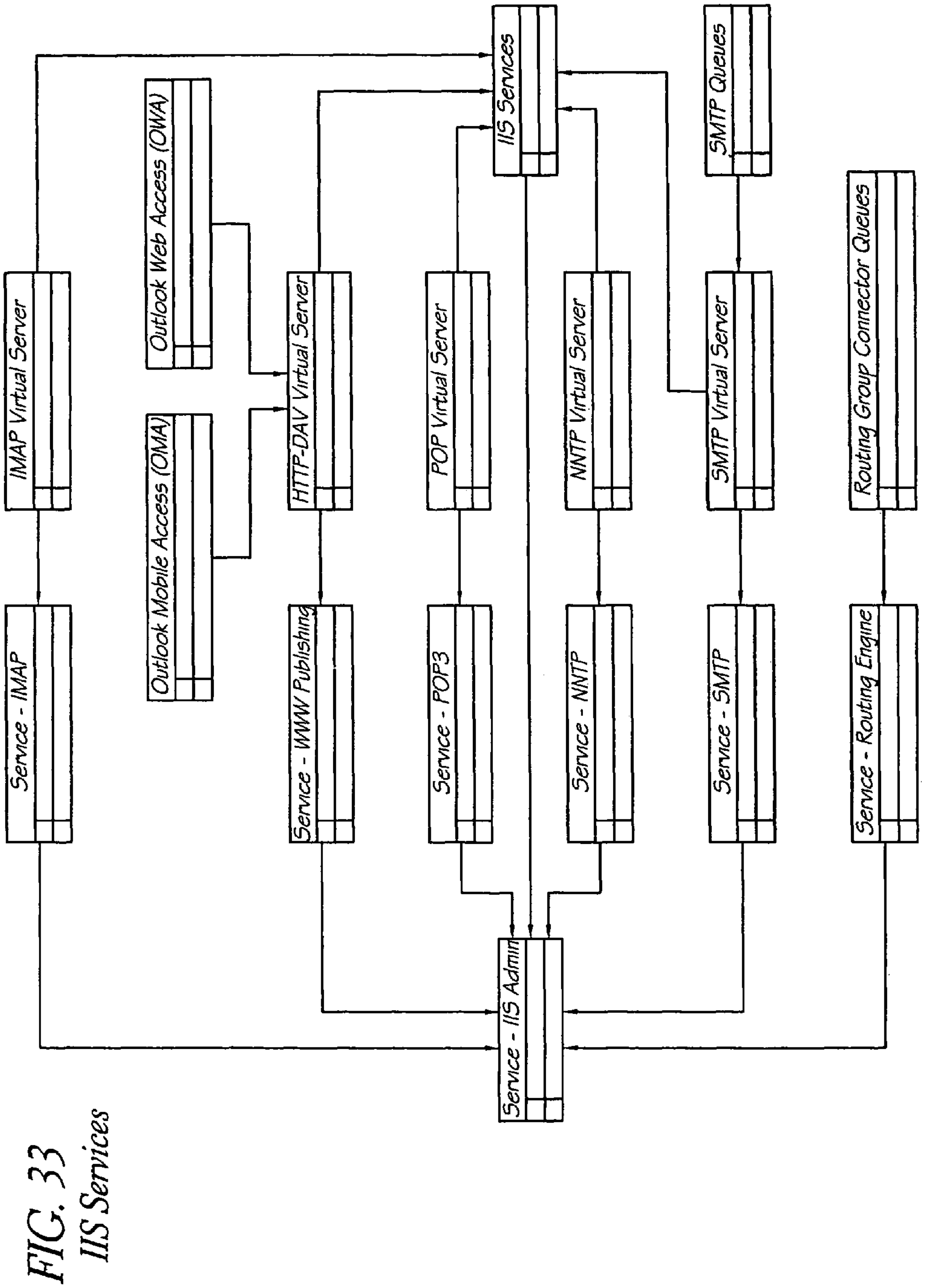
Figure 34:
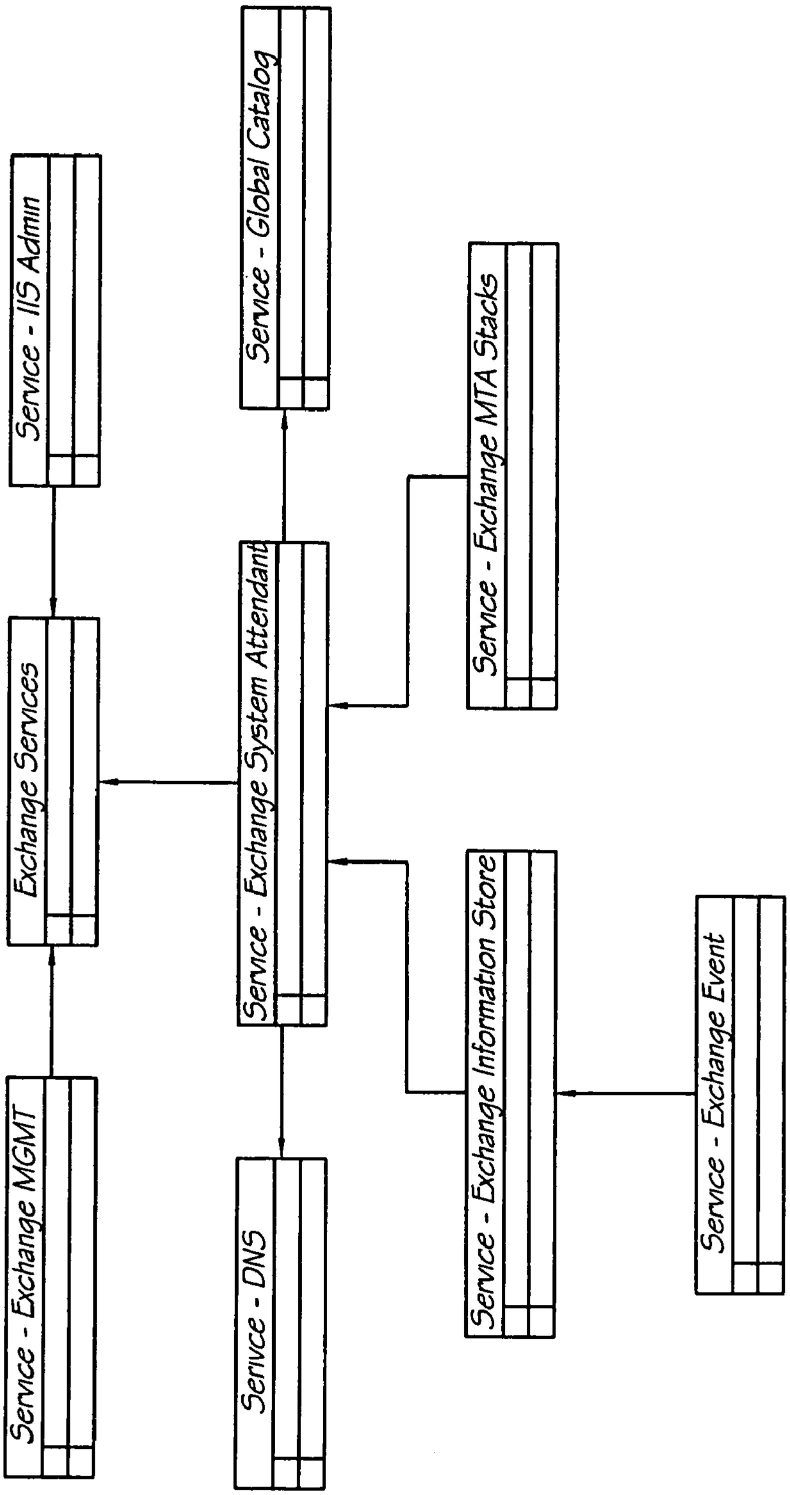
Figure 35:
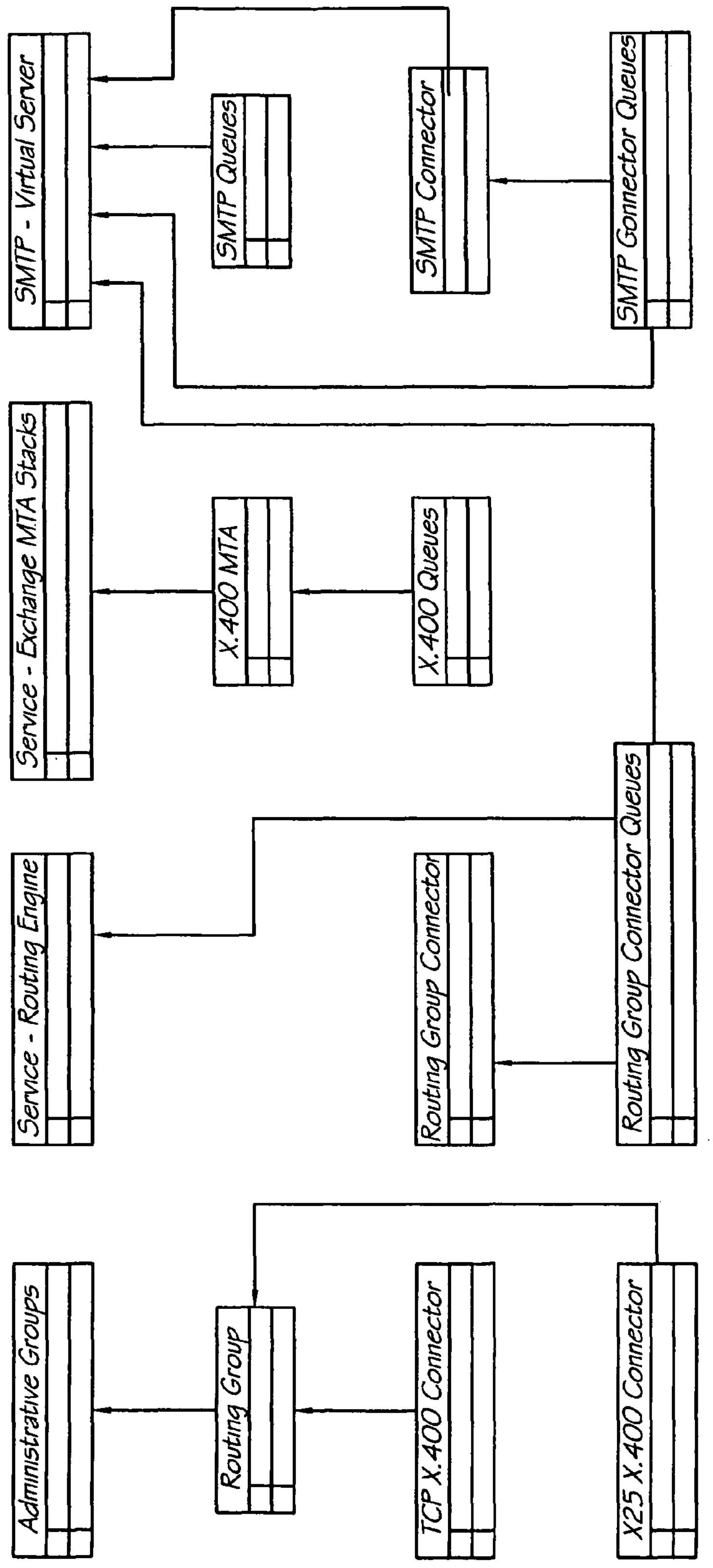
Figure 36:
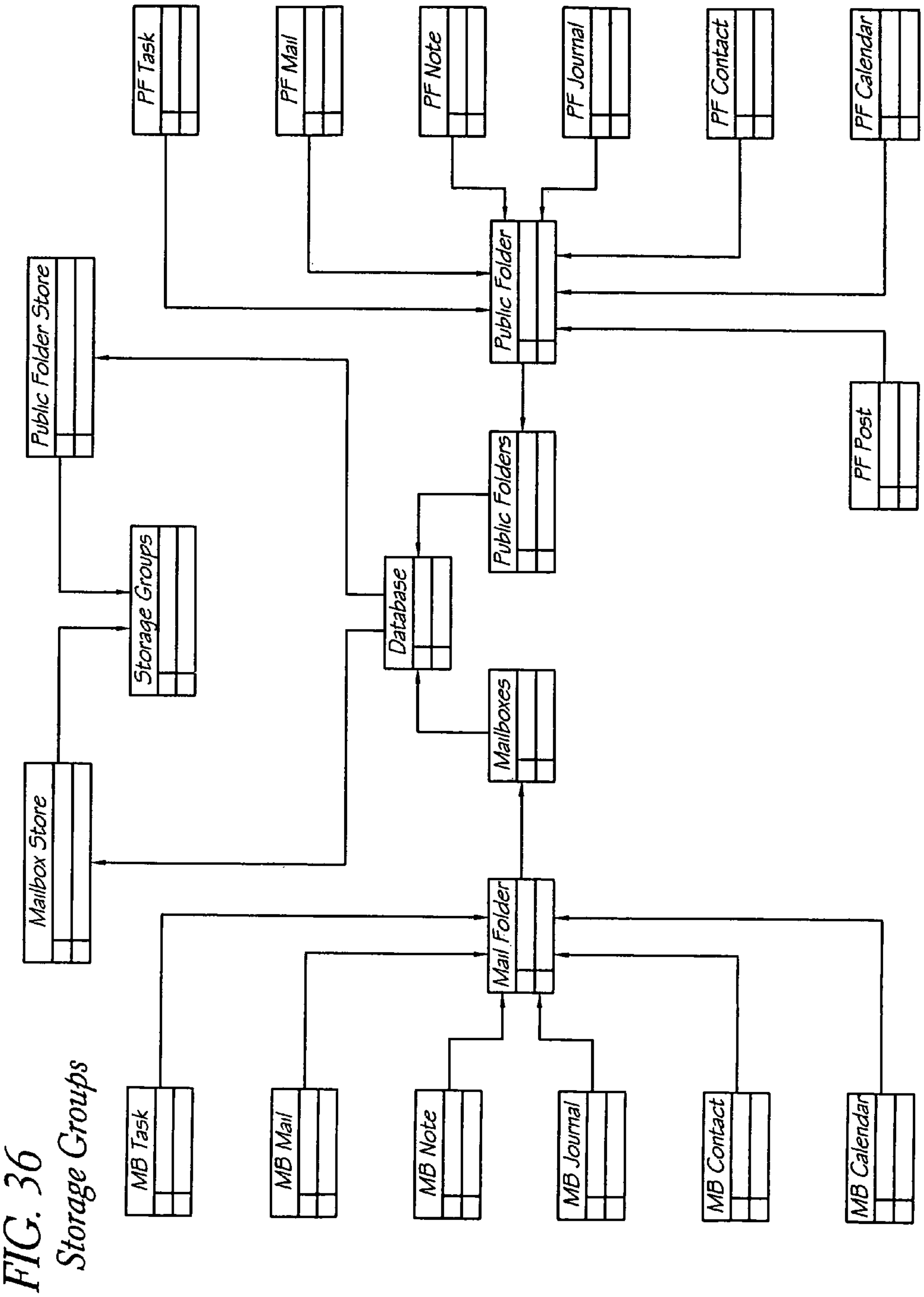
Figure 37:
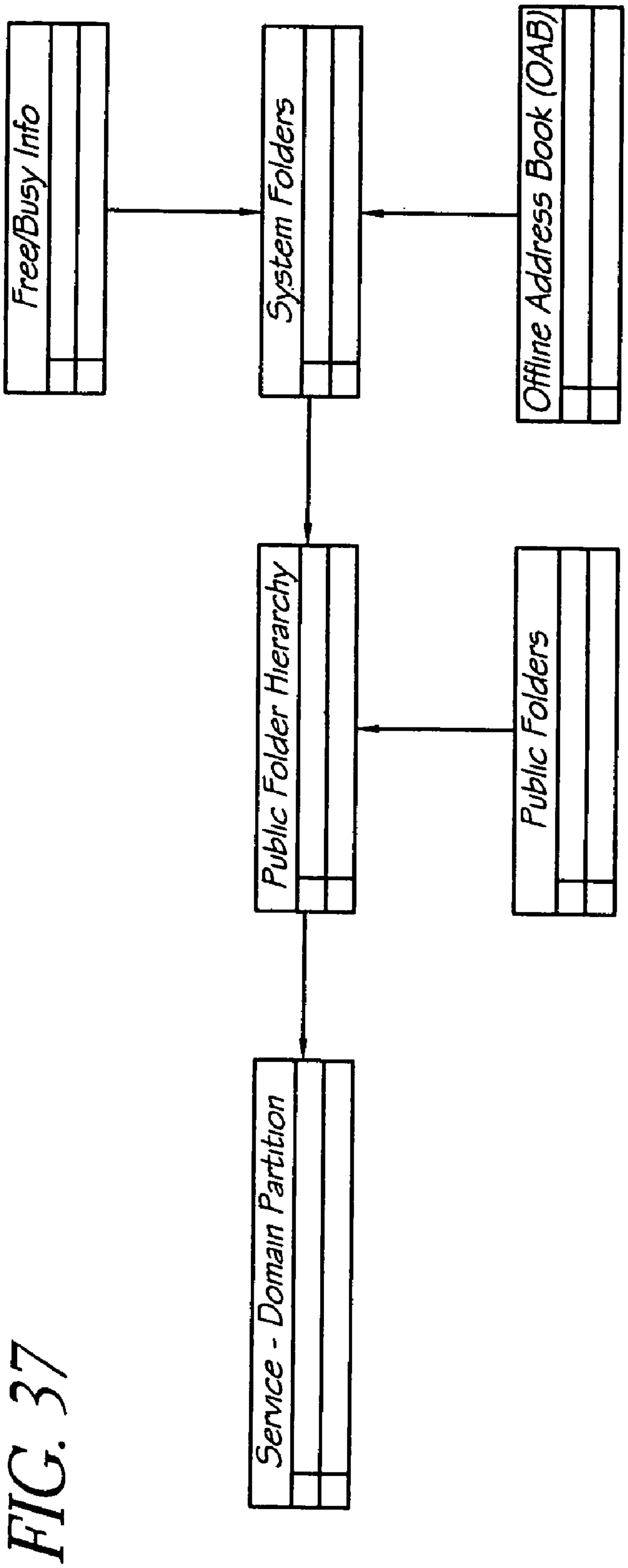
Figure 38:
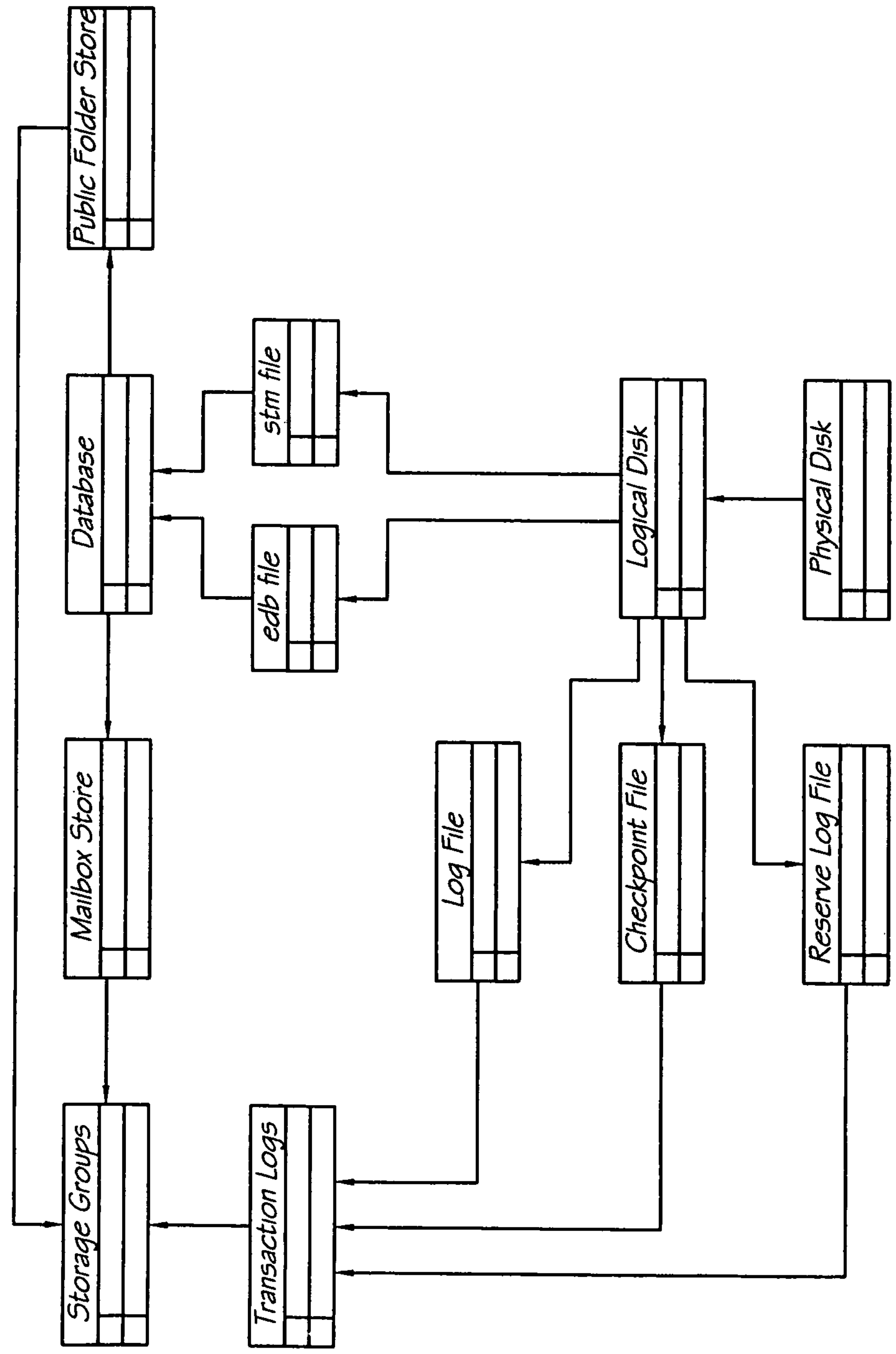
Figure 39:
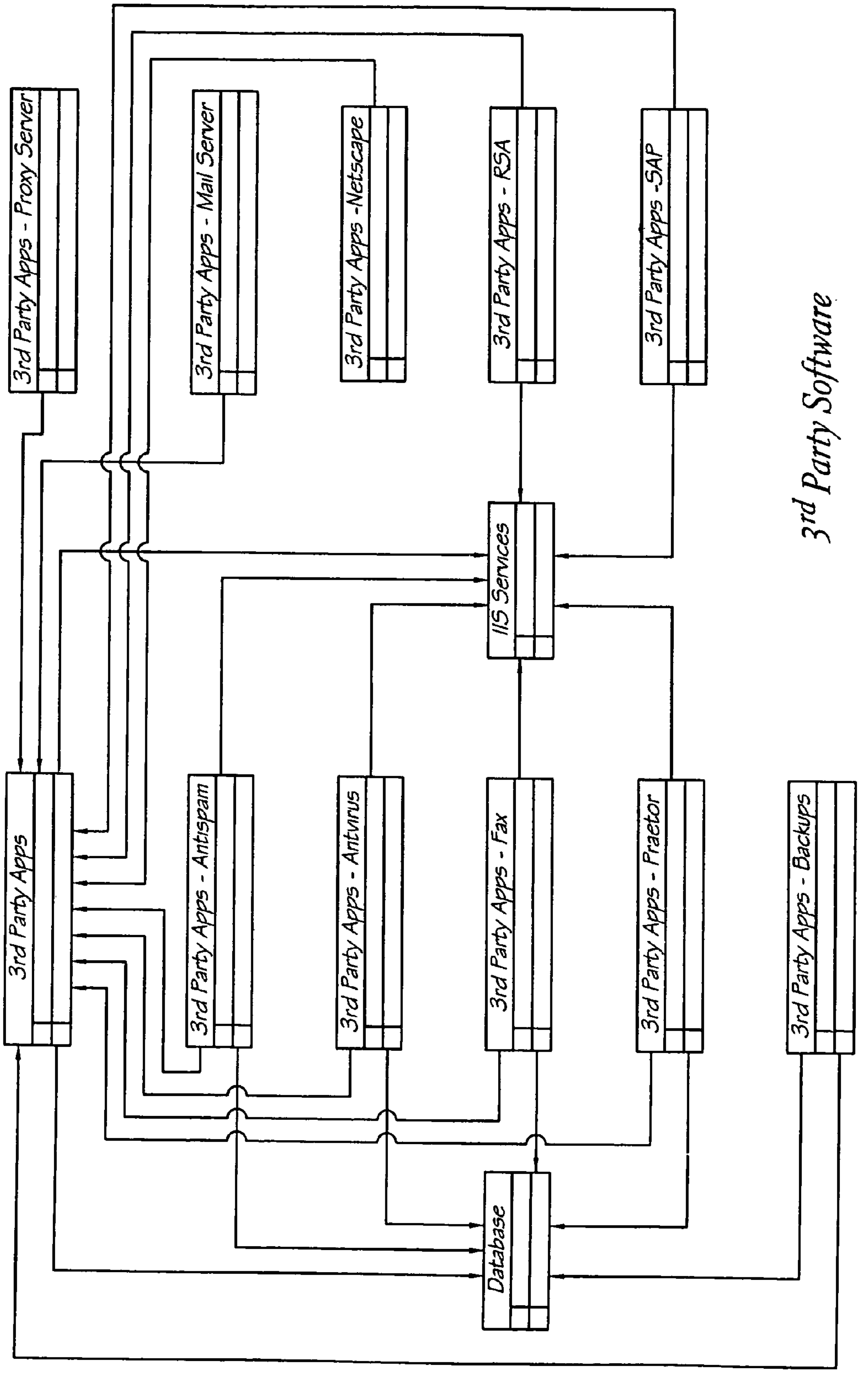
Figure 40:
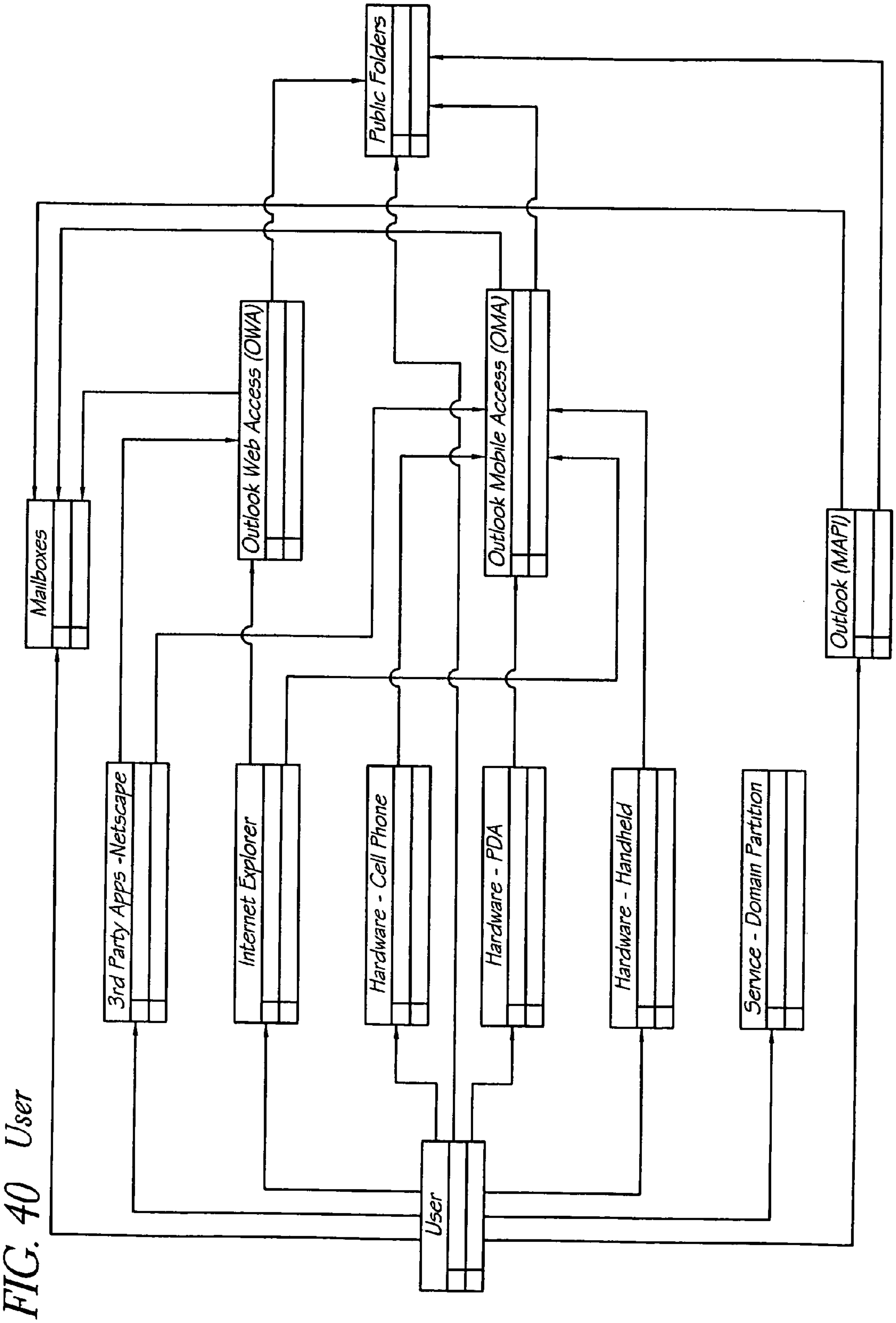

One of the boxes shown in FIG. 28 is a box 280 representing servers associated with the deployment 10. FIG. 29 shows an object graph for the servers. In other words, FIG. 29 shows all of the instances of servers of the deployment 10, represented as a sub-topology of the application model schema shown in FIG. 28. Similarly, FIGS. 30-40 show sub-topological object graphs for Active Directory, Exchange™ configuration, Windows™ services, IIS services, Exchange™ services, routing, storage groups, public folder hierarchy, databases, third party software, and users associated with the application model represented in FIG. 28. Those of ordinary skill in the art will appreciate that the illustrated application model schema represent an application model for only one particular deployment 10, and that an application model schema will vary depending upon the type of software application that the meta-application 20 manages, as well as on the specific configuration of the particular deployment 10. Skilled artisans will also understand from the teachings herein that FIGS. 28-40 only illustrate a topology and sub-topologies, and that a preferred application model 24 includes much more information (including metadata about objects, links between objects, data flows between objects, dependences, etc.) than what is shown in these figures.

When the meta-application 20 is initially installed, it auto-discovers most or all of the components of the deployment 10 using the abstract application model (G). A description of this set of components is then sent to the application model 24, which builds a complete context-sensitive model of the deployment (G*). The meta-application 20 uses information from the application model 24 (if the deployment 10 is Exchange™, such information may comprise, e.g., the number of mailboxes, number of servers, network organization of servers, available bandwidth, etc.) to choose a set of monitors 14 to deploy and a set of state metrics to be observed. Then "empirical baselines" for each of these state metrics are chosen. The empirical baselines contain things like the initial set of state metrics important for this deployment, initial values for key system parameters such as CPU utilization, volume of traffic, disk utilization and schedules for maintenance tasks appropriate for this deployment. These empirical baselines are preferably provided with the uninstalled version of the meta-application 20 as part of the abstract application model G. They can be computed by analyses of reference material of the type of software application being managed (e.g., books, websites, knowledge base articles, consultants, etc.) and empirical analyses done on a wide variety of different deployments 10 of the managed application.

Once an empirical baseline is chosen, the meta-application 20 can begin analyzing the deployment 10. The meta-application 20 initially runs "best practice plans" as described above. Then the meta-application 20 computes the initial set of telemetry metrics and deploys the minimum number of monitors 14 required to gather them. Finally, the meta-application 20 begins its analysis of the deployment 10 by gathering telemetry from the deployment. Its first task is to create a deployment-specific baseline (discussed below) for each telemetry metric that it is tracking, to augment the empirical baseline initially chosen after the meta-application 20 was installed.

In one embodiment, the application model 24 is stored in a standard SQL database. This allows the application model 24 to "answer" queries or questions about the configuration of the managed application 10 for other components of the meta-application 20. Historical configuration information (i.e., a record of the configuration specifics over time) is also preferably stored in the application model 24 to allow administrators to view the entire history of the deployment 10 and how it has changed over time.

A querying language interface can be provided to allow the application model 24 to answer queries received by the analysis subsystem 30 (e.g., by the problem detector 38, RCA module 41, remedy selector 40, or other subcomponents thereof) and/or the automation subsystem 32 (e.g., the planning module 42, the execution engine 44, or other subcomponents thereof). The querying language interface preferably also allows these queries to be indexed and cached to improve querying performance.

Schema-Neutral Data Storage

The application model 24 preferably allows schema-less storage of its information for seamless upgrading of an installation of the meta-application 20. When a software application like the meta-application 20 is upgraded, very often the schema (the way in which its data is organized on disk) will change. In a preferred embodiment, the meta-application 20 can upgrade itself and maintain its historical data about the managed application 10 for extended periods of time without restarting. A schema-neutral data store module is preferably provided, which can accept multiple schemas and query across all of them. This allows data stored in older schemas to still be accessed after a newer version of the meta-application 20 begins using a new schema to store the same type of information.

Figure 4:
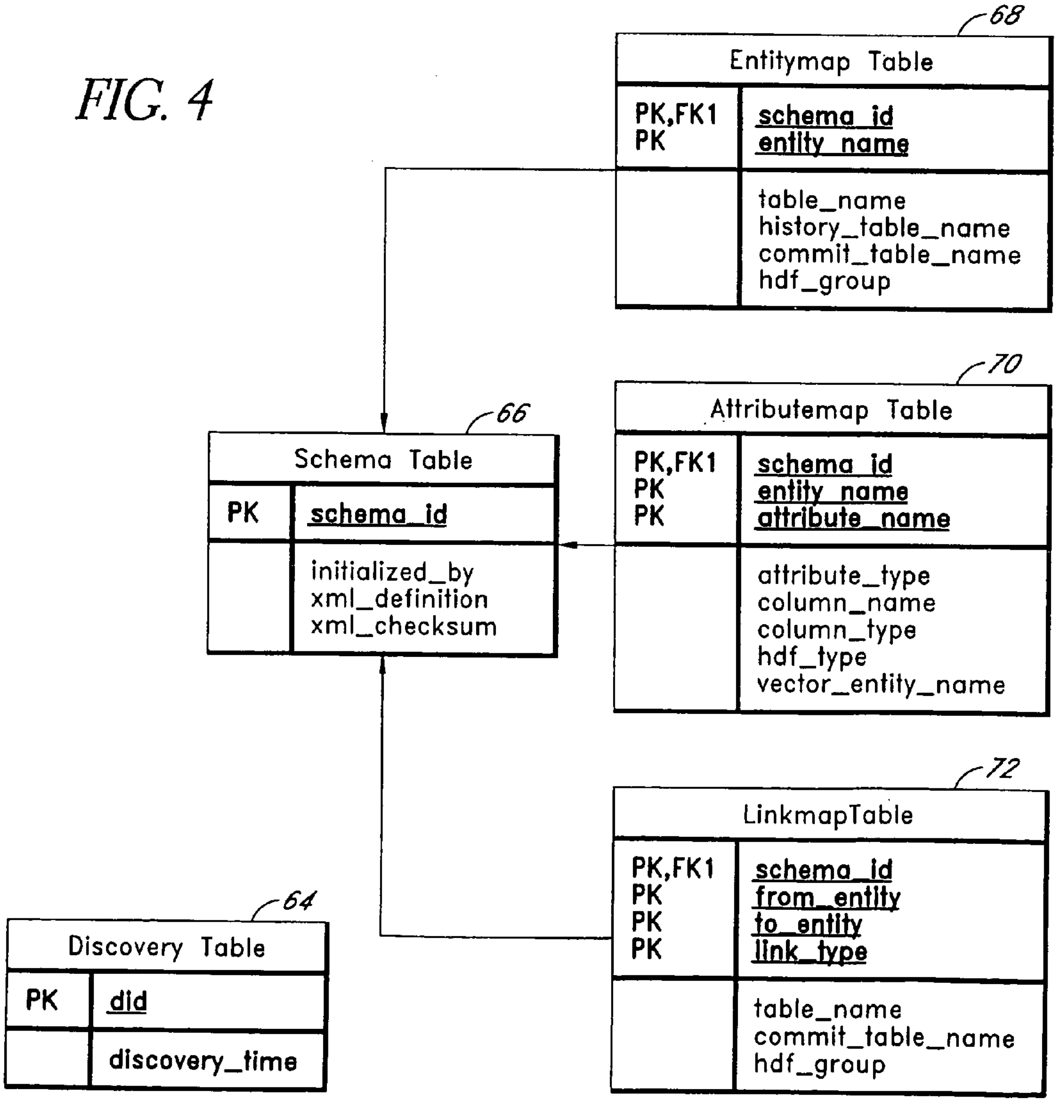
FIG. 4 is a schematic representation of metadata tables for facilitating a schema-neutral storage of information in an application model of one embodiment of a meta-application.

To accomplish this, the meta-application 20 preferably maintains metadata tables for each type of data, which store the locations of the actual data. The metadata tables keep track of the other tables (e.g., SQL tables or HDF5 groups) that hold the actual information. Exemplary metadata tables maintained by the meta-application 20 are illustrated in FIG. 4 and described below. Skilled artisans will appreciate that other types of tables and table content can be provided and maintained, while still providing schema-neutral storage.

A discovery table 64 records when discovery (the process responsible for gathering that information stored in the application model 24) was conducted. It is used to track which rows in the data tables were discovered at different times. Thus, the discovery table preferably holds all of the known discovery events. In one embodiment, the discovery table has the following columns:

"did"—an integer "discovery ID" column. Each "did" represents a different run of the discovery process.

discovery_time—the time the corresponding discovery process started.

A schema table 66 records all the different versions of the schema that have been installed by the meta-application 20. In one embodiment, the schema table 66 has the following columns:

schema_id—a character sequence of the form "yymmdd_v", which represents the installation date and sequence number of the schema. For example, if two different versions of a schema were installed on Aug. 13, 2004, the schema table would have two rows with a schema_id of '040813_1' and '040813_2'.

initialized_by—the login name of the person who installed this schema version.

xml_definition—a large object column which contains the entire XML schema.

xml_checksum—the checksum of the xml_definition column. This is used by the database code to determine if the schema that a user specifies has already been installed.

An entity map table 68 records the names of the actual tables that hold the data for a given entity. For example, for SQL entities, this table contains the names of all the tables that hold data for different schema versions of an entity. Also, for HDF5 entities, the entity map table 68 holds the names of HDF5 files and the names of the groups. In one embodiment, the entity map table 68 has the following columns:

schema_id—the schema identifier.

entity_name—the name of the entity.

table_name—for SQL, the name of the table that holds the data for this version of the entity.

history_table_name—for SQL, the table that holds the historic data for this version of the entity.

commit_table_name—for SQL, the table that holds the commit information for this version of the entity.

hdf_group—for HDF5, the name of the HDF5 file and group that contains the data for this entity.

Two records in the entity map for the same entity can have the same table_name and history_table_name values if the underlying definition of the entity is the same in both versions of the schema.

An attribute map table 70 records the names of the actual columns that hold the data for different schema versions of a given attribute. In one embodiment, the attribute map table 70 has the following columns:

schema_id—the schema identifier.

entity_name—the name of the attribute's entity.

attribute_name—the name of the attribute.

attribute_type—the "type" of the attribute (e.g., a string).

column_name—for SQL or HDF5, the name of the attribute's column.

sql_column_type—for SQL, the database type of the attribute (e.g. NVARCHAR).

hdf_column_type—for HDF5, the HDF type of the attribute (e.g. String).

vector_entity_name—only for "Vector" attributes: the name of the entity that holds the actual set of values for the vector.

In the illustrated embodiment, two records in the attribute map for the same attribute can have the same column_name values if the underlying definition of the attribute is the same in both versions of the schema.

A link map table 72 records the names of the actual tables that hold the links between two specific entities. The link map table 72 contains the names of all the SQL tables or HDF5 files and groups that hold data for different schema versions of a link. In one embodiment, the link map table 72 has the following columns:

schema_id—the schema identifier.

from_entity—the name of the "from" entity in this relationship.

to_entity—the name of the "to" entity in this relationship.

link_type—the type of relationship represented by this link.

table_name—for SQL, the name of the table that holds the link along with its historic data.

commit_table_name—for SQL, the name of the table that holds the commit data for this version of the link.

hdf_group—for HDF5, the name of the HDF5 file and group that holds information on the link.

Two records in the link map for a given pair of entities can have the same table_name values if the definition of the link is the same in both versions of the schema.

Figure 5:
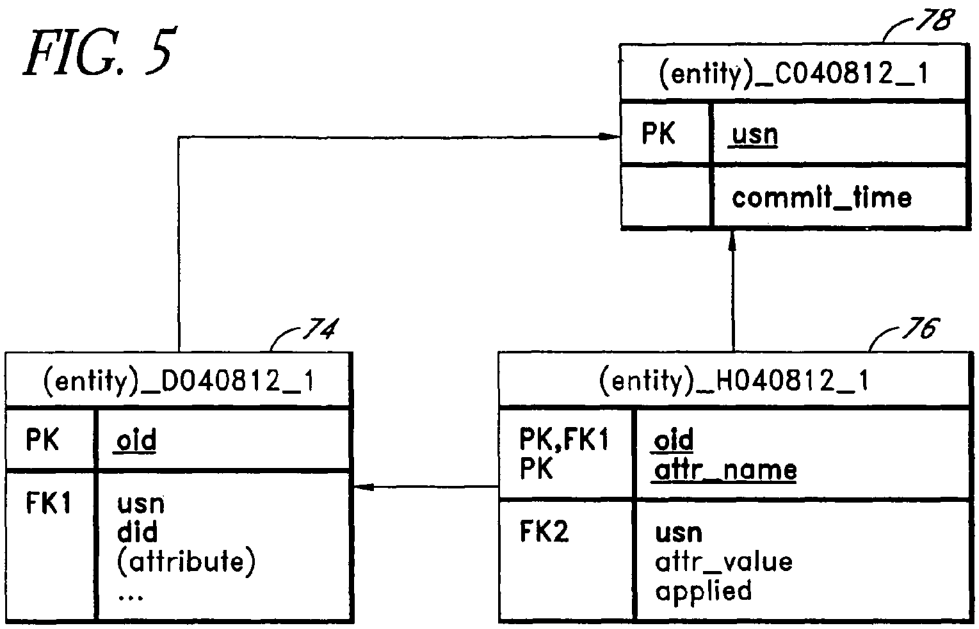
FIG. 5 is a schematic representation of entity data tables for a single entity, for facilitating a schema-neutral storage of information in the application model, in accordance with one embodiment of a meta-application.

Entity data tables preferably hold the actual information for the entities. FIG. 5 shows features of the entity data tables for a single entity, according to one embodiment. In the illustrated embodiment, for a given version of the schema, each entity has associated with it a current entity value table 74, a historic entity value table 76, and an entity commit table 78. The current entity value table 74 holds the most recent information for the entity and preferably has one column per attribute. The historic entity value table 76 holds all historic values (i.e., a record of previous values) as well as all temporary uncommitted updates. Rows are preferably added to the table 76 each time updates occur to the entity table. The entity commit table 78 holds an "update sequence number" and a "commit time" for each update.

In a preferred embodiment, it is expected that the following data access patterns will be the most typical: Most queries will perform simple "selects" and "joins" using the current value tables 74. Historic queries will include scans of the historic value table 76. Updates will preferably be achieved via stored procedure calls that insert a record into the commit table 78 followed by several inserts into the historic value table 76, in turn followed by updates into the current value table 74 and ending with an update of the record in the commit table 78.

The name of the current entity value table 74 can have any of a wide variety of forms, such as "entity-name_D schema-id" (e.g. "HOST_D040812_1"). As mentioned above, the table 74 preferably records the current information for an entity. In one embodiment, the table 74 has the following columns:

oid—the object ID which uniquely identifies the entity in this table. It can optionally be implemented as a simple IDENTITY column that starts with 0 and is incremented by 1 with each new record.

usn—the update sequence number, which represents the last committed update that was applied to this record.

did—the discovery ID. This is an integer column which can be used to identify different discovery runs.

additional columns to hold the most recent attribute values for this entity.

The name of the historic entity value table 76 can have any of a wide variety of forms, such as "entity-name_H schema-id" (e.g. "HOST_H040812__1"). As mentioned above, the table 76 records the historic information for an entity and preferably has the following columns:

oid—the object ID which identifies the corresponding entity in the current value table 74.

attr_name—the name of the attribute that corresponds to the attribute value.

usn—the update sequence number corresponding to the attribute value.

attr_value—the value of the attribute.

applied—a boolean flag used during the update process to indicate whether the update represented by this record has been applied to the corresponding record in the current value table 74.

The name of the entity commit table 78 can have any of a wide variety of forms, such as "entity-name_C schema-id" (e.g. "HOST_C040812__1"). As mentioned above, the table 78 records the commit status of the updates to the entities and preferably has the following columns:

usn—the update sequence number representing the specific update action.

commit_time—the time at which the update was committed.

Figure 6:
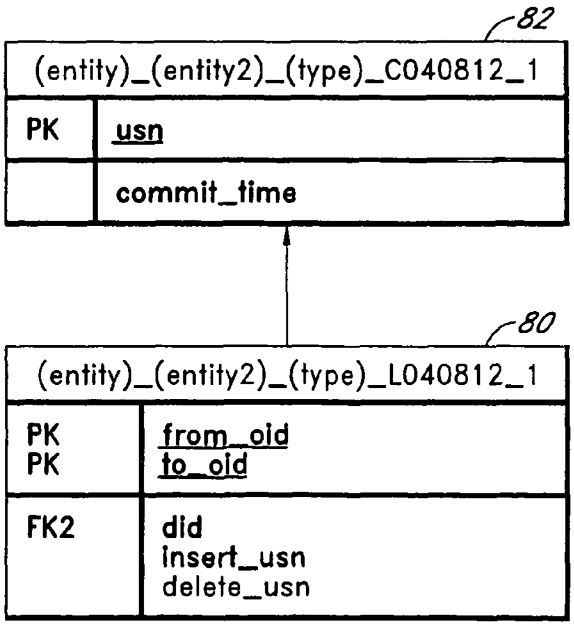
FIG. 6 is a schematic representation of link tables that hold information about relationships between entities, for facilitating a schema-neutral storage of information in the application model, in accordance with one embodiment of a meta-application.

FIG. 6 shows two tables that preferably hold the actual information about related entities. In one embodiment, for a given version of the schema, each link has associated with it a link table 80 and a link commit table 82. The link table 80 preferably holds recent and historic information for the links, as well as details of a specified type of relationship between two entities. The link commit table 82 preferably holds an update sequence number and a commit time for each update to its corresponding link table 80.

The name of the link table 80 can have any of a wide variety of forms, such as "entity1-name_entity2-name_type_L schema-id" (e.g. "DOMAIN_HOST_PC_L040812__1"). As mentioned above, the link table 80 preferably records the current and historic information for all links between two entities. In one embodiment, the link table 80 has the following columns:

from_oid—the object ID which identifies the "from" entity to_oid—the object ID which identifies the "to" entity did—the "discovery ID" of the discovery run which identified this link.

insert_usn—the update sequence number of the update that added this link.

delete_usn—the update sequence number of the update that deleted this link.

The name of the link commit table 82 can have any of a wide variety of forms, such as "entity1-name_entity2-name_type_C schema-id" (e.g. "DOMAIN_HOST_PC_C040812__1"). As mentioned above, the link commit table 82 records the commit status of the updates to the links. In one embodiment, the table 82 has the following columns:

usn—the update sequence number representing the specific update action.

commit_time—the time at which the update was committed.

Thus, skilled artisans will understand from the teachings herein, and particularly FIGS. 4-6, how to maintain multiple versions of the application model 24 across numerous updates and upgrades of the meta-application 20, without difficult or problematic data migrations. For further guidance, U.S. Provisional Patent Application No. 60/638,006 discloses, in Appendix C, an example application model schema used within a meta-application 20 for managing Microsoft Exchange™.

In a preferred embodiment, the meta-application 20 includes functionality for performing efficient querying of static queries. The meta-application 20 preferably knows beforehand the forms of all possible data queries that the data store is able to perform, but not always the specific data to be queried. Specifically, the meta-application 20 preferably knows what tables will be queried and which columns will be used for query constraints and joins. In this embodiment, the meta-application 20 may sometimes know exactly what values will constrain a query, but generally it will not. Since the data in the data store can change, it may not be useful to cache the results of a known query. However, it is useful to cache the data structures used to perform the query, which allows for quicker responses to queries.

Thus, the meta-application 20 preferably includes a persistence system that caches and maintains a known set of queries that the meta-application 20 might execute as well as usage frequency information for each query. In a preferred implementation, queries that are completely bound are stored in a first cache (closest to returning the result). These bound queries already know exactly what table (e.g., SQL table) and constraints to use. A second cache contains queries that are not completely bound, such as a query that might lookup a server with a name to be provided when the query is executed. These unbound queries can be though of as prepared statements.

The persistence system of the meta-application 20 preferably also maintains a cache of frequently accessed data in memory, organized for fast lookup and good locality of reference, for the queries that are most frequently executed. So if a specific query looks in table foo for column bar with a specific value, rows in table foo will be split into two cached tables, one for column bar and one for the other columns.

Gathering Telemetry

Monitors and Probes

As explained above, with reference again to FIG. 1, the meta-application 20 uses monitors 14 and probes 16 to collect telemetry data (also referred to herein as "state metrics" or "telemetry metrics") from the deployment 10 of the managed application. In the illustrated embodiment, a monitor 14 encapsulates all the different ways that the meta-application 20 can gather telemetry data from, and control, the deployment 10. Each probe 16 preferably runs inside of a monitor 14 and is responsible for gathering data for a specific telemetry metric. The analysis subsystem 30 is preferably concerned with gathered telemetry metrics, and leaves the details of how to gather them to the monitors 14. The automation subsystem 32 preferably just worries about "operators" and lets the monitors 14 deal with how to execute them on the deployment 10. In a preferred embodiment, a monitor 14 is a piece of code, such as executable program or DLL (dynamic link library) file. The application model 24 can maintain a mapping of all possible telemetry metrics associated with each application model component/object. This allows algorithms to dynamically create problem identification procedures at runtime without the need for pre-built rules.

Monitors 14 can preferably use both local and remote APIs (application program interfaces) to access the managed application 10. This simplifies installation of the meta-application 20, because it is not necessary to modify any deployment 10 components in order for the meta-application to monitor them. In addition, certain components, like routers and firewalls, can typically only be managed via remote APIs. Microsoft Windows™ has the ability to monitor and remotely control most deployment 10 components via remote APIs. Thus, remote monitors 14 can provide a significant amount of the functionality required to manage the deployment 10.

Monitors 14 can reside locally with respect to the deployment 10, or locally with respect to the meta-application 20. In a preferred embodiment, one monitor 14 is provided on each server 12 of the deployment 10. In this case, the monitor 14 can preferably use all the remote and/or local APIs (some application-specific APIs are only accessible locally on the server 12 on which the application is installed). In addition, local monitors 14 can minimize the bandwidth they use by sending only "diffs" of telemetry data (differences between two data sets). Local monitors 14 can preferably also operate when network connectivity to the meta-application 20 server (the meta-application 20 is preferably provided on one server, but could be provided on a plurality of servers) is lost. In such a case, a local monitor 14 can preferably batch collected data and send it when connectivity is regained. Local monitors 14 preferably also have the ability for local analysis of telemetry, as well as identification of features or problems and associated resolutions, thus providing a distributed analysis capability to the meta-application 20. For example, if the monitor 14 senses that the deployment 10 is about to crash, the monitor can gracefully and immediately shut down services to minimize data loss.

The meta-application 20 preferably analyzes and chooses (e.g., when it is first installed) the set of telemetry required to manage, the application deployment 10. Monitors 14 can be categorized by the application component they monitor and control. For example, there may be an Exchange™ Server monitor, a Microsoft DNS Server monitor, a Cisco PIX Firewall™ monitor, etc. The meta-application's knowledge base 22 preferably has a mapping of telemetry metrics to monitors 14. Monitors 14 can register themselves with the telemetry component 34 (discussed below), which then configures each monitor 14 with respect to the type and frequency of telemetry required.

Figure 7:
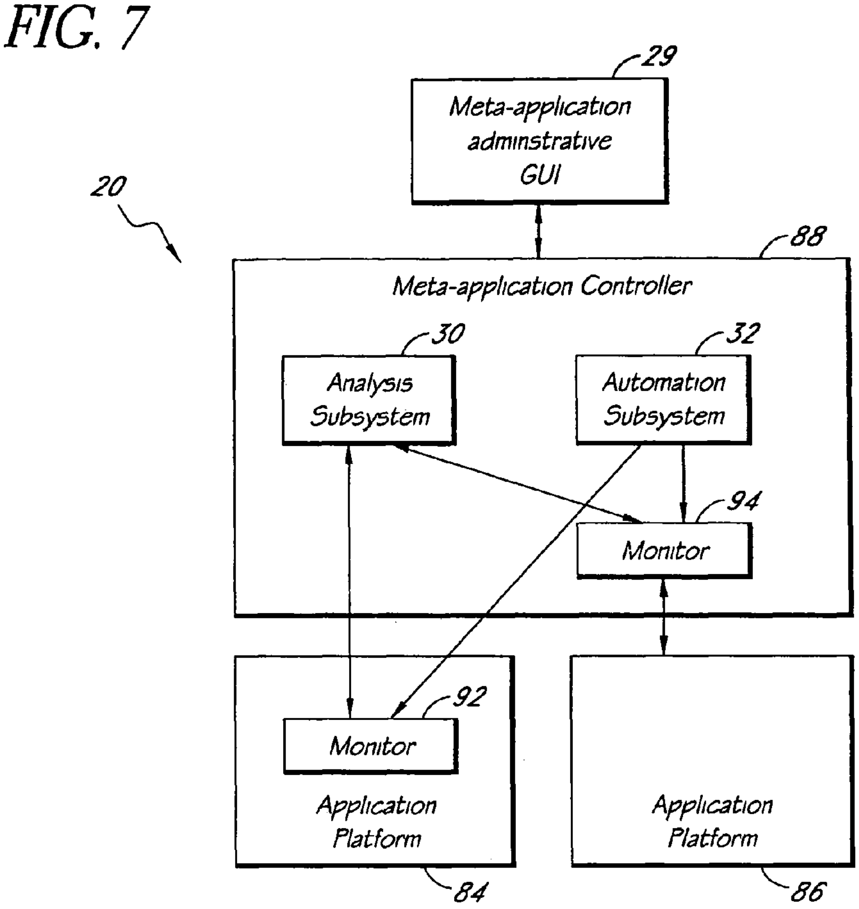
FIG. 7 is a schematic representation of one embodiment of the meta-application, illustrating a particular deployment of monitors for gathering telemetry.

FIG. 7 shows a meta-application 20 that manages two different application platforms 84 and 86. The meta-application 20 comprises a controller 88 and an administrative user interface 29 (illustrated as a graphical user interface or GUI). The controller 88 may be implemented on one or more different servers and includes the analysis subsystem 30 and automation subsystem 32 discussed above. Also shown are monitors 92 and 94. As shown, the monitors can reside either locally with respect to the managed application (such as the monitor 92) or within the controller 88 (such as the monitor 94). The monitor 92 resides locally within the application platform 84, and sends telemetry to the analysis subsystem 30, possibly using SOAP (Simple Object Access Protocol). The automation subsystem 32 can send deployment healing commands to the monitor 92 for healing the application platform 84. The monitor 94 resides within the controller 88, and gathers telemetry from application platform 86 via any of a variety of protocols, such as SNMP (Simple Network Management Protocol), RPC (Remote Procedure Call), and the like. The automation subsystem 32 can send healing commands to the monitor 94, which remotely executes them against the application platform 86.

Referring again to FIG. 1, in a preferred embodiment, each monitor 14 is implemented as a "container" process with the ability to load new probes 16 at runtime (on Windows™ platforms, monitors 14 can preferably load new probes 16 as DLL files during runtime using the LoadLibrary™ mechanism). In this context, the probes 16 can be thought of as new telemetry capabilities. Monitors 14 send telemetry to the meta-application 20 in chunks of data called "telemetry packets." The telemetry component 34 can preferably configure the container process to control the frequency with which it sends telemetry packets and the type of telemetry metrics in each packet. The container process is preferably also configurable with respect to the protocol it uses to send the telemetry packets. Each packet can be tagged with a "priority" that the meta-application 20 can use to determine the packet's importance. The monitor 14 can use platform APIs to gather all requested metrics, form a packet, and then send the packet using the negotiated protocol.

Figure 8:
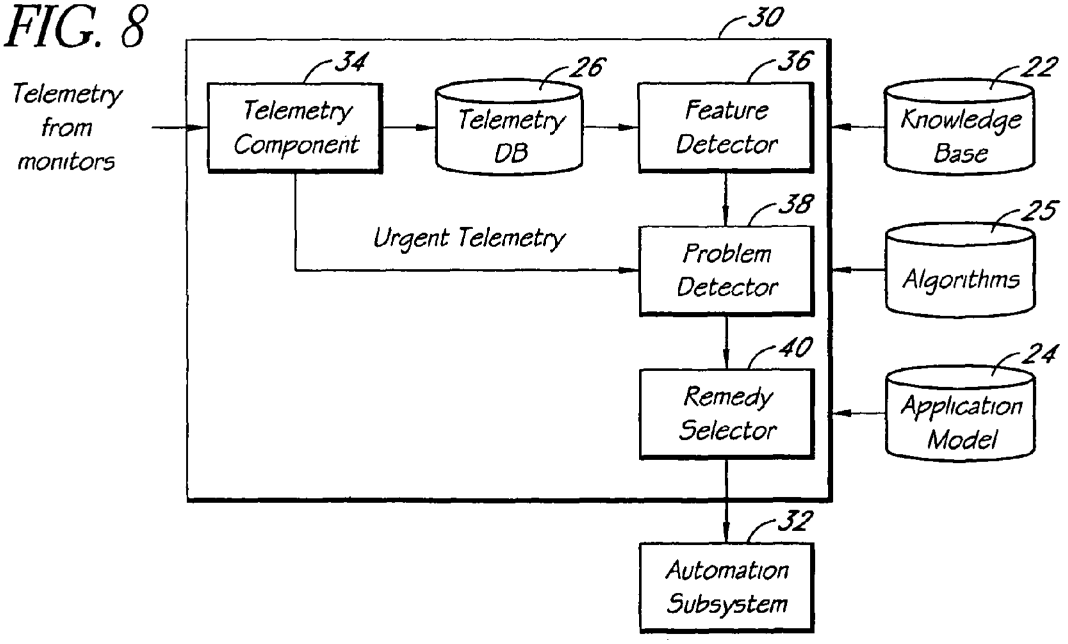
FIG. 8 is a schematic diagram illustrating how a meta-application's analysis subsystem analyzes telemetry, in accordance with one embodiment of the meta-application.

FIG. 8 illustrates preferred methodology or process flow of the analysis subsystem 30, as it pertains to Problem Logic (discussed below). As shown, the telemetry sent by the monitors 14 is received by the telemetry component 34, which processes the telemetry (discussed below). The meta-application 20 can be configured to send urgent telemetry (e.g., telemetry that clearly or probably comprises evidence of a problem with the deployment 10) directly to the problem detector 38, while the rest of the telemetry is stored in the telemetry database 26. The feature detector 36 analyzes the received telemetry to detect features, which are passed on to the problem detector 38. The feature detector 36 may use feature detection algorithms 25 (discussed below) to detect the features. The problem detector 38 uses the knowledge from the knowledge base 22 to detect problems associated with the detected features. The remedy selector 40 then analyzes the detected problems to identify appropriate remedies and develop a healing strategy. Information associated with the detected problems and remedies are then sent to the automation subsystem 32. The telemetry component 34, feature detector 36, problem detector 38, and remedy selector 40 can advantageously use information received from the application model 24 to perform their associated tasks.

Thus, the analysis subsystem 30 is where the meta-application 20 does its telemetry analysis and problem identification. The illustrated meta-application 20 uses a staged approach to telemetry analysis with analyses getting increasingly complex as the data proceeds to the next stage. The analysis subsystem 30 is preferably heavily multithreaded to maximize responsiveness. Also, because much of the analyses are not synchronized and their execution run at different rates, the architecture preferably allows related tasks to have disparate execution times while still being able to cooperate with each other. Each thread pool preferably has synchronization data structures that reduce the complexity of global thread management.

Telemetry gathering may require quasi-realtime processing constraints, so that the meta-application 20 can avoid dropping telemetry or overflowing network buffers. To enforce this, all telemetry-processing tasks are preferably given a priority and are executed in priority order. If tasks need to be dropped, then preferably only the lowest priority tasks are eliminated. To facilitate timely response to incoming telemetry, the entire telemetry-processing loop is advantageously multithreaded. The most time-sensitive task is performed by the telemetry component 34, which preferably monitors all of the incoming telemetry and prevents overflow of network buffers. A telemetry priority queue (TPQ) can be provided to decouple the telemetry component 34 from the rest of the analysis subsystem 30, so that the component 34 can feed telemetry packets to the TPQ without regard for how quickly the processor thread is taking telemetry tasks off of the TPQ. The thread pool of the telemetry component 34 preferably accepts telemetry from monitors 14 and then labels each packet with a priority. The telemetry packet is then inserted into the TPQ that is sorted by telemetry priority. In addition to the TPQ, a scheduled priority queue (SPQ) can maintain "scheduled" tasks sorted by task priority. The SPQ priorities are preferably in the same "units" as the TPQ priorities to facilitate comparison against each other. The meta-application 20 preferably inserts tasks into the SPQ when it needs to execute an internal task, such as responding to updates from the update server 56 (FIG. 2) or regular configuration synchronization with the application model 24. The priority of a scheduled task is zero when it is not time for execution, and increases over time after it passes its scheduled time of execution. Tasks also may change in priority as other algorithms measure and record their utility. The highest task in both queues is compared and the higher priority task is chosen.

The chosen task is then assigned to a thread from the thread pool of the telemetry component 34. Packets are first split into their constituent parts. Each telemetry part is then processed according to its type. Each telemetry type has a predetermined sequence of tasks that are invoked from the processor thread. These tasks include things like insertion into the telemetry database 26 and feature detection.

Meters, Redundancy Avoidance, and Postprocessors

In embodiments of the invention, the managed application 10 is provided in a distributed environment, and the meta-application 20 may reside on one or more servers that are physically remote from the managed application. In this arrangement, the points of measurement specification of telemetry (e.g., the one or more servers on which the meta-application 20 resides) and actual collection (e.g., the servers 12 containing components of the managed application 10) are different. In a preferred embodiment, the meta-application 20 specifies "what" is to be measured by gathering up all relevant information required to effect the measurement, conglomerating it into some structure or record (referred to herein as a "meter"), and transmitting that information to a point of data collection. The infrastructure at the data collection point (in the illustrated embodiment, one or more monitors 14) uses the meter's contents to effect the measurement, and then packages that information into one or more discrete packets (i.e., state metrics) for shipment back to a point of processing, storage, and/or aggregation, typically near the place where the meter was originally created. In one embodiment, the telemetry component 34 is the point of meter creation and processing.

The task of gathering up all relevant information to effect measurement can be burdensome, especially in systems where many different code points in numerous contexts might want to gather data. In preferred embodiments of the present invention, this task is simplified by providing an application model 24, which is a well-structured database representing a distilled view of the environment where things are measured. The application model 24 advantageously provides a means of extracting metadata relevant for telemetry measurement. In other words, the application model 24. helps to reduce the amount of "work" that the meta-application 20 needs to do in order to gather information about the deployment 10. In these embodiments, it is more convenient to place the burden of gathering information on the meter itself.

In a preferred embodiment, the general method of data collection is as follows. The measurement "client" (e.g., the monitor 14) specifies an entity or set of entities on which the measurement should be performed, the type of measurement that should be performed on the given entities, and any parameters (not determinable by context) required for the measurement. The measurement "server," specifically the meter or piece of infrastructure that creates the meter (e.g., the meta-application controller 88 of FIG. 7), then ensures that the set of specified entities makes sense for the kind of measurement requested, extracts all information relevant for measurement from the application model 24, and packages that information, along with parameters (raw or processed), into itself. The code that acts as a measurement client (e.g., the monitor 14) becomes much simpler as a result, and the metering system becomes much more flexible, maintainable, and extensible.

In some systems, it is possible and likely that many disparate elements of the system's components within the same process will request identical (or nearly identical) sets of telemetry data in the meter-based approach described above (typically as the result of brute-force application of rule-based demands for data). Disparate elements of a system's components in different processes on the same or on different originating computers may also ask for the same meter-based data. It is difficult to coordinate on the distributed demand-side (i.e., at the monitors 14) to ensure that only one instance of the meter is running at any given time. Those elements demanding metrics from their identical meters may start and stop their measurements at any time, with no coordination between them. The network costs of transmitting the duplicate copies of a given meter to the point of data collection (e.g., monitor 14) is low compared to the overall cost of transmitting the resulting metrics back to the point of meter creation. It is therefore not too costly to allow these redundant copies of meters to run to the data collection point. It is very costly, however, to effect separate measurement of the same data source for each copy of the meter, to arrive at what is essentially the same set of metrics.

Therefore, the monitors 14 are preferably configured to prevent redundant measurement of data in distributed systems. Each monitor 14 preferably recognizes redundancies in the different metering requests arriving at a data collection point, and effects only a single stream of measurements to derive all the metric values to be sent back to those elements in the analysis subsystem 30 requesting the measurements. The metric set can be sent back to each originating host/process separately and "demultiplexed" there to advise each separate requester (typically the meter creators) of the metrics' values.

There are efficient ways to determine whether multiple meters arriving at the data collection points represent the same essential request. These methods are much more efficient than brute-force comparison of all meter internal data. For purposes of comparison, there are some elements of the packaged meter that might be deemed immaterial for comparison (e.g., frequency of measurement under certain restricted conditions).

In a preferred embodiment, filters or aggregators (collectively referred to herein as "postprocessors") are applied to collected telemetry data to lessen the network burden of sending collection metrics from the data collection point (e.g., monitors 14) to the data consumer (e.g., analysis subsystem 30). A set of postprocessors could be constructed as components separate from the meters, with each postprocessor being widely applicable to a number of different kinds of meters. Effective postprocessing then is a matter of creating the appropriate meter, and then attaching the appropriate postprocessor to the meter. As the meter generates metric values (state metrics), those metrics make their way to the postprocessor, which then applies appropriate filtering, aggregation, and/or transformation to those input metrics to generate a separate stream of output metrics. The number, nature, and content of the output metrics need not correspond tightly to the input metrics. The postprocessor usually changes the nature of the output data, sometimes drastically. The meter/postprocessor coupling sends back to the data consumer only the output metrics from the postprocessor.

A variety of different types of postprocessors are possible. For example, one type of postprocessor is an IDENTITY postprocessor, which does not change the meter output in any way. In this case, the coupling of the meter and postprocessor generates results identical to what would have been generated by the meter alone. Another type of postprocessor is one that filters data according to some static or dynamic criteria, allowing input metrics through as output metrics without modification if they match the filtering criteria, and completely eliminating the input metrics otherwise. Yet another type of postprocessor is one that applies some formulaic transformation. For example, such a postprocessor can double the value of each metric, or apply a "lookup" table function to metric values. Skilled artisans will appreciate that other types of postprocessors may be desirable and useful. A postprocessor can also be a composite of several other types of postprocessors.

Postprocessors may also be useful in ways other than limiting network traffic. For example, in some embodiments, postprocessors make the data consumers in the analysis subsystem 30 much easier to construct because some of the data processing burden occurs at the point of data collection (e.g., the monitors 14), thus simplifying the content of the telemetry stream.

Just as the measurement infrastructure (in the illustrated embodiment, the monitors 14) can avoid duplicating measurements and generation of redundant metrics at the point of data collection, similar concepts can be applied to postprocessing. For two different meter/postprocessor couplings with the same meter but different postprocessors, the same raw measurement (the data-source-facing action) can be applied, but different postprocessors can be applied to the metrics stream to generate two separate sets of metrics, as desired by the metrics consumers (in the illustrated embodiment, elements of the analysis subsystem 30). Two different data consumers can, of course, specify the same (to a sufficient degree) meter/postprocessing coupling, in which case the whole pipeline at the point of data measurement is shared for both (for the data-sink-facing action).

There are several main concepts relevant to a preferred total avoidance of redundant measurement. A meter preferably has a "source-facing hash" that combines elements relevant to the meta-application controller 88 (e.g., machine name, telemetry name, etc.). The source-facing hash is derived from the meter's "significant and source-relevant attributes." Similarly, a meter/postprocessor coupling preferably has a "sink-facing hash" that combines elements relevant to the monitoring APIs of a server 12 of the deployment 10 (e.g., which APIs are being used, which components are being monitored, how many hooks are in this server, etc.). The sink-facing hash is derived from the coupling's "significant and sink-relevant attributes," the sink-relevant attributes being a superset of the source-relevant attributes. It is also possible that information present on the meter and/or the postprocessor can be "advisory" or "suggested" and not count as relevant attributes for purposes of this discrimination. The system uses the source-facing hashes and sink-facing hashes to eliminate redundant meter gathering and redundant post processing, respectively.

Redundancy can also be avoided in transmitting all metrics streams back to data consumers in the analysis subsystem 30. Preferably, the monitor 14 transmits only one copy of the data back to the single process (and/or host) that may host multiple data consumers for identical meter/postprocessor couplings. The data-consuming side can worry about notifying all consumers of newly arrived metrics data (demultiplexing).

There is often more than one way to collect any given piece of data, so a given meter's set of metrics could be collected from one of several different sources in a distributed environment of a deployment 10. The meta-application 20 is preferably configured to leverage existing data collection infrastructure of the deployment 10, if any exists. In one embodiment, the monitors 14 are configured to collect metrics through different native APIs on a given platform (e.g., Win32, Linux kernel interface, etc.). Metrics can also be collected through a low-level measurement service provider (e.g., WMI on Windows™), or through other products that collect and aggregate such information.

The meta-application 20 can also be configured to employ different methods for measuring the same data according to various criteria. For example, the meta-application 20 can measure telemetry data based on global system-determined or user-specified preferences for different measurement methods. Alternatively, measurement preferences can be specified on a per-meter basis. For example, a CPU measurement might take fewer resources on a server 12 of the deployment 10 than page faults per second. As another example of per-meter measurement preferences, it might not make sense to measure disk usage more than once a minute. The meta-application 20 can also collect telemetry data based on the current availability of measurement resources. Also, some data collection API's may not be reliable, in which case the monitor 14 should retry using another API. Skilled artisans will understand that other data measurement preferences can be provided at the same or other granularities. Specific policies for how to measure and cache specific telemetry metrics can be stored in these preferences.

In such a system, one would usually prioritize measurement methods for each meter based on preferences. Some measurement methods could be absolutely prohibited, perhaps based on dynamic criteria. The meta-application 20 can be configured to keep track of which allowable measurement methods are currently available, as well as those that do not work. Also, the meta-application 20 can be configured to dynamically "arbitrate" the measurement of a given meter between different measurement points and measurement methods, based on current availability and preference. In one embodiment, the meta-application 20 always attempts to measure the meter by selecting a currently available method having the highest priority, and switching the method based on varying availability, preference, and prohibitions.

Feature Detection

Feature Detection Overview

With reference to FIGS. 1 and 8, this section describes algorithms 25 and structures used by the analysis subsystem 30 to identify features from raw telemetry data, create "baselines" for gathered telemetry signals, and create normalcy bands for the telemetry signals. In the illustrated embodiment, these activities are performed by the feature detector 36. The following describes preferred embodiments of the feature detection algorithms, structures, and methodology of the meta-application 20. Skilled artisans will appreciate that many variations of these are possible.

The meta-application 20 preferably includes telemetry analysis algorithms 25 (FIG. 8) that identify suspicious or anomalous trends or states from raw telemetry. Streams of telemetry are analyzed differently depending upon the type of telemetry. Numeric telemetry is analyzed using statistical techniques, and when a telemetry value of a particular stream does not match a statistical profile for the stream, a feature is generated. Other types of telemetry are analyzed using pattern-matching techniques. All feature-detection algorithms finish by adding detected features to a "feature list," which allows different algorithms to synchronize themselves. The feature list is preferably stored in the telemetry database 26.

Each feature preferably has an associated lifetime that the meta-application 20 uses to determine when it is appropriate to remove the feature from the feature list. Removal allows the meta-application 20 to prevent false positives and to clean out features that have not affected application performance or stability. Note that if a feature did have such an effect, it would have triggered a problem (described below), and the meta-application 20 would have changed the feature's lifetime value. Further, if the meta-application 20 resolves the detected problem, then the feature itself should disappear.

Modeling Deployment Behavior

Specific analysis algorithms and heuristics used by the meta-application 20 to model the behavior of the deployment 10 and to convert raw telemetry into "predicates" that are used to detect and represent specific conditions, such as "slow CPU" or "almost full disk," will now be described.

The meta-application 20 utilizes telemetry streams from a managed application 10 to determine the health of said application, possibly using metadata about appropriate telemetry for each application component from application model 24. The algorithms 25 are preferably configured to detect whether a specific stream of telemetry shows the existence of specific anomalous states in the deployment 10 or a component thereof, such as an unusually slow CPU, a hard disk that is almost full, message queues that are growing at a high rate, or email delivery that is slow. The feature detector 36 preferably uses the algorithms to mathematically analyze the raw numerical telemetry to determine if certain anomalous conditions are met. This section describes some of the techniques used to analyze non-cyclical and non-linear telemetry signals.

A preferred method uses a "classification algorithm," a "modeling algorithm," and "control charts." The classification algorithm recognizes telemetry signals or streams as belonging to one of a plurality of signal categories, each category describing the general type of signal. For example, in one embodiment the classification algorithm uses signal categories entitled "constant," "flat," "integral," "polynomial," "noise," "poles," or "times" (or alternative titles) defined as described below. A different set of predefined signal categories may alternatively be used. The modeling algorithm, which can be recursive with respect to itself and the classification algorithm, computes numerical parameters of a mathematical model of a telemetry signal (e.g. mean and standard deviation of a normal distribution modeling white noise.) The mathematical models are used for "baselining" and feature detection.

Figure 9:
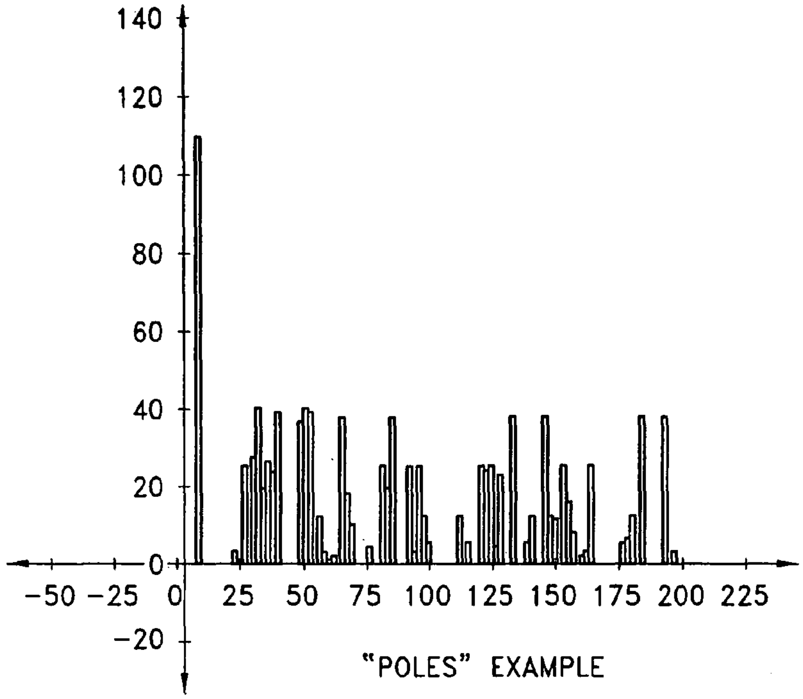
FIG. 9 is a graph of a state metric telemetry signal of a "poles" type of signal category.
Figure 10:
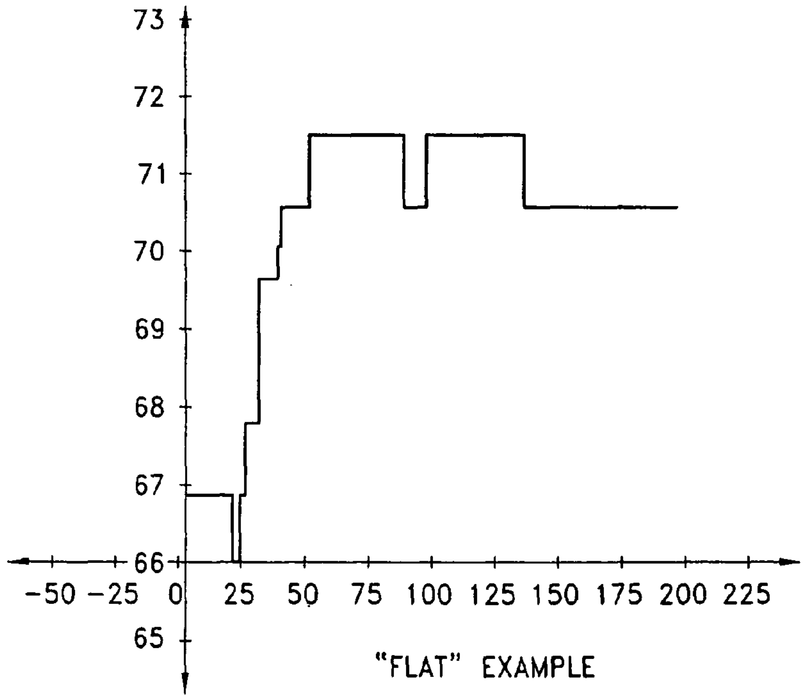
FIG. 10 is a graph of a state metric telemetry signal of a "flat" type of signal category.
Figure 11:
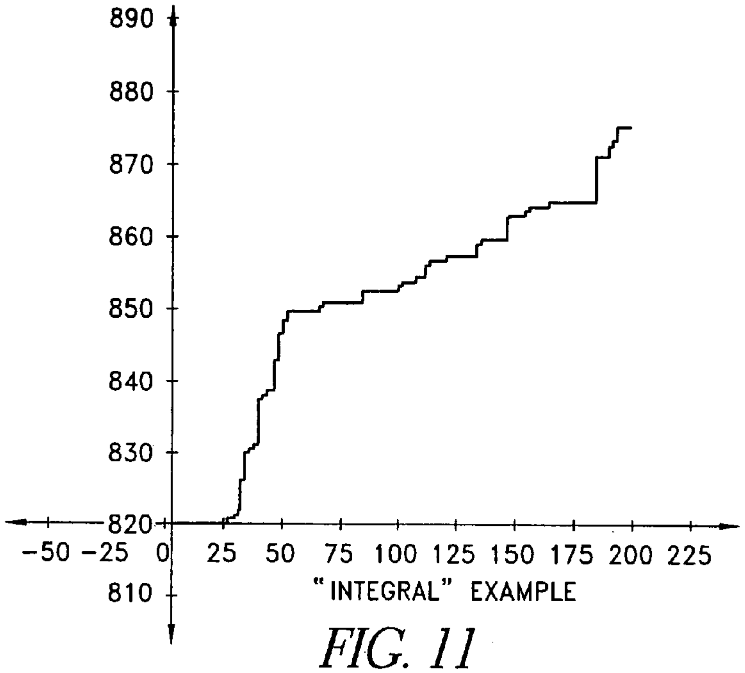
FIG. 11 is a graph of a state metric telemetry signal of an "integral" type of signal category.

The classification algorithm dynamically analyzes a stream of numerical data to mathematically determine the signal category to which it belongs. The signal categories describe fundamentally different types of signals. A constant stream contains the same numerical value repeated forever (e.g., 5,5,5,5,5,5, . . . ). A pole stream tends to have two classes of values. The majority of the pole signal values are in one numerical range (e.g., zero), and a minority of the pole signal values are in another numerical range. FIG. 9 shows an example of a poles signal. A flat stream tends to contain runs of the same numerical value (e.g., 5,5,5,5,5,5,5,5,7,7,7,7, 7,7, . . . ). FIG. 10 shows an example of a flat signal. An integral stream either constantly increases or decreases in value. FIG. 11 shows an example of an integral signal. A polynomial stream can be modeled by one specific polynomial function (e.g., $x^2+2x+2=0$). A noise stream contains random values that are not easily described by a mathematical equation (e.g., the differences between the nth and n+1th values tend to be large and the derivatives are also noisy). A times stream is the product of two other streams, as in the expression $Stream_1*(1+Stream_2)$.

The meta-application 20 preferably identifies each of these signal categories by its specific mathematical properties. Accordingly, the meta-application 20 conducts a test for each category, where each test may be generated as a result of processing knowledge stored in the knowledge base 22 or generated dynamically by a higher-level feature detector. As each telemetry feed is monitored, it is classified into one of these categories by conducting each category's test. The integral, poles, and times categories are compound or recursive, meaning that they build upon another category, such as polynomial. So a feed might be categorized as a "times" feed combining polynomial and noise streams.

The modeling algorithm then uses these signal category classifications to generate a description of each feed. Each mathematical category has its own specific set of statistical measures to describe the values in the feed. The constant category only has the value of the numbers in the feed. The flat category models both the various values of the feed and the size of the changes in the feed when they occur. So the flat category model is recursive and is composed of a model representing the various y values of the feed and another model representing the size of the non-zero changes in y. The integral category model records whether the feed is increasing or decreasing and the recursive model representing the first derivative of the stream. The polynomial model records the equation that describes the telemetry stream. The noise model is represented by either a Gaussian or Gamma distribution. The poles model contains a recursive model representing the height of the "spikes" or "poles" of this telemetry feed. The times model records the two recursive models used to represent this telemetry feed. These values are computed and can be used to detect abnormal conditions that are registered in the telemetry database 26 as features. These mathematical models can be updated periodically (either manually or by the meta-application 20) or dynamically (by the meta-application), based upon new telemetry streams and/or modifications of the formulae for computing numerical parameters of the mathematical models. Such modifications may be based upon, for example, knowledge learned by analyzing the historical use of the deployed software application 10, feedback received from persons that use or control the deployed software application 10, and/or new publicly available knowledge of the software application 10. For each component of the model (poles, flats, etc.), a type of "control chart" (described below) can be created to profile that portion of the telemetry signal.

The classification or assignment of a telemetry signal to a signal category can be accomplished dynamically by the meta-application 20 based upon an analysis of a received telemetry signal. Alternatively, the classification or assignment of a telemetry signal to a signal category can be done prior to monitoring the telemetry signal, based upon knowledge of the particular metric being monitored. For example, it may be known beforehand that, in a given deployment of the software application being managed, a particular metric is always constant (the "constant" signal category) or always oscillating for short periods between different values ("flats"). In such cases, the meta-application 20 can be configured to assign this telemetry signal to the known signal category without executing the classification algorithm for this particular metric.

Numerical Charts

The analysis subsystem 30 is preferably configured to generate numerical charts for analyzing real-time telemetry streams, for the purpose of detecting features that can be entered into the meta-application's Problem Logic circuitry (described below). In a preferred embodiment, there are three types of numerical charts: control charts, trend charts, and seasonality charts.

Figure 12A:
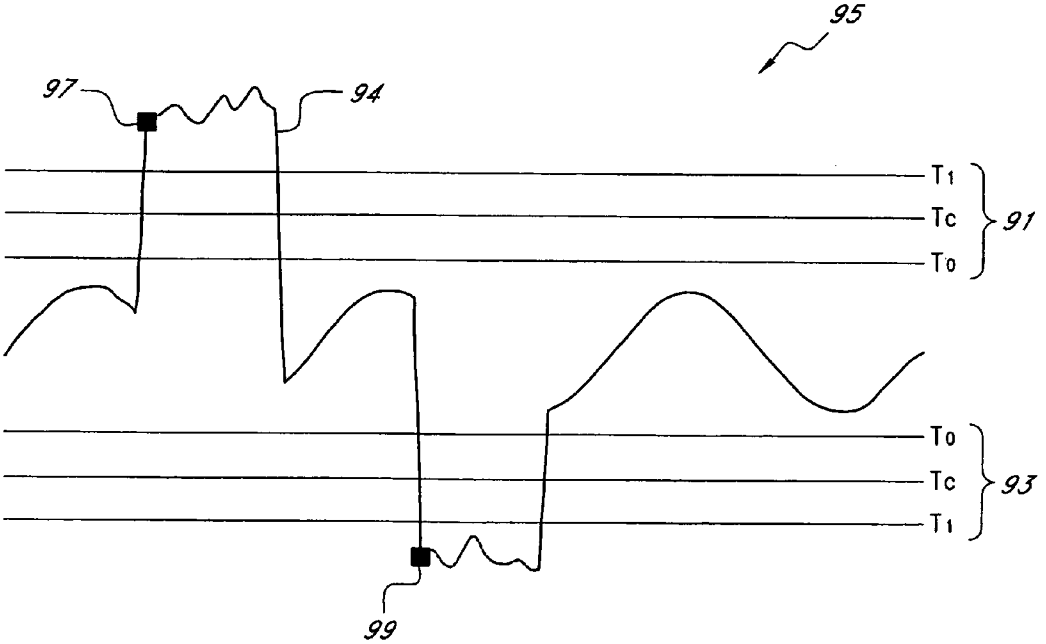
FIG. 12A is a control chart of a telemetry signal of a state metric, in accordance with one embodiment of the meta-application.

FIG. 12A shows an example of a control chart 95 for a given telemetry metric. The control chart 95 shows a telemetry signal 94. A normalcy range of the telemetry signal 94 is characterized by an upper threshold 91 and a lower threshold 93. The upper threshold 91 is characterized by an upper zero-confidence level $T_0$ (feature confidence equals 0), an upper trigger-confidence level Tc (feature confidence equals c), and an upper full-confidence level $T_1$ (feature confidence equals 1), which are described below. Similarly, the lower threshold 93 is characterized by a lower zero-confidence level $T_0$ (feature confidence equals 0), a lower trigger-confidence level $T_c$ (feature confidence equals c), and a lower full-confidence level $T_1$ (feature confidence equals 1). Skilled artisans will appreciate from the teachings herein that control charts can have several different forms, depending upon the telemetry signal. In the illustrated chart 95, the telemetry signal 94 reaches points 106, which can be considered as anomalous behavior of the measured metric and can be registered as features in the telemetry database 26.

When the real-time telemetry signal 94 crosses above the upper threshold 91 or below the lower threshold 93 (and more preferably the trigger-confidence levels $T_c$ thereof), the feature detector 36 preferably generates a corresponding feature. Fine-grained control can be provided by specifying a preprocessing smoothing average window, a required "sustain time" for a deviation, and a trigger confidence level. Thresholds of numerical charts can measure a telemetry signal absolutely or statistically.

Figure 12B:
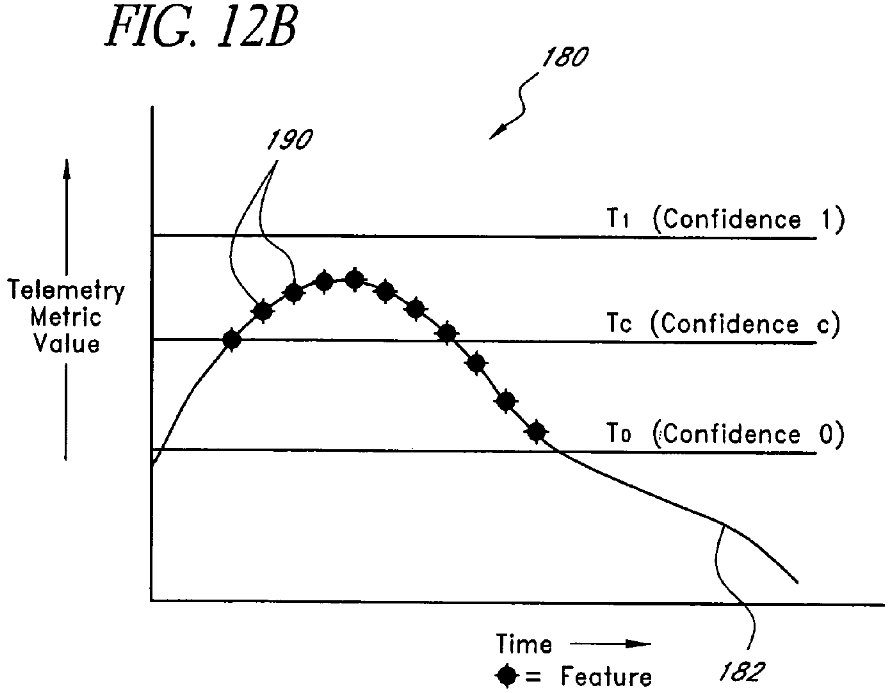
FIG. 12B is a graph showing an upper portion of a normalcy range of a control chart.

To further illustrate the theory and approach behind numerical charts, consider FIG. 12B, which shows a graph 180 that represents an upper threshold of a normalcy range of a control chart. In this graph 180, the y-axis is the value of a specific telemetry metric, and the x-axis is time. The graph shows a telemetry stream 182 of a state metric, with confidence levels $T_0$ (confidence equals 0), $T_c$ (confidence equals c), and $T_1$ (confidence equals 1) superimposed thereon. The confidence levels $T_0$, $T_c$, and $T_1$, which respectively indicate feature confidence values of 0, c, and 1, can be computed based on mathematical models, described above. These confidence values are feature predicate confidence values (see Confidence subsection of Detection of Problem States section below). A plurality of points 190 on the telemetry stream 182 represent detected features associated with the particular state metric being monitored.

Thus, in a numerical chart, a monitored metric's normalcy range preferably has a low threshold and a high threshold (either threshold is optional). A threshold is an interval $[T_1, T_0]$ or $[T_0, T_1]$. The feature detector 36 (FIG. 1) preferably initiates feature generation at the "trigger" confidence level $T_c$, and preferably continues generating features until the confidence returns to 0. Feature confidence can ramp up linearly within $[T_0, T_1]$ (i.e., confidence is 0 at $T_0$, c at $T_c$, and 1 at $T_1$). The problem detector 38 can preferably accept a profusion of features generated with different confidence values. Since the trigger confidence is c, the first feature generated by a numerical chart will have a confidence greater than or equal to c. In the control chart 95 of FIG. 12A, the signal 94 crosses above the upper trigger-confidence level $T_c$ and subsequently remains above the upper zero-confidence level $T_0$ for the chart's sustain period, resulting in the generation of a feature 97. The signal 94 then crosses below the lower trigger-confidence level $T_c$ and subsequently remains below the lower zero-confidence level $T_0$ for the sustain period, resulting in the generation of a feature 99. The confidence of a feature reported from a chart is preferably the feature predicate confidence that is eventually seen by Problem Logic (discussed below). Numerical charts and Problem logic preferably share the same definition of "confidence."

Figure 12C:
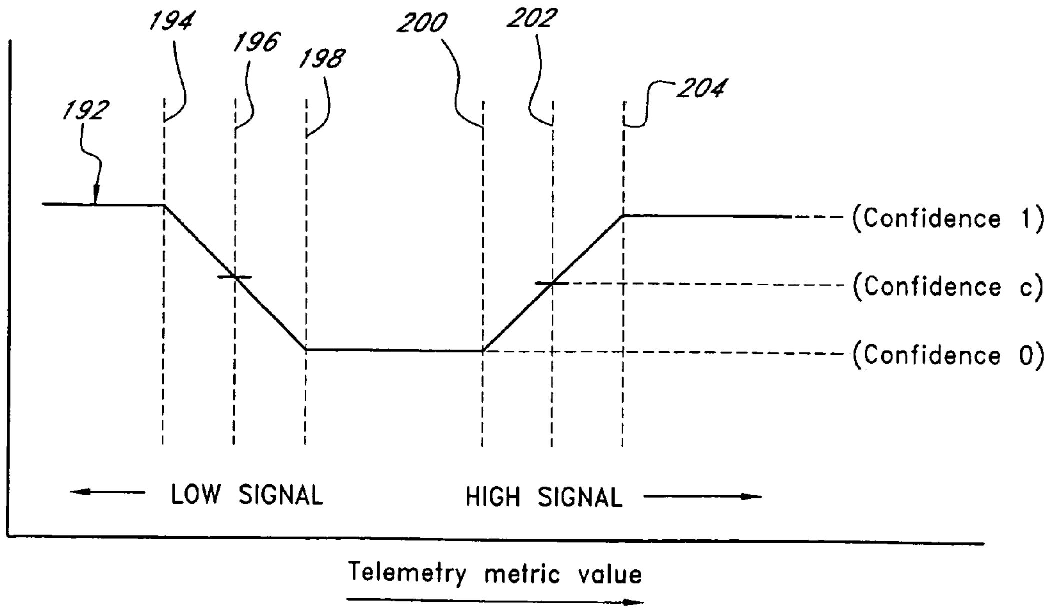
FIG. 12C is a feature confidence curve of a telemetry signal.

FIG. 12C shows a "confidence curve" 192 mapped to the telemetry value. The confidence curve 192 is a piecewise linear function clamped to interval [0,1]. Superimposed on the confidence curve 192 are vertical dotted lines 194, 196, 198, 200, 202, and 204. The dotted lines 200, 202, and 204 respectively represent a zero-confidence level, a trigger-confidence level, and a full-confidence level associated with an upper threshold of the telemetry signal. In one embodiment, the feature detector 36 generates new features with corresponding confidence values according to the following methodology, it being understood that other methods are also possible. When the monitored state metric has a value between the lines 198 and 200, the confidence value is zero, and therefore the feature detector 36 preferably does not generate any new features. When the monitored metric increases above the line 200 but is below the line 202, the confidence of a feature is between 0 and c, and the feature detector 36 can be configured to (but preferably does not) generate new features with such confidence values. When the monitored metric increases above the line 202, the confidence of a new feature is now c, and the feature detector 36 preferably begins generating new features with appropriate confidence values until the telemetry signal decreases below an arbitrary value, such as the line 200 that represents zero confidence. A similar methodology can apply with respect to the dotted lines 194, 196, and 198.

In a preferred embodiment, the variables used by numerical charts are the following: Tau ($\tau$) is a parameter that determines the weights that are applied in the calculation of mu ($\mu$) and sigma ($\sigma$). Use $\tau=\infty$ to compute ordinary mean and sigma, and use $0<\tau<\infty$ to emphasize recent history as done in an EWMA chart which uses an exponentially weighted moving average. Mu ($\mu$) is the mean of the data added to the chart. Sigma ($\sigma$) is the standard deviation of the data added to the chart. "Forget Samples" ($N_F$) is the maximum number of samples retained in the memory of the chart. When this limit is reached, adding a new point will push out the oldest point. "Forget Time" ($T_F$) is the maximum time that a sample is retained in the memory of the chart. When the time coordinate x of a point is too old compared to the time coordinate x of the most recent point, then the old point is purged.

"Low" refers to a chart's low threshold, which is specified by a triple $[true, L_1, L_0]$ or $[false, L_c, c]$. In the first form, $L_1$ is the confidence=1 level, $L_0$ is the confidence=0 level, and confidence ramps down linearly on threshold $[L_1, L_0]$. The width of the threshold is $\Delta L = L_0 - L_1$. In the second form, $L_c$ is a calibration level with confidence=c. The width of the interval, $\Delta L = 3\sigma$, is determined from signal history. Limits $L_0$ and $L_1$ can be calculated from $L_c$, c, and $\Delta L$, wherein $L_0 = L_c + c\,\Delta L$, and $L_1 = L_c - (1-c)\,\Delta L$. The threshold is $[L_1, L_0]$.

"High" refers to a chart's high threshold, which is specified by a triple $[true, H_1, H_0]$ or $[false, H_c, c]$. In the first form, $H_1$ is the confidence=1 level, $H_0$ is the confidence=0 level, and confidence ramps up linearly on threshold $[H_0, H_1]$. The width of the threshold is $\Delta H = H_1 - H_0$. In the second form, $H_c$ is a calibration level with confidence=c. The width of the interval, $\Delta H=3\sigma$, is determined from signal history. Limits $H_0$ and $H_1$ can be calculated from $H_c$, c, and ΔH, wherein $H_0=H_c-c\,\Delta H$, and $H_1=H_c+(1-c)\,\Delta H$. The threshold is $[H_0,H_1]$.

"Trigger Confidence" (t) is the confidence level at which feature generation is initiated. The high trigger level $H_t$ is calculated as $H_t=H_0+t\,\Delta H=(1-t)\,H_0+tH_1=H_c+(t-c)\,\Delta H$. The low trigger level $L_t$ is calculated as $L_t=L_0-t\,\Delta L=(1-t)\,L_0+t\,L_1=L_c-(t-c)\,\Delta L$. "Average Samples" ($N_A$) is the maximum number of points that will be considered in smoothing average preprocessing of the input signal. "Average Time" ($T_A$) is the maximum time that will be considered in smoothing average preprocessing of the input signal. "Sustain Samples" ($N_S$) is the minimum number of points required to sustain a positive confidence deviation before a feature is generated. "Sustain Time" ($T_S$) is the minimum time required to sustain a positive confidence deviation before a feature is generated.

In a given control chart, points $(x_i, y_i)$ are progressively added to the chart by an incoming signal. The x-coordinate is time and the y-coordinate is some measured telemetry metric. Preferably, a limited number $N_F$ of points are remembered, and points are remembered only for a limited duration of time $T_F$, where passage of time is indicated by the most recent point added to the chart. The mean (μ) and standard deviation (σ) of the data are preferably determined by exponentially weighted moving averages (EWMA):

$$\mu = \frac{\sum_{(x_i,y_i)\in C} e^{-x_i/\tau} y_i}{\sum_{(x_i,y_i)\in C} e^{-x_i/\tau}}$$

$$\sigma^2 = \frac{\sum_{(x_i,y_i)\in C} e^{-x_i/\tau}(y_i-\mu)^2}{\sum_{(x_i,y_i)\in C} e^{-x_i/\tau}}$$

The tau (τ) parameter determines the weights applied in the calculation of mu (μ) and sigma (σ). In order to weight them evenly, it is preferred to use $\tau=\infty$. In order to emphasize recent telemetry history, it is preferred to use $0<\tau<\infty$. A z-statistic can be defined as follows:

$$z = \frac{y_i-\mu}{\sigma}$$

The z value can be reported when a feature is detected and registered.

Detecting Trends

In a preferred embodiment, the meta-application 20 is also configured to profile application performance trends and, in appropriate circumstances, detect anomalous or problematic trends in certain telemetry signals. It is noteworthy that sources of knowledge (such as Microsoft™ Knowledge Base Articles) sometimes specify the existence of trends as conditions precedent for the recognition of problems. In preferred embodiments, the meta-application 20 provides "trend charts" that can be used to detect rising trends and/or descending trends. When a trend is detected, a feature is preferably generated and registered in the telemetry database 26.

Figure 13:
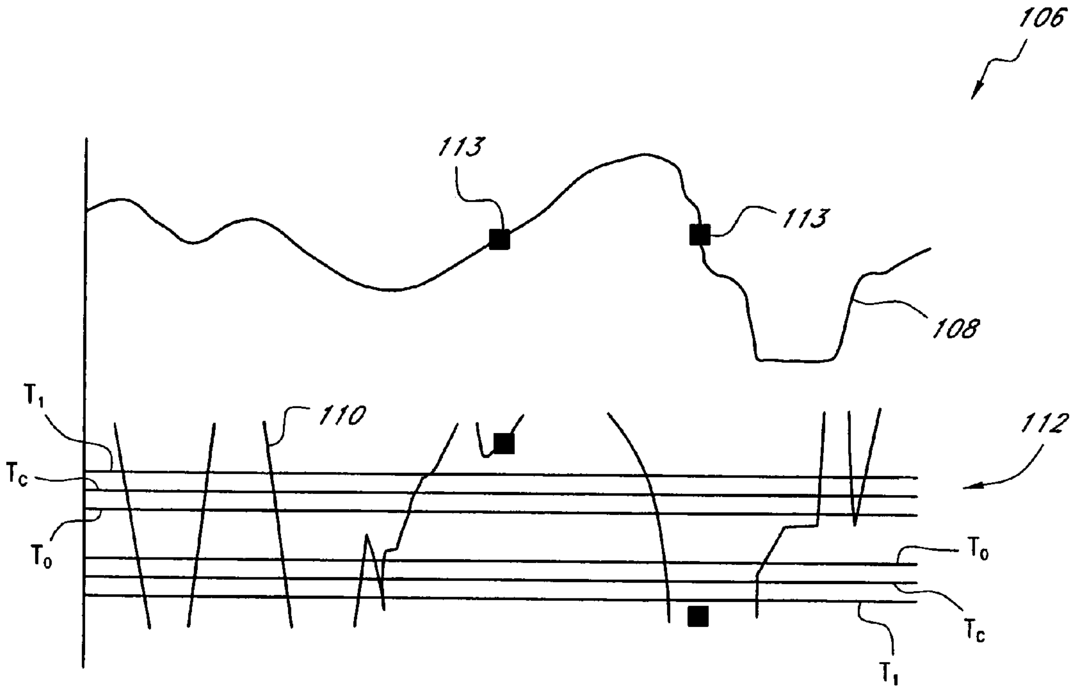
FIG. 13 is a trend chart of a telemetry signal of a state metric, in accordance with one embodiment of the meta-application.

FIG. 13 shows a trend chart 106 for a monitored metric. The chart 106 includes two different bands. The top band shows an incoming telemetry signal 108 for the monitored metric. The lower band shows a waveform 110, which is the incoming signal 108 processed to detect "rising trends" and "descending trends." The processed signal 110 is fed into a control chart 112, which is similar to the chart 95 shown in FIG. 12A. Accordingly, the upper and lower thresholds of the control chart 112 are each characterized by a zero-confidence level $T_0$ corresponding to feature confidence of zero, a trigger-confidence level $T_c$ corresponding to feature confidence of c, and a full-confidence level $T_1$ corresponding to feature confidence of 1. The signal processing generates a positive or negative pulse when a rising or descending trend is detected. The squares 113 are features.

A trend can occur when the input telemetry signal is strictly monotonic for a sufficient number of samples and time. Trends occur when the derivative (slope) of the smoothed input telemetry signal is uniformly positive or negative for a sufficient number of samples and time (the sustain samples $N_S$ and sustain time $T_S$). The trend chart detects trends near their beginning points (the portions of the signal at which the trends begin) by effectively passing the derivative of smoothed input signals into a control chart.

Seasonality

Many times, cyclic behavior can be observed in the performance of deployments 10 of infrastructure applications due to the patterns of human users. For example, for a deployment 10 of Microsoft Exchange™, every morning at 9 am mail servers might generally experience heavy load because everyone checks their email when they arrive at work. In another case, a large batch of emails may be sent at the end of each quarter to announce results to investors and shareholders of a financial company. In addition, managed applications 10 can have internally scheduled activities, such as daily backups, that can impact performance.

In these instances, the meta-application 20 is preferably configured to profile cyclic application behavior, so that it recognizes these cyclic surges in use and does not report heavy load as a performance problem. In a preferred embodiment, the analysis subsystem 30 (preferably the feature detector 36) analyzes metrics' telemetry signals for each of a plurality of relevant time cycles (e.g., day, week, month, and year). A data set for each telemetry feed is preferably built, where the dimension representing time is normalized by computing the modulo of the time cycle. For example, Monday at 3 pm can be normalized to 3 pm on day 2 (assuming Sunday is day 1) for a one-week time cycle.

Figure 15:
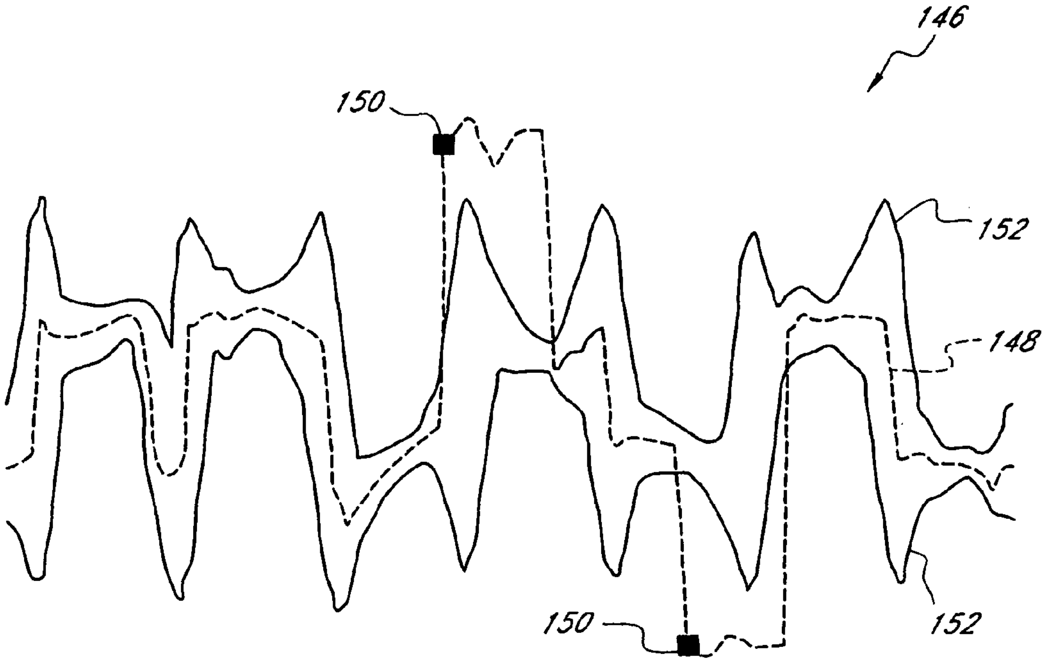
FIG. 15 is a seasonality control chart for a telemetry signal of a state metric, in accordance with one embodiment of the meta-application.

FIG. 15 shows a "seasonal control chart" 146, which is preferably generated by the analysis subsystem 30 of the meta-application 20 for some or all of the monitored state metrics from the deployment 10. For example, seasonal control charts can be generated for those state metrics that are known or observed to behave cyclically. The chart 146 shows an input telemetry signal 148 for a given state metric (shown as a dotted line), and a normalcy band indicated by two lines 152. The normalcy band represents expected norms for a specific time of the, e.g., day, week, month, or year. In a preferred embodiment, if a telemetry data value falls outside the normalcy band, then corresponding features 150 (shows as squares) are registered, such as in the telemetry database 26. In a preferred embodiment, each of the upper and lower thresholds of the normalcy band can be characterized by a zero-confidence level $T_0$ (corresponding to a feature confidence of zero), a trigger-confidence level $T_c$ (corresponding to a feature confidence of c), and a full-confidence level $T_1$ (corresponding to a feature confidence of 1). It will be understood that the confidence levels preferably comprise fluctuating waveforms. For ease of illustration, FIG. 15 only shows the full-confidence levels $T_1$.

In one embodiment, the waveforms of the illustrated seasonal control chart 146 are computed according to the following method. However, skilled artisans will understand from the teachings herein that other methods for computing seasonality waveforms can be used. In one embodiment, the analysis subsystem 30 lets a variable P be the period of the seasonal control chart (e.g. the time cycle) C. The seasonal control chart contains points ($x_i$, $y_i$). The distance between two times x and $x_i$ is given by the following equation:

$$d(x, x_i) = \left|(x - x_i) - \text{round}\left(\frac{x - x_i}{P}\right)P\right|$$

This is ordinary Euclidean distance reduced modulo P. Kernel smoothing uses a nearest neighbor approach to determine the smoothing function. A function S(x) is defined as the c closest points of C to x, the c nearest points ($x_i$, $y_i$) to x as measured by d(x, $x_i$). The "bandwidth" about x is given by:

$$\Delta(x)=\max(d(x,x_i),(x_i,y_i)\in S(x))$$

The weights of the kernel smoother are $$w(x, x_i) = W\left(\frac{d(x, x_i)}{\Delta(x)}\right),$$

where W(t) is an even function that peaks at t=0 and approaches zero as |t|→0. The function W(t) can be chosen as:

$$W(t)=(1-t^2)^2$$

If mu (μ) is the mean of the data in the chart 146, then the μ function μ(x) is given by:

$$\mu(x) = \frac{\sum_{(x_i,y_i)\in S(x)} w(x, x_i)y_i}{\sum_{(x_i,y_i)\in S(x)} w(x, x_i)}$$

If sigma (σ) is the standard deviation of the data in the chart 146, then the sigma function σ(x) is given by:

$$\sigma(x)^2 = \frac{\sum_{(x_i,y_i)\in S(x)} w(x, x_i)(y_i - \mu)^2}{\sum_{(x_i,y_i)\in S(x)} w(x, x_i)}$$

Mu and Sigma are finally used to determine if a future data point falls outside of expected norms for a specific time of the day, week, month, year, etc. When a telemetry signal falls outside of these control lines (normalcy bands), a feature is generated, just like the control chart model (FIGS. 12A-C).

Discrete Signals

Some telemetry signals are "discrete," meaning that they are made up of ($x_i$,$y_i$) points where $y_i$ take on discrete values. For example, signals consisting of service state values (stopping, paused, running) or event ID's are discrete signals. Since discrete values are not necessarily numerically comparable, numerical charts may not apply to discrete signals.

A "discrete chart" can be used to convert real-time discrete signals into features that can be analyzed by the problem detector 38 (FIG. 1). In one embodiment, a discrete chart (or an associated algorithm) works by checking whether measured y, telemetry values are members of a specific set D of discrete values. If the $y_i$ values of the real-time discrete signal are members of the set D for a sufficient number of samples and a sufficient amount of time (the sustain samples $N_S$ and sustain time $T_S$) then a feature is generated.

Figure 14:
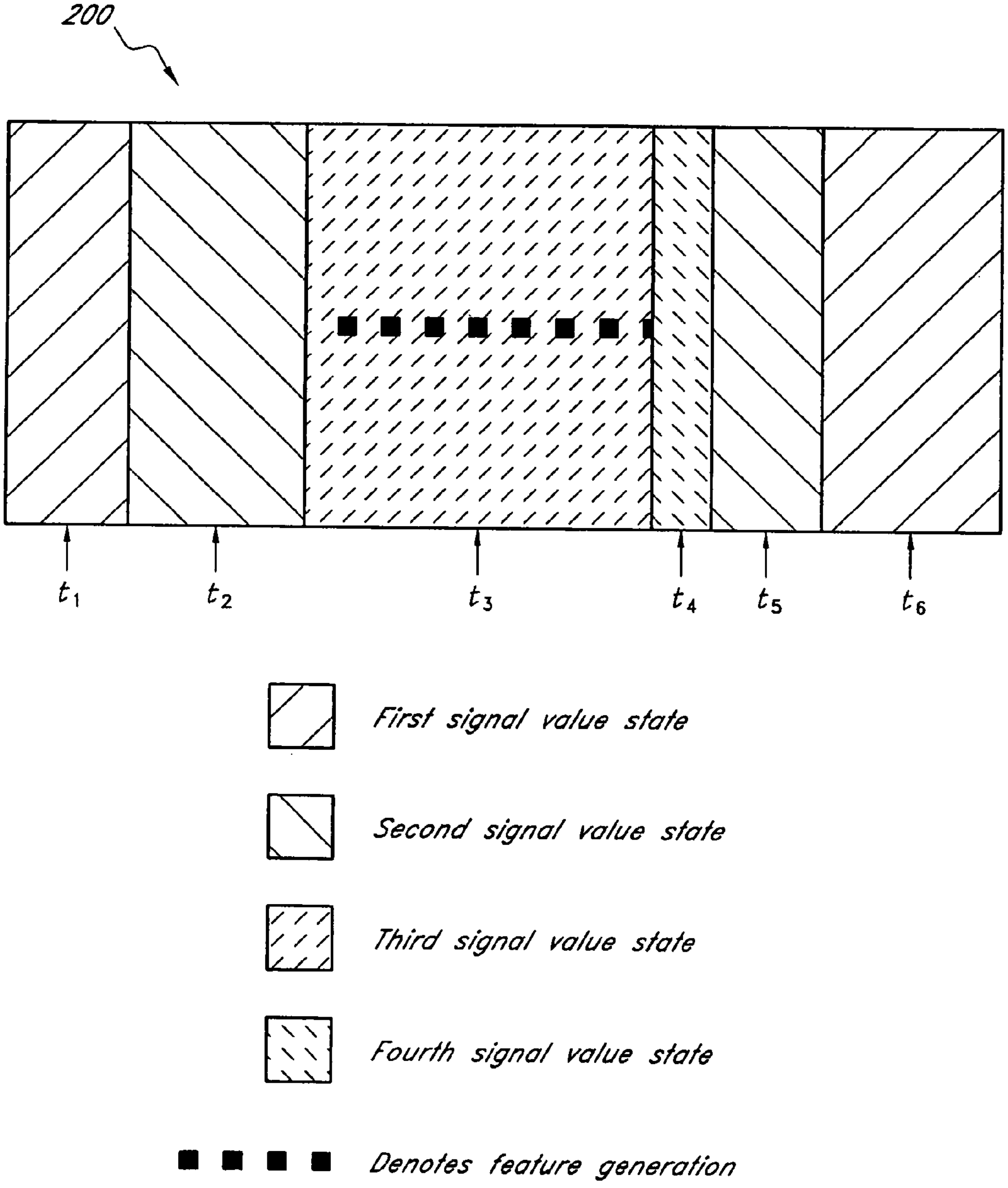
FIG. 14 is a discrete chart for a telemetry signal having discrete values, in accordance with one embodiment of the meta-application.

FIG. 14 shows discrete chart 200 in accordance with one embodiment. The illustrated discrete chart 200 analyzes a discrete telemetry signal that is able to have, at any given time, one of four different values. The possible values are denoted as 203, 205, 206, and 208 (illustrated as rectangles with different cross-hatchings). An algorithm tests the telemetry signal for membership in the signal value states 203, 205, 206, and 208. In this example, during time intervals $t_1$, $t_2$, $t_3$, $t_4$, $t_5$, and $t_6$, the telemetry signal has signal values 203, 205, 206, 208, 205, and 203, respectively. Suppose the algorithm at work is interested in instances in which the telemetry signal has value 206. Accordingly, features 210 (represented as a broken horizontal line) are generated during interval $t_3$. Features 210 are preferably only generated if the telemetry signal has value 206 for a sufficient amount of time (the sustain time $T_S$) or a sufficient number of samples (sustain samples $N_S$). Skilled artisans will appreciate that discrete charts can have a variety of different forms and can test for any number of different signal values.

Other types of feature detection methods can also be employed, such as monitoring application error logs and conducting unit tests (e.g., by using "shims") on components of the application deployment 10. A few examples of features are shown in the table below, for an embodiment in which the meta-application 20 monitors and manages a deployment 10 of Microsoft Exchange™. In the table, each row is a specific feature or "feature predicate" (explained below in the Problem Detection section). The "Name" is the name of the feature. The "Type" describes the method employed to detect the feature. The "Telemetry Meter" is the specific state metric from which the feature is detected. It will be appreciated that a feature need not always stem from a particular monitored state metric.

| Name | Type | Telemetry Meter | Description |
|---|---|---|---|
| CPU | Control Chart | Machine.CPU | Uses the control charts to determine "abnormal" behavior in CPU utilization |
| Error | Error Log | N/A | Creates a feature whose properties contain the information from the error message in the Exchange log |
| Process Thread Count | Control Chart | Process.ThreadCount | Uses the control charts to determine "abnormal" behavior in the number of threads used by a specific process |
| CPU | Trend Chart | Machine CPU | Determines when the CPU |

-continued

| Name | Type | Telemetry Meter | Description |
|---|---|---|---|
| Increasing | | | utilization is consistently increasing |
| Login Shim | Unit Test/ Shim | N/A | Determines if it is possible to login to an Exchange mail using OWA (Outlook Web Access ™) |
| Mail | Flow Seasonal Control Chart | MailMessagesPerSecond | Determines if the current mail flow is not "normal" |

Principle Component Analysis

In one embodiment, the analysis subsystem 30 first uses Principle Component Analysis (PCA) to reduce the dimensionality or the amount of data in a set of telemetry signals fed into the feature detector 36. PCA is a mathematical technique for reducing the dimensionality of a dataset without losing useful information. Thus, a plurality of metrics gathered at each specific point in time can collated into one data point with values for each dimension (e.g., CPU, page faults per second, etc.), including time. This data set can be fed into a PCA algorithm to produce the reduced data set. The reduced data set has the same basic trends and characteristics as the input telemetry, but much less data. Thus, PCA can be considered a "noise eliminator." PCA methods are well known in the art.

Prediction and Resource Management

Prediction is the act of guessing future values for some stream of telemetry data. The meta-application 20 can use prediction methods for a variety of purposes associated with managing a deployment 10, such as predicting the exhaustion of fixed resources (e.g., disk space), optimizing resource utilization (together with "provisioning"), and performance optimization. Predictions can be made about specific state metrics, the prediction of which might require multiple streams of telemetry. For example, a potential use of prediction is to predict the amount of free disk space given a list of disk performance metrics such as "disk writes/per second" or "current disk usage." In this example, several streams of disk-related telemetry would be used as input.

In another embodiment, the analysis subsystem 30 predicts the future behavior of a state metric by computing a mathematical model of the metric's telemetry signal as a function of time, as described above in the Feature Detection section of the present application, and then simply computing the metric's value at a given future time t. Skilled artisans will appreciate that other types of prediction methods can be employed.

As mentioned above, three exemplary usage cases for the prediction algorithm are predicting the exhaustion of fixed resources, optimizing resource utilization or "provisioning," and performance optimization. In predicting the exhaustion of fixed resources, a specific metric such as free disk space or network utilization can be predicted to warn of potential problems with the current deployment 10. For example, the meta-application 20 might predict that network traffic is growing at a certain rate and that in four to six months problems may arise from network bottlenecks.

The second case involves provisioning. Provisioning is the process of determining the ideal way to distribute resource usage across several resource providers (e.g., the CPU is a resource provider). Future resource utilizations are used as the input to the provisioning algorithm instead of the current rates of resource utilization. This allows the meta-application 20 to better predict good distributions of resources for some time in the future, instead of an ideal distribution for the current situation.

The third case involves optimization of the managed application 10. Usually, infrastructural applications have a variety of tuning parameters that can be used to improve performance in different hardware and network environments. For instance, the size of the TCP (Transmission Control Protocol) sending queue in the OS network stack will have different optimal values in different networks. Accordingly, the meta-application 20 can use the prediction algorithm to determine the optimal settings for these tuning parameters.

Detection of Problem States

Problem Logic Overview

In preferred embodiments, the meta-application 20 stores, in its knowledge base 22, definitions of application "problems," which are known problematic states of the managed application 10. Once the meta-application 20 has identified unusual or anomalous features, the problem detector 38 uses problem identification algorithms to attempt to match logically defined combinations of features to problems. The particular knowledge encoding methodology and knowledge evaluation methods that the meta-application 20 uses to detect problems is generally referred to herein as "Problem Logic."

Problem Logic preferably uses an advanced "incremental query processor" configured to very quickly match a logical combination of features to problems defined by the Problem Logic rules stored in the knowledge base 22. When a feature is triggered, Problem Logic preferably uses a "discrimination network" (described below) to quickly determine which logic rules are potentially affected; however, a discrimination network is not absolutely required. Problem Logic may also evaluate raw telemetry data for purposes of detecting problems. Also, as features are added and removed from the feature list (preferably stored in the telemetry database 26), the query processor reconfigures itself to optimize problem detection. Matched problems are added to a "problem queue" (PQ). Each problem is assigned a "severity" and matched problems are sorted by severity in the problem queue. The meta-application 20 can change problem severity as it rates the impact of problems on the deployment 10 and also as it gets updates from the update server 56 (FIG. 2). Also, the associated feature that caused the problem may bump up the severity of the problem. For example, a feature resulting from a telemetry signal diverging from its baseline normalcy band by six standard deviations might produce a problem with a higher severity than if the signal diverged from its normalcy band by only two standard deviations.

This section now proceeds by describing the theory behind the logical and syntactic structure of the Problem Logic used in a preferred embodiment of the meta-application 20. The Problem Logic is embodied in the logic rules stored in the knowledge base 22. In a preferred embodiment, the Problem Logic employs a language that is a modification of First Order Logic, and which includes temporal, causal, and modal operators. This language is used to encode the known problems' descriptions into the logic rules, which Problem Logic executes to determine if any of the encoded problems are currently present within the deployment 10.

The meta-application 20 is preferably configured to analyze and quickly respond to large amounts of data. Accordingly, Problem Logic is preferably fast enough to be used in a real-time system. To accomplish this goal, Problem Logic is implemented by logic circuits similar to the hardware logic circuits on the computer chips of modern day computers, which are known to be fast. The Problem Logic circuits are not quite identical to hardware logic circuits because Problem Logic circuits push more than single bits of knowledge at a time along their "wires," which are preferably virtual.

Some definitions are now provided for ease of understanding of the following subject matter, which describes only a preferred embodiment of the Problem Logic. A logic rule or simply "rule" is a logical formula composed of predicates, logical operators (such as AND, OR, THEN, etc.), mathematical operators (such as less than, difference, sum, etc.), free variables, and constants. The formula describes how to recognize problems of the managed application 10. A "predicate" is a rule component that represents the existence of a single concept within the deployment 10. A predicate has a name and some number of arguments (which can be free variables or constants). An example of a predicate is server_version(?server, "6.5"), wherein "server_version" is the predicate's name, and "?server" and "6.5" are the arguments. In this example, "?server" is a free or "unbound" variable representing a server 12 (FIG. 1) of the deployment 10, and "6.5" is a constant representing version 6.5 of the server. A "bound" variable is a free variable in a rule that has been assigned a constant value. An "unbound" variable is a free variable in a rule that has not been assigned a value and thus can match any value of the right type.

A "closed atomic formula" is a predicate whose arguments are all constants (i.e., none of the arguments are free variables. The meta-application 20 generates closed atomic formulae usually by analyzing the deployment 10 and producing predicates that represent deployment state. A "gate" is an internal Problem Logic construct that implements a rule connective (like AND gates or OR gates). Inputs pass through gates as the rule's formula is evaluated. Gates process the inputs according to the gate function (AND, OR, etc.) and then produce a single output (which may be an input to another gate). In some embodiments, rule confidence levels (discussed below) are calculated and propagated within the gates.

An application model object is a single entity instance from the schema of the application model 24.

"Rule triggering" or "matching" refers to the situation in which the problem detector 38 has successfully evaluated a rule's logical formula and the evaluation has returned a value of "True." This means that the Problem Logic has detected a problem within the deployment 10. There can also be a confidence value on the rule. "Predicate triggering" refers to the situation in which a predicate is able to determine all possible instances in the deployment 10 that have its current set of arguments and can feed all of these instances into the Problem Logic.

A predicate's "contribution" is the importance of the predicate in a rule, relative to all of the other predicates in that rule. A predicate's "need" can have two states: "required" and "optional". A "required predicate" of a rule is a predicate that must be true in order for the rule to make sense and be true. Typically, most predicates are required. An "optional predicate" of a rule is a predicate that need not be true for the rule to be true. In other words, the rule will still make sense and match if the optional predicate is false. If the predicate is true then the "true" evaluation of the rule will have higher confidence. The concept of contribution is discussed more fully below. A predicate's "significance" is used to calculate whether a non unit confidence rule triggering is a false positive. The concept of significance is discussed more fully below.

A "constant confidence" is a value attached to a constant, which indicates how strict a match should be. For example, if a predicate contains an argument "2.0" with a low assigned confidence, then a value of 1.9 or 2.1 might still match. If the confidence is high, then perhaps only a value of 2.0 will match. A "predicate confidence" is a value attached to a predicate, which indicates the degree of truth or confidence attributed to the predicate. A "rule confidence" is a value attached to a rule, which indicates the degree of truth or confidence attributed to a match of the rule. The concept of confidence is discussed more fully below.

An example will help illustrate the Problem Logic approach. Consider the following logical formula that defines a logic rule:

OR(AND(P(1,?x),Q(2,?x)),AND(P(2,?x),Q(1,?x)))

Figure 16:
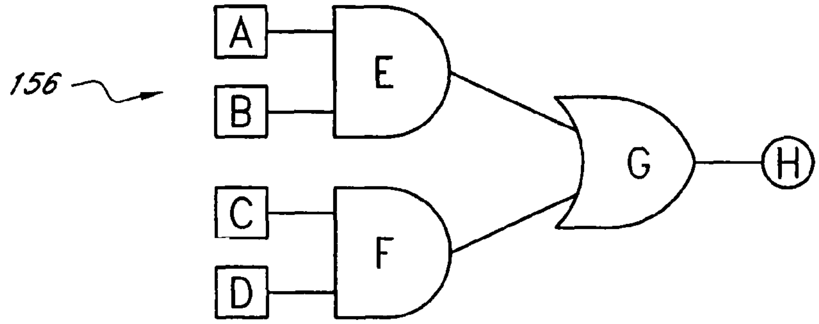
FIG. 16 is a Problem Logic circuit for evaluating a logic rule.

FIG. 16 shows a Problem Logic circuit 156 for this formula, comprising gates A-H. The patterns associated with the gates are shown in the following table:

| Gate | Pattern |
|---|---|
| A | P(1,?x) |
| B | Q(2,?x) |
| C | P(2,?x) |
| D | Q(1,?x) |
| E | AND(P(1,?x),Q(2,?x)) |
| F | AND(P(2,?x),Q(1,?x)) |
| G | OR(AND(P(1,?x),Q(2,?x)),AND(P(2,?x),Q(1,?x))) |
| H | OR(AND(P(1,?x),Q(2,?x)),AND(P(2,?x),Q(1,?x))) |

The logic circuit 156 consists of four "atomic gates" A-D (indicated as squares), two AND gates E and F, one OR gate G, and one rule gate H (indicated as a circle). The patterns of the atomic gates are the atomic formulas P(1,?x), Q(2,?x), P(2,?x), and Q(1,?x) that appear as predicates in the formula defining the rule. The names of the predicates are P and Q. Each predicate contains two arguments: a constant (either 1 or 2) and a free variable ?x. The pattern of each atomic gate is an "open atomic formula," because it contains at least one free variable as an argument.

The operation of Problem Logic circuit gates is now described. The Problem Logic circuitry receives ground instance atomic formulae that represent states of the deployment 10. For example, in the abovementioned rule, suppose the predicate P(1, ?x) by definition refers to an instance within the deployment 10 of a server 12 (represented by ?x, a free variable argument) running version 1.0 (represented by the constant 1 argument) of a particular software program. Suppose further that the deployment 10 only includes one server 12 running this version: server1. Then a ground instance atomic formula P(1, server1) can be fed into the atomic gates of the Problem Logic circuit 156 shown in FIG. 16. Ground instance atomic formulas can be constructed based on input telemetry or information obtained from the application model 24. The ground instance atomic formulas arrive at the atomic gates A-D of the circuit 156, where there is the possibility that the pattern of an atomic gate may match the input. If the free variables of the rule can be instantiated by a variable substitution in a way that the substituted pattern becomes equal to the input, then there is a match and a "bead" of information is sent on through the Problem Logic circuit along all output wires of the atomic gate. The "bead" is preferably stamped with several pieces of information, including a time interval containing the time of arrival of the input, a confidence indicating the degree of truth of the predicate, the contribution of the predicate, the significance of the predicate, and the satisfying variable substitution.

In the logic circuit 156, if telemetry input P(1,3) is received, the first atomic gate A matches P(1,3) generating a bead of information consisting of substitution [[?x,3]] and a time interval [6:39 PM, 6:39 PM]. Once beads are placed on wires of a Problem Logic circuit, there is the possibility that they can join with beads on other wires to trigger later stage intermediate logical gates of the Problem Logic circuit.

An OR gate (e.g., the OR gate G of FIG. 16) preferably just copies any input bead it receives to its output wires. An AND gate (e.g., the AND gates E and F) preferably checks if there are compatible beads (i.e., beads that match the binding variables in common between the two formulae) on all the other input wires. For instance, in the logic circuit 156 of FIG. 16, if a bead of telemetry input P(1,3) is received at one input wire of gate E, and if a bead of telemetry input Q(2,3) is received at the other input wire of gate E, then the beads are compatible because the variable ?x is bound to 3 in both beads. If there are compatible beads on the input wires of an AND gate, the union of the time intervals and the substitutions of every set of compatible beads is used to create new beads on the output wires of the AND gate. A THEN gate preferably works similarly to an AND gate, but with the additional condition that the time interval of a bead on the first input wire of the THEN gate must precede the time interval of a bead on the second input wire of the THEN gate in order for the THEN gate to be triggered and generate output beads. A rule gate (e.g., rule gate H) preferably just prints out the information of all the beads that it receives.

Each gate preferably also takes the confidence, contribution, and significance of all the input beads and calculates the confidence, contribution, and significance of the output bead. Thus, when a bead is sent to a rule gate, there is a confidence, contribution, and significance value on that bead that represents those values for the entire rule. For example, an AND gate can take the minimum of the confidences of its inputs and assign that as the confidence of its output. An OR gate can take the maximum confidence of its inputs and assign that as the confidence of its output. Those skilled in the art will also recognize that the confidence, contribution, and significance calculations can be arbitrarily complex and can change dynamically during runtime.

The meta-application 20 preferably employs an algorithm for propagation and generation of new beads. Whenever input is read from telemetry or an application model query, the input is applied to all of the atomic gates. Alternatively, a discrimination network can be used (see below) to determine all of the atomic gates of the Problem Logic circuitry that can possibly match the incoming ground instance atomic formulae. In either case, whenever any output bead is generated, by an atomic gate or by a later intermediate gate, a pair consisting of that bead and the wire the bead can be placed on is pushed onto a "to do" list. The "to do" list then looks like this:

$$[[bead_1, wire_1], [bead_2, wire_2], \ldots, [bead_n, wire_n]]$$

The analysis subsystem 30 preferably executes a loop while the "to do" list is not empty. Each iteration of the loop pops a bead/wire pair off the "to do" list. The destination gate of the wire is then notified that the bead has arrived on the wire and the behavior function of the gate is allowed to (possibly) generate new [bead, wire] pairs that are placed on the "to do" list. Eventually, the logic circuitry acquiesces and the propagation loop terminates. Once that happens, the Problem Logic circuit is ready to read the next input.

The behavior function of a logic gate generates a finite number of new beads on its output wires in response to the arrival of a bead on an input wire. The number of these beads generated is bounded by the number of output wires times the maximum of 1 and the product of the numbers of beads on the input wires. Additionally, Problem Logic circuits do not contain loops. The finite output of logic gates in response to an input and the absence of loops ensure that the propagation loop terminates.

Rule Formats

In preferred embodiments, Problem Logic has a flexible problem logic-encoding format that allows for the most error free and expressive way to represent logic rules. The encoding preferably allows for data to be attached to any component of a rule, in order to increase expressiveness or optimize performance by tagging rule components with hints. Accordingly, constraints are preferably added to the logical formulation of a rule to allow Problem Logic to automatically determine what queries (e.g., AM queries, telemetry queries, queries for the existence of features) to make and what metrics to gather to see if the rule is relevant and capable of being matched by the deployment 10.

The components of a rule are logical connectives (AND, OR, THEN, etc.), constants, free variables, and predicates. Each predicate preferably has a predicate signature (defined by the predicate name and the number and type of arguments it requires) that defines valid uses of the predicate, data describing how the predicate interacts with a rule, and constraints describing when the predicate is most relevant. The variables have names. The constants have values.

In evaluating a rule, the meta-application 20 looks at each predicate and its arguments and checks to see if that predicate is triggerable, meaning that the predicate is able to determine all possible instances in the managed deployment 10 with the predicate's current set of arguments and can feed the Problem Logic circuitry of the problem detector 38 with all of these instances. Predicate arguments that are free variables can be bound or unbound. If a free variable is unbound, the predicate triggering mechanism will bind the free variable when it sends new instances to Problem Logic. The predicate's free variable arguments become bound when a closed atomic formula (an incoming predicate instance with no free variables) is input into the problem detector 38. In this case, Problem Logic will match the input to a predicate, and any free variables in the predicate will be bound with the corresponding value in the closed atomic formula. Predicate arguments can also be string or real number constants.

The following table describes the constructs used to generate Problem Logic rules, in accordance with one embodiment.

| RULE CONSTRUCT | DESCRIPTION |
|---|---|
| expr && expr | Logical AND |
| expr \|\| expr | Logical OR |
| expr1 THEN expr2 | Expr2 occurs chronologically after Expr1 |
| (expr) | Parentheses can group expressions |
| ?<name> | A free variable, which can be used as a predicate argument or on its own |
| value.[metadata = value] | Generic way to attach metadata to a rule value |
| value.[confidence = number] OR value.[conf = number] | Attaches a confidence to a value. The default confidence is 1.0, signifying absolute confidence that the value is correct and should be matched exactly. |
| predicate.[metadata_name = data] (arg1, arg2, . . .) | Generic way to attach metadata to a predicate in a rule |
| predicate.[contribution = number] (arg1, arg2, . . .) OR predicate. [cont = number] (arg1, arg2, . . .) | Attaches a relative contribution number to a predicate (relative to all other predicates in the rule). This number can be in any range. Problem Logic will normalize it as it calculates. The default value is 1.0 for all predicates. The args are constant values possibly adorned with a [confidence = x] tag. The args can also be free variables (denoted with a ?<variable name> construction). |
| predicate.[need = optional OR required](arg1, arg2, . . .) | Specifies if the predicate is "required" or "optional" which drives the logic gate calculations. For example, required predicates must exist in order for a bead to proceed through an AND gate but optional predicates can be missing. The args are constant values possibly adorned with a [confidence = x] tag. The args can also be free variables (denoted with a ?<variable name> construction). |
| predicate.[significance = number] (arg1, arg2, . . .) | Assigns a significance to the predicate that is used in rule confidence calculation. For example, if a rule triggers with non unit confidence and all its predicates have lower than a threshold significance then the rule is deemed a false positive and not shown to the user. The args are constant values possibly adorned with a [confidence = x] tag. The args can also be free variables (denoted with a ? <variable name> construction). |
| Any valid C expression involving predicates, free variables, values, and C operators (+, −, /, *, << (left shift), >> (right shift), <,<=, >, >=, ==) | The Problem Logic grammar will use the same syntax as C. Note: For most rules and predicates it is far superior to embed a constraint expression into the predicate rather than putting in the logic (i.e., use "t_metric(METER_ID, GT, 10)" instead of "t_ metric(METER_ID, ?value) && ?value>10" because then the Feature Detector 36 can filter all irrelevant predicates, whereas in the second construction the Feature Detector will send ALL t_ metric predicates (regardless of its relevance) and Problem Logic needs to filter out the irrelevant ones. Also, the Feature Detector can push the constraint down to the Telemetry Component 34, which can push it down to the monitors 14 so that the meta-application 20 can optimize its network bandwidth and not send any telemetry that does not meet the constraint. |

Each predicate preferably has data associated with it that indicates whether the predicate can trigger with a particular set of arguments (where each argument is associated with information whether it is allowed to be bound or unbound). There may be multiple sets of arguments that are valid for a predicate. In general, it is preferred to have only one set of arguments so that the knowledge encoder can more precisely dictate which version of a predicate is used to match incoming atomic formulae.

When the meta-application 20 analyzes a rule, it scans all atomic inputs to the Problem Logic circuitry and matches them against predicates in rules. Some of these predicates will have only constant arguments and the match is easy, since it is only necessary to determine if the incoming atomic formula exactly matches the predicate. Other predicates will have free variables (like ?server) as arguments, and the problem detector 38 will match those predicates by assigning the value in the atomic formula to the free variable that is in the same argument position. This process will bind free variables.

Most knowledge base articles start with some constraints on what systems may be involved (e.g., server must be running Exchange 2003™). These constraints can be encoded in a logic rule as a query of the application model 24, referred to herein as an "AM query." An AM query can bind a variable by asking the application model 24 for information about the deployment 10. In some embodiments, a rule essentially breaks down into prerequisite AM queries that narrow down the list of application model 24 objects that are involved in the rule, as well as predicates that can query for telemetry or perform other probing on the application model objects from the prerequisite AM queries. In order to permit more flexible rule formulations, the Problem Logic rule format preferably does not enforce splitting a rule into prerequisite predicates and the rule body.

Rules are preferably constructed so that after a first variable is bound, it is easy to bind the other variables because it is possible to find a predicate that links from the bound variable to another variable that the triggered predicate can bind. Knowledge base articles typically also have this natural flow in them. For example, a knowledge base article might specify that the problem occurs on Exchange 2003™ servers (one predicate, including a ?server argument, which can trigger without any other bound variables), where the "smarthost" is set (another predicate that can trigger if the ?server argument is bound, which it will be due to the first predicate), and the smarthost is not reachable by DNS (a telemetry predicate that can only trigger if given the smarthost name and the server from which it is trying to resolve, which the first two predicates bound). So a knowledge base article often naturally facilitates cascading predicates that bind each variable such that the next predicate can be triggered.

Thus, Problem Logic is preferably itself responsible for telling the meta-application 20 what inputs to gather. Accordingly, there needs to be a way to "seed" Problem Logic with those initial atomic formulae, and the answer lies in the rules themselves. Each rule is designed such that it has some predicates that can "trigger" in the absence of bound variables in its argument list (i.e., it can trigger without any other context other than the arguments given during rule encoding). This can be a predicate that has some constant arguments and some free variable arguments.

The predicate triggering procedure will take the constant arguments and generate all the closed atomic formulae that match the predicate. An example would be a predicate like "exchange_server_version(?server, "6.5"). In this case, the predicate is tagged as triggerable with only the second argument bound; thus, the triggering procedure will find all Exchange™ servers that are of version 6.5, and will produce closed atomic formulae for each one of them, producing input atomic formulae like "exchange_server_version (server1.exchange.com, 6.5)." These triggerable predicates trigger and send in new atomic formulae that then bind the free variables in their arguments. Other predicates, which depend on having those variables bound, can then be triggered, causing more free variables to bind until all free variables are bound and all predicates in a rule can trigger.

Note that just because a predicate can trigger does NOT mean that it will pass an atomic formula into Problem Logic. Triggering means that the predicate has enough data to find out if it is true for the deployment 10. If it is not true, the predicate will not pass an atomic formula into Problem Logic, and usually this means that the rule will not trigger (depending on the logic of the rule).

So rule encoding preferably ensures that a rule has enough "seed" predicates to begin the input gathering for evaluating the rule. Encoding also preferably ensures that there is a valid sequence of triggering that allows all free variables in the rule to be bound. Encoders can be given an XML file that describes all predicates and the set of arguments each predicate needs in order to trigger. Encoders can use this information to choose the right predicates to ensure that the meta-application 20 can automatically match the rule.

As an example, consider the following logic rule (for simplicity, all predicate and rule metadata are omitted in this example):

AND(A(?srv, "6.5"), B(?srv, ?disk), C(?disk, "FreeSpace", LT, "50%"))

This rule includes three predicates: A, B, and C. It is known that A can trigger with its first argument unbound and its second argument bound. B can only trigger when "?srv" is bound and "?disk" is unbound. C can only trigger when "?disk" is bound and its other arguments are bound to values (in this example, "LT" is a logical connective meaning less than). When the problem detector 38 initially evaluates this rule, it determines that B and C cannot trigger. If A also cannot trigger then the rule would be flagged as invalid (a validation tool can be used to prevent such a rule from entering the system in the first place). Assume that A can trigger. The triggering procedure for A is called and then all instances of A that are true for the deployment 10 are passed into the corresponding Problem Logic circuit. When an instance of A is input, this will bind ?srv to a value. For example, suppose that A requires a server 12 (FIG. 1) running Microsoft Exchange™ version 6.5, and that the deployment 10 includes a server 1 running this version. This instance will be fed into the logic circuit, and the ?srv variable will become bound to "server1." The next time the problem detector 38 analyzes the rule it will see that ?srv is bound. Now B can trigger because ?srv is bound, but C cannot because ?disk is not bound. B triggers and all instances of B that match are passed in as closed atomic formulae. When an instance of B is input, it will bind ?disk. For example, B might simply require the existence of a hard disk on the server bound from predicate A. If server1 has a disk1, then feeding corresponding atomic formulae into the logic circuit will bind ?disk to "disk1." Next, the problem detector 38 will evaluate the rule and see that ?srv and ?disk are bound. Now C can trigger because ?disk is bound. Because most servers will not have disks with FreeSpace <50%, even though C can trigger, it will usually not produce new instances. However, in this case assume that it does. This will cause the rule to trigger (i.e., be "True") because the logic of the rule (all predicates must be true) has been fulfilled. Note that the rule is constructed such that there is a valid sequence of predicates that will bind variables in a particular order to allow all predicates to be tested.

The order of predicates in a rule can help the problem detector 38 figure out what predicates to initially attempt to match. Predicates have a cost associated with a particular predicate/argument set pair and the problem detector 38 preferably uses this to determine which predicates to try first (it preferably tries the least costly predicates first). When all the predicates of a rule have the same cost, the problem detector 38 can be configured to use the order in which the predicates appear in the rule to determine which predicate to try first (i.e., the earlier a predicate appears, the more likely it will be tried first). In other embodiments, the problem detector 38 chooses which predicate to try first based on cost, such that encoders of knowledge need not worry about the order of the predicates. In fact, in many cases the cost of a predicate is a dynamic value that may change over time. For example, an AM query may be expensive at the start of operation of the meta-application 20, but after results are cached it may become cheap. As another example, a telemetry predicate (i.e., a predicate that asks for certain telemetry) may be initially expensive, but as other rules ask for the same telemetry predicate it may become cheap to subsequent rules.

Discrimination Network

To actually evaluate the Problem Logic rules, a "discrimination network" can be built from the rules and used to evaluate them simultaneously. When a feature is created, the problem detector 38 preferably uses the discrimination network to determine which rules to evaluate. In other words, the discrimination network allows the problem detector 38 to quickly determine which rules might possibly care about a given feature. Thus, a discrimination network can be thought of as an index mapping features to rules. It will be understood that some embodiments of the meta-application 20 do not include or use a discrimination network. It will also be understood that the discrimination network described below is just one embodiment of a discrimination network, and other variants are possible.

Figure 17:
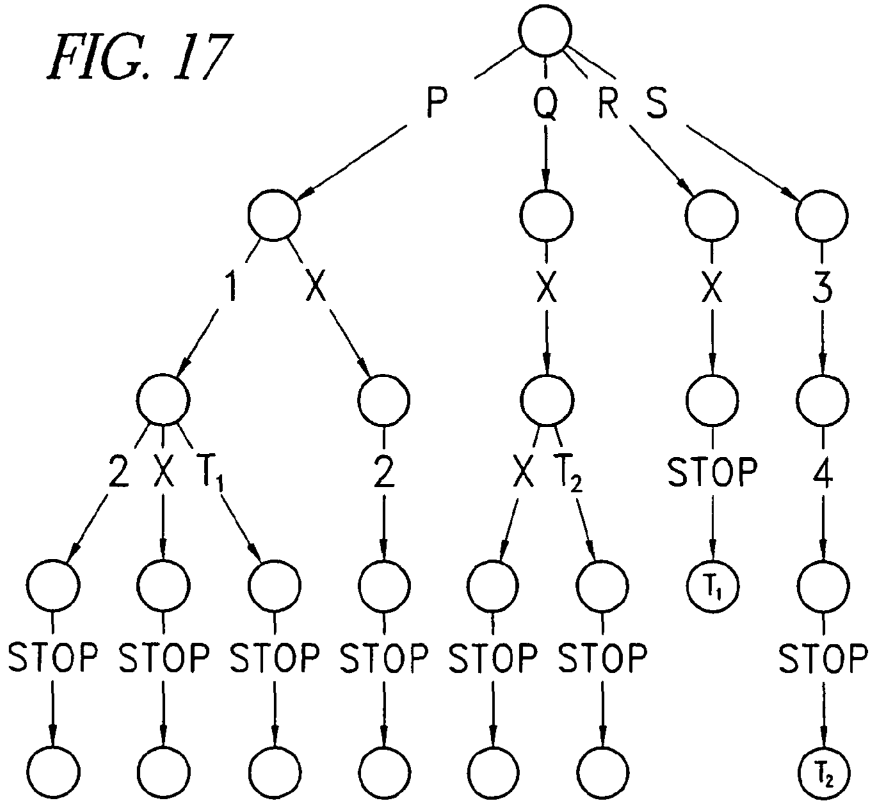
FIGS. 17-19 illustrate the construction and use of a discrimination network for finding applicable portions of Problem Logic circuitry for evaluating a detected feature.

Describing a discrimination network is most easily accomplished through an example. FIG. 17 shows an example of a discrimination network 158. The discrimination network 158 is an index into a database of key-value pairs, where the keys are open atomic formulae possibly containing free variables.

Each key represents any predicate or sub-predicate whose existence indicates that a particular rule may be affected if that predicate is passed into Problem Logic. The illustrated discrimination network 158 associates values with the following keys: P(1,2), P(1,?y), P(?x,2), Q(?a,?b), P(1,R(?z)), and Q(?x,S(3,4)). The illustrated discrimination network 158 is a tree with labeled edges and labeled nodes. The edges leading to children of any given node always have distinct edge labels. Edge labels can be (1) a constant or function symbol of the logic, (2) X, representing a variable, and (3) $T_i$, a node label in the discrimination network, representing a subterm.

A preferred algorithm for creating or locating the discrimination network associated with a particular n-ary term $f(t_1, \ldots, t_n)$ is:

(1) Create or locate the discrimination network node $T_0$ that is a child of the root node connected by edge labeled f.

(2) For i=1 to n, compute edge label $k_i$ corresponding to subterm $t_i$ and create or locate the discrimination network node $T_i$ that is child of node $T_{i-1}$ connected by edge labeled $k_i$.

(3) Create or locate the discrimination network node $T_{n+1}$ that is child of node $T_n$ connected by edge labeled with the special label STOP.

A preferred algorithm for computing the edge label corresponding to a term t is:

(1) If t is a constant, the edge label is t.

(2) If t is a variable, the edge label is the special label X, representing a variable.

(3) If t is a non-atom, the edge label is the discrimination network node label of the node reached by entering t into the discrimination network.

Figure 18:
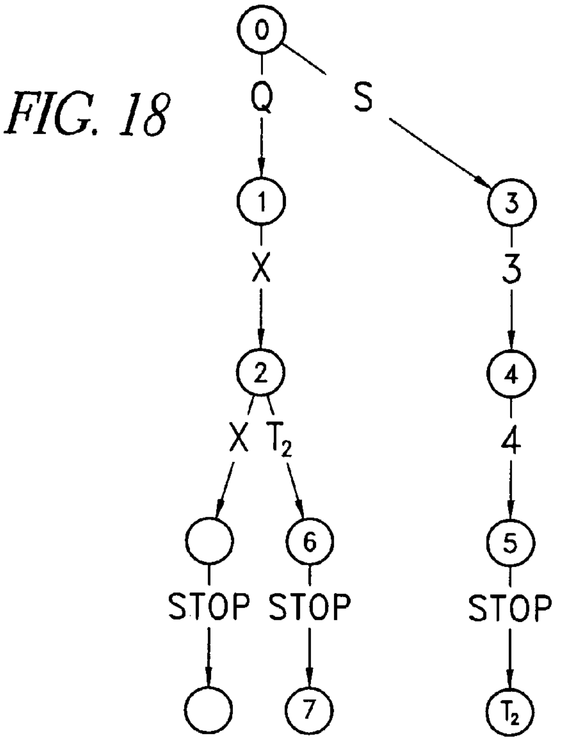

With continued reference to the discrimination network 158 shown in FIG. 17, the following describes a preferred method of locating the discrimination network node associated with term Q(?x,S(3,4)). The relevant part of the discrimination network is shown in FIG. 18. The method begins with the term Q(?x,S(3,4)). The root node is $N_0$. The child off the root node $N_0$ connected by edge labeled Q is $N_1$. The edge label corresponding to variable ?x is special label X. The child off node $N_1$ connected by edge labeled X is $N_2$. The edge label corresponding to subterm S(3,4) has to be computed by a recursive call which determines that the node index reached by entering S(3,4) into the discrimination network 158 is $T_2$. The edge label corresponding to subterm S(3,4) is $T_2$. Continuing the entry of Q(?x,S(3,4)), the child off node $N_2$ connected by edge labeled $T_2$ is $N_6$. Finally, the child off node $N_6$ connected by edge labeled by special label STOP is $N_7$. Therefore, the discrimination network node corresponding to Q(?x,S(3,4)) is $N_7$.

The following describes a preferred embodiment of fetching information out of a discrimination network. The objective of information retrieval is to submit an atomic formula f to the discrimination network and then retrieve all discrimination network nodes corresponding to atomic gate patterns g that could possibly match f. Each discrimination network node stores a list of atomic gates of the Problem Logic circuitry that need to be tested in case the discrimination network node is retrieved.

Figure 19:
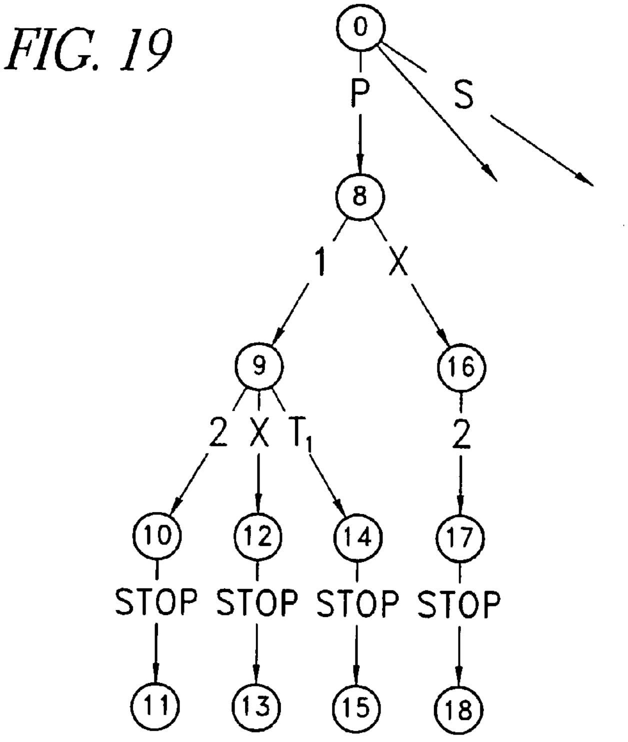

Consider the following example, with reference to FIG. 19. Suppose it is desired to retrieve all the discrimination network indices for input formula P(1,R(5)). The preferred approach is to advance a list of indices through the discrimination network as P(1,R(5)) is consumed. This approach is also recursive, as determining lists of indices for subterms may also be necessary. The method begins with the list of indices $[N_0]$, the singleton list containing the root node of the discrimination network. The input formula being consumed is P(1,R(5)). So, for each node N in the list $[N_0]$, the method proceeds by looking for a child connected by edge labeled P to form the next list, which is $[N_8]$. Next, the "1" subterm of P(1,R(5)) is consumed. Since the "1" is a constant, for each node N in the list $[N_8]$ the method involves looking for a child connected by edge labeled 1 or X to form the next list, which is $[N_9,N_{16}]$. Since variables can match 1, the method fetches nodes led to by edges labeled X. Next, the R(5) subterm of P(1,R(5)) is consumed. Since R(5) is not an atom, this is less straightforward than the previous step. First, possible edge labels corresponding to R(5) are determined. This is accomplished by a recursive call which returns a list of possible keys $[T_1,X]$. So, for each node N in the list $[N_9,N_{16}]$, the method looks for a child connected by edge labeled $T_1$ or X to form the next list which is $[N_{12},N_{14}]$. Since the term P(1,R(5)) has now been consumed, the method proceeds by looking, for each node N in $[N_{12},N_{14}]$, for a child connected by edge labeled STOP to form the next list, which is $[N_{13},N_{15}]$. The candidate matching atomic gates stored at $N_{13}$ and $N_{15}$ are the atomic gates having patterns P(1,?y) and P(1,P(?z)). These patterns are two of the six patterns used to create the discrimination network example in FIG. 17.

After the discrimination network facilitates retrieval of all discrimination network nodes corresponding to atomic gate patterns g that could possibly match input f, the input f is submitted as input to each of these atomic gates of Problem Logic in turn. Each input submission to an atomic gate may generate a match, a bead of information to be sent out on all output wires, along with further propagation through intermediate logical gates.

Predicate Metadata

Some third party applications (i.e., other than the managed application 10) provide numerous methods for instrumentation and monitoring, which can be used by system administrators to maintain a deployment 10. The meta-application 20 can preferably utilize these streams of data to monitor the health of the deployment 10. However, continuously monitoring every stream would place undo strain on the application 10 itself and the network infrastructure in which it is deployed. Thus, the meta-application 20 preferably chooses which streams provide the most value and when to listen to each stream. The Problem Logic's active state is preferably used with other metadata to determine which feeds are currently the most vital.

Problem Logic, embodied within the problem detector 38 and the logic rules within the knowledge base 22, can take closed atomic formulae and match them against rules. But this means that Problem Logic must be fed all relevant formulae about the deployment 10 before all matching rules for that deployment can be produced. It is desirable to detect all possible rule matches, because a single undetected rule match may correspond to a problem that brings the system down.

In order to comprehensively detect rule matches, Problem Logic is preferably fed all relevant predicates that the deployment 10 can generate. To do this, Problem Logic evaluates each rule and determines what metric measurements (or functions of metric measurements) need to be enabled and what database queries (e.g., AM queries, queries to the telemetry database 26) need to be executed. Each rule is a logical composition of predicates. So by finding all relevant closed atomic formulae for a rule and feeding them into Problem Logic, the problem detector 38 can determine if the deployment 10 has a problem described by a rule. In embodiments of the meta-application 20, Problem Logic cannot detect a problem unless there is a rule for it, and that rule can be analyzed to reveal what metrics and queries can be run to feed all relevant atomic formulae into Problem Logic. This means that the Problem Logic will not be able to take a random series of features and correlate them, unless there is a rule that defines the correlation relationship among them. The RCA module 41 can correlate rule matches (i.e., "problems") and random features to application model 24 components that may require attention. Those skilled in the art will recognize that other non rules-based algorithms can take a random series of features and produce a correlation and problem identification. For example, such algorithms can use information from the application model 24 to relate features to components in the application model, using metadata in the application model 24 to direct analysis.

Predicates in Problem Logic play dual roles. The first role is to define a matching mechanism for a rule. Closed atomic formulae (which are predicates with no free variables) are fed into Problem Logic and matched against the predicates that comprise a rule. To enable matching, the rule predicate needs to have a name and arity, and its argument terms need to be constants or free variables. The second role of a predicate is to define how Problem Logic can automatically generate closed atomic formulae from a predicate in a rule. In this case, the predicate preferably has enough metadata associated with it to generate all possible closed atomic formulae relevant to the deployment 10. Problem Logic preferably creates the closed atomic formulae using metadata associated with the predicate, which indicates how to generate all relevant possibilities.

Note that it may be necessary for some of the predicate argument terms to be assigned a specific value before the predicate can generate closed atomic instances of itself that are specific to the deployment 10. For example, if a "cpu_slow(?srv)" predicate is needed, it cannot be generated until the meta-application 20 knows the deployment server (the "?srv" variable) on which CPU usage should be measured. Once the server 12 (FIG. 1) is known, the meta-application 20 can activate an appropriate CPU feature detector on that server. In some predicates, especially those specifying database queries (e.g., AM queries or telemetry database queries), it may be sufficient if only some of the arguments are specified. For a query like "server_is_version(?srv, ?version)," as long as the version is specified (e.g., "5.5" or "6.0"), the predicate can then generate all deployment servers 12 (the "?srv" variable) that match that version (e.g., by running an AM query like show_all_servers_of_version("6.0") to find all matching servers 12). If the version is not specified, then the only viable option is to enumerate all servers of all versions in the deployment 10, which would be expensive if in turn all feature detectors on all servers are activated. In a preferred embodiment, a predicate's metadata lists the valid sets of arguments that allow the predicate to generate atomic formulae itself (the process by which predicates generate closed atomic instances of themselves is called "triggering"). AM query predicates can trigger as long as a valid set of arguments is specified. It is ordinarily not necessary for all of the arguments to be specified.

Other predicates, especially telemetry-based "feature predicates" (i.e., logic rule predicates that specify the existence of features, which may involve appropriate activation of the feature detector 36 and associated telemetry feature detection methods discussed above), need all arguments specified before they can generate their own atomic formulae. In a preferred embodiment, triggering for feature predicates is a two-step process. First, Problem Logic specifies all of the arguments of the feature predicate, which then is able to register a feature request (i.e., a request that the feature detector 36 look for the specified feature). For example, the feature predicate may a request to check whether the CPU of a specific server is slow (e.g., check for "cpu_slow" on server "exmb1.Company.com"). Second, the feature detector 36 then initiates the gathering of metrics necessary to fulfill the request. In this case, the feature predicate preferably has enough metadata information to allow the feature detector 36 to do this, which implies a coupling between the feature detector requirements for metric specification and Problem Logic rules and predicates. If the specified feature is found in the telemetry, the feature detector 36 sends the feature information to the problem detector 38 (e.g., the feature detector 36 can call a callback in the problem detector 38 with the feature information), and the feature information is converted into a closed atomic formula and fed into Problem Logic or sent to any other algorithm in problem detector 38. Of course, registration of a feature detection request does not guarantee that the feature will be true and passed in as a closed atomic formula. That depends on the deployment 10 and its actual telemetry. Note that feature predicates have a potentially significant cost associated with them (monitoring resources, storage for historical data, etc.) and are preferably carefully chosen.

The following table lists some useful types of predicate metadata, in a preferred embodiment of the meta-application 20:

| Predicate Metadata | Description |
|---|---|
| Name | Name of the predicate. The same predicate name may appear many times because there are many combinations of argument states that are valid. |
| Functionality | Can be either an ID that uniquely identifies a feature detector or a parameterized query string like "(EXCHANGE[name = %1] and EXCHANGE[version = %2])". The parameters are the predicate arguments |
| Argument 1 state | Specified (argument must be bound to a value) or unspecified (argument must be left unbound) |
| Argument 1 type | If state = specified, then the type of the argument. Type could be one of: string, float, integer, Application Model object type |
| Argument 2 state | Similar to argument 1 state |
| Argument 2 type | Similar to argument 1 type |
| . . . | . . . |
| Argument N state | Similar to argument 1 state |
| Argument N type | Similar to argument 1 type |
| Cost | A measure of the "cost" of triggering this predicate (normalized to be a number between 0 (no cost) and 1 (very expensive)) with these arguments. This may be a dynamic quantity that changes over time. |

-continued

| Predicate Metadata | Description |
|---|---|
| Severity | A number in [0,1] where 1 indicateds total failure of all components affected by the rule and a number in (0,1) indicates degradation of service to the components (see discussion on Importance below) and 0 means no impact. |
| Need [per rule] | Two states: "required" or "optional". Used by gates to determine how to deal with the fact the predicate is missing as in input to the gate. |
| Contribution [per rule] | A numerical value in [0,1] where 0 indicates little importance to the rule and 1 indicates very strong importance to the rule Used by gates to calculate overall confidence in the rule. |
| Significance [per rule] | A numerical value in [0,1] where 0 indicates that the predicate by itself should not allow a non-unit confidence rule to display to the user and 1 indicates that if the predicate is missing that a non-unit confidence rule should not display to the user. Basically a metric to allow Problem Logic to filter out "false positive" rule triggerings. |

Thus, Problem Logic rules are preferably logical combinations of various predicates, each with different triggering requirements. Each rule should have at least one predicate that can trigger without any arguments specified. Otherwise, the rule will not be able to "start" because no atomic formulae relevant to the rule have been passed in and no parts of the rule will match. And, the variables that are bound by the initial "start" predicates should allow the other predicates to trigger, which will bind other variables, and allow more predicates to trigger, etc., until all relevant atomic formulae have been fed into Problem Logic and the rule has matched or not. These are significant yet preferred restrictions on the encoding of knowledge.

Seeding Predicates into Problem Logic

One way of relaxing the "start" predicate restriction is to "seed" the meta-application 20 with a fixed set of atomic formulae (generated based on the deployment 10 configuration) that it always feeds into Problem Logic, with the hope that these initial formulae allow rules to match. Logically, this "no arguments required" predicate restriction assumes that the "seed predicates" are not completely unrelated and do not require multiple specified arguments making up a rule. If the seed predicates were unrelated, this would intuitively mean that Problem Logic would be looking at features or database queries that have no logical or physical connection to each other in the context of a rule.

The "seeding" approach merely moves the task from determining how Problem Logic should analyze rules and automatically generate atomic formulae to determining how Problem Logic should figure out which atomic formulae should always be fed into it. One approach is to analyze each logic rule to determine how to generate "seed" atomic formulae. Rules are assumed to have a "valid" construction, meaning that the rule has some initial predicates that "start" the rule. These predicates bind values to variables, which then trigger new predicates that needed a single variable to be bound, which the seed predicates provided. Then these secondary predicates bind more variables and more predicates can now trigger, and so on until the rule is matched.

In a preferred embodiment of the seeding approach, Problem Logic performs the following steps when it is initially activated:

1. Load all rules
2. Load predicate metadata
3. Identify all predicates in rules
4. Identify all seed predicates that can trigger
5. Choose seed predicates to trigger (based on minimum cost, maximum problem detection probability, and/or other algorithms)
6. Trigger the seed predicates (may be asynchronous) and convert results into closed atomic formulae
7. Send formulae into Problem Logic, which will bind new variables and allow additional predicates to potentially trigger This initial startup phase will analyze rules and "seed" Problem Logic with deployment-specific atomic formulae that will then bind free variables in rule predicates to specific values and allow Problem Logic to start matching rules. The seed predicates are typically produced by database queries within the rules, which help to restrict the set of devices/circumstances that the rules match against. Thus, upon start-up of the meta-application 20, Problem Logic preferably begins sampling the universe of the deployment 10 and immediately restricts its analysis only to those things that could possibly matter to a rule. It is preferable to properly restrict analysis at this point, because if the analysis is too restrictive, then the meta-application 20 may miss problems. However, if the analysis is too broad, the meta-application 20 may unnecessarily flood the network with useless and expensive telemetry monitoring requests.

Confidence

The meta-application 20 is preferably able to show a level of "confidence" that it has in a matched logic rule or problem. In one approach, the logic in Problem Logic is a traditional non-fuzzy logic with behavior that depends on either true or false values. In this non-fuzzy logic approach, the confidence of a rule is a calculation based on the confidence values assigned to each predicate of the rule. Confidence values of the predicates are preferably transformed as the predicates pass through rule gates. However, the gates themselves do not change their traditional logic behavior. For example, if a predicate has a non-zero confidence of being true, then an OR gate will trigger because, as far as the OR gate is concerned, that input is true. In other words, confidence is a value that is passed along during Problem Logic operation, but does not otherwise affect Problem Logic calculations.

In this non-fuzzy logic or "probability" approach, a predicate can only have a true or false value, and a confidence value attached to the predicate is a measure of the probability that the predicate is true. For example, a predicate having a confidence value of 80% means that there is an 80% probability that the predicate is true. Note that since any predicate that shows up in Problem Logic is assumed to be true, and false ones do not show up, this discussion centers on degrees and probabilities of truth.

In an alternative, fuzzy logic approach, predicates are assigned degrees of truth ranging from 0% (absolutely false)

to 100% (absolutely true). For example, a predicate having a confidence of 80% means that the predicate is 80% towards true.

The type of confidence value (probability or fuzzy logic) of each predicate can depend upon the nature of the predicate. Predicates like "CPU_slow" (requiring that a certain CPU is currently slow) and "disk_full" (requiring that a certain disk is full) describe concepts that intrinsically have a vagueness that can advantageously be captured in a confidence value. This confidence is more like a fuzzy logic truth value, involving increasing degrees of truth as the confidence value increases, as opposed to a situation where the CPU is either slow or not and the confidence value is a probability that the CPU is indeed slow.

Predicates involving database queries (e.g., an AM query) often have a definite truth or falsehood associated with them, and in such cases do not need associated confidence values (i.e., confidence will always be 100% or 0%). If there is some kind of constraint in the database query (e.g., count(set)>X), then the query could have an associated confidence indicating how close the query came to the constraint. Predicates involving telemetry queries (which are typically features where the telemetry or metric is unchanged) also usually have a definite truth or falsehood. However, if the telemetry query has a constraint, then the meta-application 20 can assign a confidence value describing how close the query came to the constraint. For example, if the telemetry query includes the constraint "PerfMon_counter>10," and if the counter is 9.9999999999999, it may not be appropriate to compute that the predicate is false. Thus, a confidence value can help, where instead of the problem detector 38 finding that the predicate is false with the counter equal to 9.9999999999999 (operationally, this means that the Problem Logic circuitry actually does not receive the predicate at all, since it is false), Problem Logic computes that the predicate is true, with a confidence value that is high but not 100%. Again, this is more like a fuzzy logic degree of truth-value, rather than a probabilistic interpretation of concrete truth.

Note that using a fuzzy logic approach causes Problem Logic to generate more problems, because more predicates are allowed to pass through as true than with strict two-value logic. Many of these rule triggerings will have non-unit confidences. The meta-application 20 preferably has a graphical user interface (GUI) 29 (FIG. 1) that analyzes each problem's confidence computation to avoid making a low-confidence problem appear as a false positive (i.e., a declared problem that in reality does not exist). In addition, Problem Logic can use predicate significance to determine which rule triggerings will be allowed. For example, one implementation could specify that if a rule triggers only with predicates that have low significance then the triggering will not be allowed, thereby reducing the number of perceived "false-positives".

Partial Problem Matching and Contributions

The meta-application's GUI 29 preferably shows problems that are "partially" matched so that the administrator of the deployment 10 can learn about problems that are "almost triggered." Problem confidence can advantageously provide a measure of how close the partially matched problem is to triggering. Partial matches can also include those rules/problems for which only some of the predicates have matched.

Suppose a rule evaluated by Problem Logic contains some predicates that have matched (i.e., are true) and other predicates that have not triggered at all. In displaying the problem associated with this rule, the GUI 29 can show the predicates that matched along with their confidence values. The GUI 29 can show the non-matched predicates as completely unmatched. Problem Logic does not really have any other information about how close the non-matched predicates are to matching, because false predicates never even show up in Problem Logic processing.

In one embodiment, the meta-application 20 provides a measure of how close a partially matched rule is to triggering by simply counting the number of atomic gates in a rule and computing a percentage equal to the amount of those gates that are matched. While this approach may prove useful in many situations, it ignores the fact that logic rules have logical constructions that constrain what atomic formulae will match a rule. For instance, it is possible that a rule with nine of ten atomic gates matched can actually be less matched than a rule with only four atomic gates matched but with the right values to allow the rule to proceed further in the logic evaluation. For example, consider the following two rules R1 and R2:

R1: P1 and P2 and P3 and (P4 or P5 or P6 or P7 or P8 or P9 or P10)

R2: Q1 and Q2(Q1) and Q3(Q1) and Q4(Q1)

Regarding R1, assume that P4-P10 are true and P1-P3 are false. With seven of the ten predicates true, the GUI 29 could report that R1 is 70% matched. Regarding R2, assume that Q1 and Q2 are true (the notation Q2(Q1) indicates that Q2 is a predicate that depends on Q1) and Q3 and Q4 are false. With two of the four predicates true, the GUI 29 could report that R2 is 50% matched. However, logically R2 is "more true." R2's logic circuit has an AND gate with four inputs, two of which are true and the other two of which are false (and the false predicates depend on Q1, which is true). In contrast, R1's logic circuit has an AND gate with four inputs, one of which is true (the input involving P4-P10) and three of which are false. Therefore, simply reporting the percentage of predicates that are true is not necessarily the most accurate way to determine how close a partial rule is to triggering.

In other embodiments, the meta-application 20 utilizes the confidence of each predicate of a rule and treats missing predicates in a special way, depending upon the types of gates in the rule.

For OR gates, Problem Logic preferably compensates for the fact that a currently missing (i.e., false) predicate might trigger the OR gate. Problem Logic only feeds true predicates into the atomic gates of the logic circuitry. If there are any non-empty input lines to the OR gate, then it preferably uses the maximum of all the confidence values of the true incoming predicates and ignores the missing inputs. If there were no inputs (i.e., true incoming predicates), then a computed confidence value for the OR gate would be zero.

For an AND gate, a missing input predicate means that a term is false and the AND gate should not trigger. However, in a logic rule with an AND connective, the input predicates to the AND gate may differ in relative importance. Thus, if an input predicate is false, it may not be appropriate to simply set the confidence of the AND gate to zero. Preferably, Problem Logic can compensate for the fact that a missing input predicate might be much less important to this particular AND gate. Note that the relative importance of predicates in a rule depends upon the rule. Some rules (or sub-rules) need all the predicates of an AND gate to be true in order for the rule (or sub-rule) to be true. For example, suppose a sub-rule requires that a particular server is running Microsoft Exchange™ AND the server's disk is slow AND the server's CPU is slow. Suppose further that the server's disk and CPU are slow, but the server is not running Exchange™. In this case, the confidence of the AND gate really should be zero, because the sub-rule only applies to Exchange™ servers. Now suppose the sub-rule also contains another input to the AND gate, the additional input being some arcane Exchange™ attribute that can perhaps be ignored in certain circumstances. In this case, if the server is running Exchange™ and its disk and CPU are slow, but the fourth predicate is false, it may be appropriate to compute a non-zero confidence.

In a preferred embodiment of the meta-application 20, relative "contribution" values or designations are assigned to each predicate within individual logic rules stored in the knowledge base 22. The contribution preferably defines the relative importance of the predicate with respect to all other predicates in the rule. This allows Problem Logic to process contribution through all gates of the circuit and not just at the atomic gates. In one embodiment, Problem Logic also includes a "need" designation that includes the two states "required" and "optional." In another embodiment, the contributions comprise numerical values. For example, the contribution can be a number between 0 and 1, wherein a value of 1 signifies an absolutely essential contribution and a value of 0 signifies no contribution (a value of zero is actually inappropriate, because it would mean that the predicate should not really be an input into the gate). Problem Logic can use these numbers to determine how to adjust the confidence of an AND gate. If the contribution for a missing predicate is tagged as "required," then the AND gate will preferably produce a confidence of 0 (0% confidence that the AND gate output is true) because the missing predicate is essential to the rule and is interpreted as false (the essential input wire to the AND gate has 0% confidence), which immediately makes the output of the AND gate false.

For instance, in the aforementioned example, the predicate describing that the server is running Exchange™ is preferably assigned a need value of "required," because the rule only applies to Exchange™ servers. Thus, if the server is not running Exchange™, the AND gate confidence would be computed to be 0%. If the need values of all of the missing terms (i.e., predicates) are optional, then their contributions each preferably have a floating point value (e.g., a number closer to 0 than to 1). Problem Logic can be configured to sum up the confidence values of the non-missing terms and multiply by the ratio of the sum of contributions of the non-missing terms over the sum of contributions of all terms, essentially normalizing the gate inputs based on contributions. So, in evaluating a rule or sub-rule, if a missing term is some arcane Exchange™ attribute, its contribution can be set to a small value and the net effect would decrease the output confidence but not truncate it to 0. This makes sense because the missing term has a finite probability of making the AND output false. Thus, while the confidence that the AND gate is true is reduced, since the contribution of the missing term to the AND gate is minimal, Problem Logic preferably does not truncate the output confidence to zero, but instead decreases it by some small amount.

Similar calculations can be done for an OR gate. In a preferred implementation, rather than normalizing inputs they are simply summed, and the sum is clamped to 1.0 if it exceeds 1.0. This approach avoids reducing the confidence of the output bead simply because new low confidence input beads were presented to the OR gate. This captures the spirit of the OR gate, which is that it triggers when any one input is true, and other true (or partially true) inputs should not reduce the confidence.

Those skilled in the art will also recognize that the confidence calculations for gates can be arbitrarily complex and can change dynamically during runtime based upon things like feedback data on the efficacy of previous rule firings (e.g number of false-positives and the number of successful resolutions).

Problem Logic Operational Summary

The following describes what the Problem Logic components do when they are running, in a preferred embodiment of the meta-application 20:

1. Accept incoming closed atomic formulae, each formula having a confidence associated with it. Incoming atomic formulae come from:
   a. AM query callbacks. A callback is associated with each AM query. The application model 24 will call the callback anytime an application model state changes and the change could potentially affect the query results. The callback will look at the new results and compare it with the old results, and if it sees any changes it will pass those changes into Problem Logic as closed atomic formulae.
   b. Feature Detector callbacks. A callback is associated with each feature-detection predicate (i.e., a predicate that requires the existence of a specific feature and asks the feature detector 36 to look for that feature). The callback will be called when a feature is calculated. The feature will also have a confidence calculated. The callback will convert the feature into a closed atomic formula with a confidence value.
2. Pass atomic formulae into all rules that could possibly care about them.
3. For each rule, use formulae to bind variables, creating beads, and push the beads as far as possible from the atomic gates to the rule gates.
   a. For each gate, calculate the gate confidence of the output wire. These output wires will be the input wires of subsequent gates, so all gate inputs have a confidence value.
   b. Store each new variable binding on the rule.
4. If a rule gate output wire is reached, indicating that a rule has matched, send the match to the remedy selector 40.
   a. The rule gate output wire will also have a confidence, representing a confidence that the rule has matched.
5. Propagate the beads of all rules as far as possible within Problem Logic circuitry. For all rules, check to see if any new variable bindings have been added. If so, then:
   a. Generate all possible relevant variable combinations using old variable bindings and the new ones
   b. For each predicate, Problem Logic can calculate the cost of triggering the predicate with each set of variable combinations (each predicate provides this functionality)
6. Problem Logic chooses which predicate to trigger
   a. Problem Logic bases its choice on an optimization algorithm that considers the cost of the predicates and the current value of each predicate to the rule (in this context, "value" means the worth of the predicate in resolving the logic of the rule to a trigger state). For example, if there is just one more predicate at a certain gate that is required to trigger a rule with high output confidence, then it makes sense to trigger this predicate, even though it might be expensive, versus a predicate at another gate which will not trigger a rule or trigger it with a low confidence.
   b. This is where Problem Logic sequences predicate requests to fulfill multiple conflicting requirements:
      i. Predicate Request Sequencing: Minimize the cost of rule matching by only turning on expensive predicates when it most matters. Cost is calculated by the predicate itself (based on predicate metadata) and is not necessarily fixed. For AM queries, the application model 24 may cache queries so that the cost of querying information may decrease dramatically for subsequent queries. For feature-detection queries, if the feature detector 36 is already looking for a particular feature based on a query from another rule, then the cost for new rules to query for the same feature will be lower.

ii. Partially Matched Problems: Maximize visibility into rule matching by turning on all possible predicates to get the most accurate confidence number (identify those predicates that, if true, would trigger the rule). Because of the logical nature of the rule, not all predicates are equally important in this regard. An administrator of the deployment 10 can send "hints" to Problem Logic, via the GUI 29, as to which rules need to have complete information on partial rule matching. For example, the administrator can be permitted to inform Problem Logic that something is a problem, by artificially triggering a feature, or that something is not a problem, by turning off a feature predicate. Also, the administrator is preferably able to select a deployment device and ask for all partially or fully matched problems and their confidences. This may disallow short-circuiting AND gates and OR gates and may also disallow other optimizations based on cost or likelihood, because the meta-application 20 is now concerned about the confidence of all predicates, in order to calculate an accurate confidence.

iii. "Volume" control based on confidence: Change predicate sampling frequencies (choosing from a set of standard sampling frequencies to help simplify implementation of telemetry component 34) based on confidence that a rule is about to match (using confidence calculation). If Problem Logic is very confident that a rule is close to matching, increase the sampling frequency for those predicates that are missing and would allow the rule to match. This will generate a new predicate request and may replace a previous request.

iv. "Volume" control based on bandwidth: Change predicate sampling frequencies based on monitored bandwidth usage. Problem Logic rules are not too sensitive to predicate sampling frequencies, so volume control optimizations should not be too disruptive. This will generate a new predicate request and may replace a previous request.

7. Run the trigger procedure for all predicates marked for triggering, which will register new callbacks with the feature detector 36 and application model 24.
8. Old and new callbacks get called when new results are available, which are converted to closed atomic formulae.
9. Send closed atomic formulae to Problem Logic and go to step 1, continuing the normal rule matching process.

Problem Logic Learning

In a preferred embodiment, the meta-application 20 is configured to "learn" about the success and failure of executed remedies, and adjust the Problem Logic circuitry accordingly. A Problem Logic circuit associates a confidence between 0 (low confidence) and 1 (high confidence) to every matching problem. The confidence is calculated as if the Problem Logic circuit were a small feed-forward neural network. Each type of logic gate (AND, OR, etc.) has its own activation function ($f_{AND}$, $f_{OR}$, etc.). The activation function for an entire logic circuit is a composition of the activation functions of the constituent gates. For learning purposes, it is beneficial for the activation functions to be sigmoidal functions that are multivariate, nonlinear, continuous, smooth, and generally monotonic functions. The logic gate activation functions input confidences $x_i$ fed forward by input features or input logic gates. Additionally, the logic gate activation functions also input tunable connection weights $w_i$, which are the predicate contribution values of Problem Logic. Thus, as the meta-application 20 learns about the success and failure of executed remedies, it can "tune" the predicate contribution values of Problem Logic.

Consider the logic circuit shown in FIG. 16. A corresponding confidence activation function for the circuit is as follows:

$$f(a,b,c,d,w_a,w_b,w_c,w_d)=f_{OR}(f_{AND}(a,b,w_a,w_b),f_{AND}(c,d,w_c,w_d))$$

The artificial neuron appearing in a typical multilayer neural network may compute its output as $$y=f(w_1x_1+\ldots+w_nx_n+b),$$

where f is some universal basis function such as tan h. However, for purposes of Problem Logic, it is preferred that $f_{AND}$ and $f_{OR}$ sigmoidal activation more approximately resemble classic boolean AND and OR functions. Accordingly, the following are chosen:

$$f_{AND}(x,w)=\tfrac{1}{2}\tan h(w_0+x_1w_1+\ldots x_nw_n)+\tfrac{1}{2}$$

$$f_{OR}(x,w)=\tfrac{1}{2}\tan h(w_0w_1^{x1}\ldots w_n^{xn})+\tfrac{1}{2}$$

Problem Logic confidence calculations are preferably based on well-established neural network theory, so it is possible to train the confidence calculations of Problem Logic circuits via supervised learning, just as it is possible to train neural networks via supervised learning.

A Problem Logic circuit can be trained by providing a training set of matching problems and target confidences (generally either accept=1 or reject=0). A stochastic back-propagation algorithm, amounting to gradient descent, can be repetitively applied to examples in the training set until sufficient convergence of the connection weights of the Problem Logic circuit being trained is achieved. The following is a stochastic back-propagation algorithm:

```
Stochastic Back-Propagation Algorithm:
initialize weights w, criterion θ, learning rate η;
while (true) {
x=randomly chosen training pattern;
for (i=1;i<=n;i++) {
  w_i=w_i−η ∂E(x,w)/∂w_i
};
if (||∇E(x,w)||<θ) break;
};
return w;
```

The above-shown algorithm includes the following variables: The parameter x is the input feature confidences. The parameter w is the connection weights. The parameter θ is the stopping criterion. The parameter η is the learning rate. The parameter n is the number of connection weights. The function E(w,x) is equal to $\tfrac{1}{2}(z-t)^2$. The parameter t is the target confidence. The parameter z is the calculated confidence, f(x,w). The parameter ∇ is $(\partial/\partial w_1, \ldots, \partial/\partial w_n)$. It will be understood that if a feature is not present in the training pattern, then the confidence $x_i=0$ for the missing feature. The Stochastic Backpropagation Algorithm can be used to train or improve the confidence calculation connection weights of a Problem Logic circuit.

Deployment Healing

Healing Overview

When Problem Logic matches a rule, it registers a problem and informs other modules of the meta-application 20. Since, in a preferred embodiment, there can be multiple active problems (i.e., problems flagged as currently existing and for which resolution has not yet been confirmed), the meta-application 20 is preferably configured to determine the relative "severity" of problems and sort the problems by importance.

In a preferred embodiment of the meta-application 20, most or all of the problems are encoded with a "severity" and a remedy that contains a list of possible plans. Such information can be stored in any convenient location, and preferably in the knowledge base 22 and/or plan database 28. The remedy selector 40 preferably uses remedy selection algorithms to globally review all active problems and their potential remedies and select remedies for the most severe problems first. Each remedy can have a "resolution policy" that indicates how that remedy interacts with other remedies and problems. For example, a remedy may be "globally exclusive," which indicates that all less severe remedies (remedy severity can be defined as the highest severity of all of the problems attached to a particular remedy, it being understood that a given remedy can be selected for a plurality of different problems) and problems should be ignored until the meta-application 20 can first resolve this particular remedy. This would be appropriate for remedies that fix fundamental services, since many concurrent problems may actually be side-effects of the failure of the fundamental service and may be resolved simply by resolving the fundamental service issue first. The resolution policy preferably also indicates how to verify whether the remedy actually worked and resolved its associated problem.

After reconciling all remedies and their resolution policies with the resolution policies of other currently active problems/remedies, the meta-application 20 preferably submits a list of remedy ID's to execute. Since the meta-application 20 might only have a partial ordering of remedies by "severity," it may be possible for multiple remedies to be classified as "most important." In this case, the remedy selector 40 can examine its knowledge base 22 to determine if there are deployment-specific hints (which the meta-application 20 may have generated over time) to select between remedies of otherwise equal severity.

At this point the RCA module 41 can be accessed to determine additional sorting measures to apply to the remedies, based on the causal relationships among the rules that triggered and initiated the resolutions. This may provide an unambiguous ordering of resolutions.

If there aren't any deployment specific hints to select between remedies of otherwise equal severity, then the meta-application 20 can ask an administrator of the deployment 10 to choose among the remedy options. Alternatively, the remedy selector 40 can be configured to simply randomly choose one of the remedies of substantially equal severity, particularly if they are deemed "non-catastrophic" (if some of the remedies have the potential to bring the system down, then it may be preferred to leave the choice to the administrator). After a selected remedy is executed, the meta-application 20 preferably utilizes a health evaluation algorithm to determine how the remedy affected the health of the deployment 10. If the deployment health does not improve, the remedy selector 40 can simply choose another remedy (or ask the administrator to choose another remedy), and possibly attempt to undo the previously executed remedy and record its utility for the current system state. In this way, the remedy selector 40 can use the health evaluation algorithm to track remedy performance so that the next time the same problem (or a related problem) is detected, the remedy selector 40 will have more context to choose among remedies.

After the remedy selector 40 selects a list of possible remedies, their associated remedy ID's are preferably sent to the automation subsystem 32. The automation subsystem 32 is preferably configured to take a high-level remedy and map it to an "abstract" plan in the plan database 28. The planning module 42 preferably then takes the abstract plan and information obtained from the application model 24 to produce a deployment-specific plan composed of low-level actions. This plan can then be displayed to the administrator (via the GUI 29, an email, a web-page, or sent directly to the administrator's network management system as an SNMP trap, etc.) so that the administrator can execute the plan manually. Alternatively, if the administrator wishes, the plan can be sent to the execution engine 44 to be executed in a consistent, reversible manner. Before executing the plan, the execution engine 44 preferably makes sure that other plans do not conflict with this one.

During execution, each plan step is preferably a sequence of low-level "operators." Operators are atomic actions that can be executed against the deployment 10. Each of these actions can be sent to an appropriate monitor 14, which preferably executes the actions against the deployment 10 and reports back as to whether the action succeeded in its intended effect. The execution engine 44 then continues executing plan steps until completion. These actions are intended to change the behavior of the deployment 10, which may in turn change the telemetry metrics that the meta-application 20 monitors.

After a plan has been executed, the meta-application 20 preferably attempts to learn whether the plan/remedy worked. Accordingly, the analysis subsystem 30 continues to analyze new telemetry and, based on the telemetry change, may adjust the predicate weights discussed above in "Problem Logic Learning." If the remedy worked, the features associated with the problem should now disappear, and consequently the problem will not be matched by the Problem Logic circuitry. At this point, the resolution policy associated with the executed remedy is preferably still active, and asks the remedy selector 40 (or other component of the meta-application 20) to determine whether the problem is still active. In response, the remedy selector 40 preferably runs a "resolution verification" procedure (associated with the remedy) to verify closure of the problem, and then deactivates the resolution policy after positive verification. If the problem still persists, the resolution policy remains active and the remedy selector 40 preferably runs a "remedy did not work" procedure to try alternative methods (there may be multiple remedies associated with the problem or it may be appropriate to retry the remedy). If no alternative works, then the meta-application 20 preferably notifies the administrator of the deployment 10, and further processing with respect to this problem ceases until the administrator is able to address the issue.

Remedy Selection

The resolution policy for a remedy allows the meta-application 20 to more explicitly manage the application control feedback loop to allow remedies to propagate their effects through the deployment 10. A typical resolution policy will mandate that the meta-application 20 wait some N minutes for the remedy to "work". The meta-application 20 preferably notes "global system health" just before executing the remedy. Global system health is a numeric measure that encapsulates the current state of the application deployment 10 and preferably assesses a combination of application responsiveness, resource robustness, and other factors. During the remedy waiting period, any problems associated with the remedy can be "ignored" (i.e., the remedy selector 40 will not initiate remedy selection) to allow the already existing remedy to attempt to finish.

Once the waiting period has lapsed, the meta-application 20 can then check to see if the problem for that remedy still exists. If it does not, the meta-application 20 can run a "check if remedy worked" resolution verification procedure of the remedy's resolution policy. This policy may simply indicate that the problem's non-existence is enough to declare success, or there may be additional verification steps required. If a remedy is deemed successful, the meta-application 20 preferably logs the effect of the remedy on global system health and deletes the resolution policy from the list of currently active resolution policies.

As explained above, if a remedy is found to be unsuccessful, the meta-application 20 preferably runs the "remedy did not work" procedure of the resolution policy associated with the remedy. If a remedy associated with a problem has multiple plans, then the resolution policy can try each plan. If none of the plans work, then the meta-application 20 can follow the "remedy did not work" procedure for the last plan. This policy may dictate that the meta-application 20 halt all processing on the problem and notify the administrator of the problem. Or it may ask the administrator how to deal with the failure to resolve the problem (ignore the problem forever, ignore for some time, ignore problem until administrator indicates that a manual resolution has been attempted, etc). Or it may simply retry the plan a certain number of times before giving up and then trying one of the other options if the plan simply continues to fail.

The remedy's resolution policy preferably also indicates how the plan interacts with other running plans. The remedy execution can be "globally exclusive," which indicates that no other remedies may run on any component of the deployment 10 concurrently with this remedy. For a deployment 10 of Microsoft Exchange™, an example of a "globally exclusive" remedy might be one that fixes an unresponsive DNS server; since so many other components are dependent on DNS service, it is important to resolve this remedy first, and it is likely that most other problems will be resolved as well. Also, some remedies may be very sensitive to other simultaneously running activities, and need global exclusion to ensure safe operation. Remedies may also be "locally exclusive," which indicates that no other remedy may run on the particular component (e.g., a server 12, a disk) that the remedy runs on. In one embodiment, most remedies are "locally exclusive," since this is how good administrators attack problems (by trying one thing at a time on a server 12).

The meta-application 20 may force all remedies into global exclusion if it senses that global system health is deteriorating at an unacceptable rate. In this case, there may be multiple remedies running while the deployment 10 is deteriorating, and it may be desirable for the meta-application 20 to isolate the problematic remedy or remedies by running remedies sequentially rather than simultaneously. The meta-application 20 can direct the automation subsystem 32 to suspend or abort all remedies. If suspending or aborting a remedy is not possible, then the meta-application 20 can wait until the remedy has completely executed and then run remedies in global exclusion mode. Global exclusion will allow the meta-application 20 to clearly determine how each remedy is affecting the deployment 10.

When a remedy is selected for execution, there will typically already be a set of remedies and associated resolution policies in effect. Before new remedies are selected for execution, the remedy selector 40 preferably checks all currently active resolution policies to see if their problems have disappeared. If they have, the "check if remedy worked" procedure can be run. Then the remedy selector 40 can select a new remedy and reconcile its resolution policy with pre-existing, currently active resolution policies. If the new remedy has a resolution policy of global exclusion, then currently executing remedies can be told to suspend or abort themselves. Alternatively, if the new remedy has a resolution policy of global exclusion, then the meta-application may be configured to allow currently executing remedies to be completed before executing the new remedy. If the execution policy of the new remedy is local exclusion, then any remedies running on the component that is affected by the new remedy will be suspended or aborted, or alternatively those running remedies will be permitted to finish before the new remedy is executed on that component. With local exclusion, remedy selection can continue for each component that has not had a remedy selected yet.

After all remedies have been selected, the new remedies are run. New telemetry comes into the analysis subsystem 30 and generates new features and problems. Then remedy selection begins again. For each new problem, the remedy selector 40 preferably determines whether it is already associated with an active resolution policy and whether the associated remedy is in its waiting period. If it is still waiting, then the remedy selector 40 can ignore the new problem and allow the remedy to complete. If the remedy is past the waiting period and the problem still exists, the remedy did not work, and the aforementioned "remedy did not work" procedure is run. Thus, each cycle of remedy selection is either creating new resolution policies for new problems and remedies or managing currently executing problems and remedies. In this way, the meta-application 20 manages the life-cycle of remedies and is able to manage sets of conflicting problems and remedies by consistently choosing to fix the most important problems first and postponing less important problems.

As remedies achieve closure (either fixing their problems or being deemed unsuccessful) they are preferably rated according to how well they affect local health (on the component) and global health (across the application deployment 10). This information is used to inform future remedy selection decisions and may also be used by the "Problem Logic Learning" algorithm to determine predicate weights.

The following table shows a few examples of problem-remedy combinations for a meta-application 20 that manages a deployment 10 of Microsoft Exchange™. In this case, the illustrated problems are based on Microsoft™ Knowledge Base articles, identified by MSKB identification numbers. It will be understood there will typically be a large number of such combinations in association with a meta-application 20.

| PROBLEM | MSKB ID | REQUIRED FEATURES | POSSIBLE PLANS |
|---|---|---|---|
| Event ID's 454 and 9518 when attempt to mount the information store database | 327065 | Event Feature 454; Event Feature 9518; Various AM queries to locate the information store streaming file | MoveFilePlan: moves the streaming file from backup to correct directory on the Exchange server |
| Store.exe threads use up available memory | 267255 | Trend feature: Process.VirtualBytes is | CustomPlan: changes three registry values on |

-continued

| PROBLEM | MSKB ID | REQUIRED FEATURES | POSSIBLE PLANS |
|---|---|---|---|
| | | increasing; Control chart feature: Process.ThreadCount is too high; Event Feature 12800 | the misbehaving Exchange server |
| Messages remain in "Messages awaiting directory lookup" SMTP queue in Exchange 2003 Server or Exchange 2000 Server | 884996 | Event Feature 9003; Event Feature 9004; Event Feature 9035; Event Feature 6004 | CustomPlan: Reset the location of the archive file; CustomPlan: Turn off message archiving |

Plan Execution

A plan can be thought of as an abstract remedy that has been converted into a deployment-specific, instantiated sequence of steps and decision factors for executing the remedy. A plan can express a possible solution to a problem, a "best" or sanctioned way to configure the deployment 10, or a commonly performed administrative task. Since a problem can sometimes have more than one possible solution, the meta-application 20 uses remedies, wherein a remedy may comprise a set of plans with a resolution policy, as described above.

Plans may require "function arguments" that specify or request more details to complete the plan. For example, a "kill rogue process" remedy needs the server 12 and process ID to execute. Each plan may be associated with multiple problems or remedies, so simply passing the problem information to the plan may not work because the plan would then be responsible for figuring out how to map its arguments from all possible problems. Also, plan mappings to problems may change over time. Thus, plans preferably have a generic argument passing mechanism. Each problem preferably has associated attributes (e.g., metadata such as severity, etc.); and the remedy can preferably determine its function arguments by querying problem variables. This allows any plan to be mapped to any problem through a remedy, but only if the problem has all the variables required for the plan. Since, by definition, the plan and problem are related in the real world, this restriction will more than likely not be onerous. This may require that problems and plans agree on what each variable name represents. For example, if a problem is related to a certain process, the problem preferably uses the same name for the process ID that the plan uses to query for that argument (e.g., "process_id").

As explained above, after the analysis subsystem 30 has identified a problem, the automation subsystem 32 is responsible for corrective actions against the deployment 10. The illustrated automation subsystem 32 includes a planning module 42 and an execution engine 44. In preferred embodiments, the planning module 42 manages, binds, and evaluates plans, and the execution engine 44 actually performs actions on behalf of the planning module 42.

In a preferred embodiment of the meta-application 20, plans are graphically represented in the GUI 29 as object trees, wherein each node in the tree defines a step or decision factor in the plan. In a preferred embodiment, a plan object tree comprises the following types of nodes: A scope node is a container-type node, preferably containing data such as arguments, metadata about the problem that the plan attempts to resolve, or the actual Problem Logic formula associated with the problem. A condition node is a decision factor node (i.e., a point in the tree with multiple possible outcomes based on the results of a queried input or data). A condition node can define a branch of the tree based on an expression. An interface node is an action-type node (e.g., a point in the tree in which some action is executed against the deployment 10). An interface node can define an interface to the system, such as an operator or query.

In a preferred embodiment, each tree node may contain metadata information that is used to render the tree and describe meaning to an end-user, and dependency and side-effect information used to determine how a plan may conflict with best practices or other currently executing plans. Also, plans may have variables. Variables are used in expressions, to pass parameters and return results from interfaces, and to keep active plan state.

Plans can preferably interact with the meta-application 20 through interfaces. A number of different types of interfaces can be provided. For example, a query interface can allow a plan to obtain information from the application model 24. A plan can use an operator interface to a set of operators that define actions to be carried out against the deployment 10. A feedback interface can allow a plan to present questions to a human administrator, the answers to which may be required to continue executing the plan. Runtime interfaces to the planning module 42 can provide general utility functions such as regular expression parsing and notification of plan events. Also, plans can use plan interfaces to invoke child plans.

Plans can preferably be executed and/or rendered. Rendering a plan means generating a set of human-readable instructions for an administrator to follow. In preferred embodiments, plan object trees may be transformed during processing. For example, a plan may record or display resolved application model queries, identify deployment-specific branches, etc. Transformations are preferably serialized (e.g., as XML) and stored as blobs in the database.

Plan processing can involve the following processes: Selection refers to the process of selecting a plan to invoke, from problem data or other inputs. Activation refers to the processes of instantiating a plan from an abstract plan, binding runtime parameters, checking prerequisites, making the plan deployment-specific, and building plan metadata. Rendering refers to depicting plans to the end-user in a way that allows the end-user to manage plans. Execution means executing a plan against the deployment 10. Finally, retirement means retiring plans that have completed, been skipped, failed, etc.

The GUI 29 can preferably inspect all plans at any stage in processing to provide transparency to plan processing to the end-user.

In a preferred embodiment (it being understood that alternative plan development processes/steps are possible), plan development involves the following steps: plan instantiation, binding plan parameters, evaluating plan prerequisites, specializing the plan for the deployment 10, and constructing "aggregate shadows" of the plan. These steps can be performed by the planning module 42. These steps are now described.

The plan is instantiated from an abstract plan. Instantiation involves generating a unique plan identification or ID. Next, the plan parameters are bound to problem attributes. Binding preferably uses name-matching. Each problem can have a list of name-value pairs that contain attributes of the problem, and each plan can have a list of named parameters. For example, if a problem has name-value pairs "host=foo" and "process_id=123," the plan would have a list of named parameters "host" and "process_id." The problems are preferably processed in the problem list order. If the parameter names cannot be resolved by the problem attributes, or if type conversion fails, the plan is preferably retired and an error is returned.

Then the prerequisites component of the plan object tree is preferably evaluated. If the prerequisites are not met, the plan is preferably retired with an appropriate resolution. For example, a specific plan might only be applicable if Microsoft Exchange SP2™ or earlier is installed. In traversing and evaluating the prerequisite component of the plan object tree, application model queries may need to be performed, results tested, etc. If the prerequisites are not met, the plan can invoke a runtime interface (e.g., "Plan.PrerequisitesFailed"), in which a textual reason may be provided (this may be invoked multiple times). The text is then aggregated for auditing. If prerequisites are not met, the plan is retired with an error being returned.

Specializing the plan for the deployment 10 preferably involves traversing the solution node of the object tree to identify deployment-specific portions of the plan. For example, a specific plan may contain different solutions depending on the version of the application 10 that is installed. If specialization reduces the plan to an empty set (i.e., the plan has no steps), it is retired and an error is returned.

A "shadow" is the set of components of the application model 24 that something will affect. An "aggregate shadow" is the union of all parts in a plan, and contains all components affected by the execution of the plan. To evaluate the dependencies and effects of a plan, queries can be performed by the plan. In addition, operators produce effects. This information is represented as shadows, and is used to determine potential conflicts. If the effects of two plans intersect, the plans are potentially mutually exclusive and should not be executed concurrently. If the effects of a plan intersect with the dependencies of a best practice, the plan potentially conflicts with the best practice. This may cause the best practice to be triggered for evaluation after the plan is executed. Shadows represent AM property collections. They allow determining, for example, that a best practice depends on the same property that a plan modifies. This is a hint that the plan may conflict with the best practice, but it does not determine that such is true (e.g., the plan may modify the property within the bounds proscribed by the best practice).

As a plan object tree is traversed (e.g., by the automation subsystem 32 or by a human administrator via the GUI 29), the automation subsystem 32 preferably aggregates the rendering metadata from each node. The rendering metadata can be HTML. The GUI 29 can handle "dead branches" (i.e., object tree branches that are inoperable due to inputs received at decision factors of the tree, such as inputs received from the human administrator) by eliminating or identifying them (e.g., "graying out"). The method by which the GUI 29 treats dead branches can be based on user preference.

Where variables are unresolved, plan rendering preferably comprises presenting all possible paths. For example, suppose a plan fragment reads as follows:

```
if (use Workaround)
    Operator.A( )
else
    Operator.B( )
```

If the variable "useWorkaround" is found or resolved to be true, then the GUI 29 preferably only renders Operator.A. On the other hand, if "useWorkaround" is unresolved, then the GUI 29 preferably renders the condition and both branches. Unresolved variables can be rendered using their names (or explicit metadata associated with them). For example, consider the following plan fragment:

```
Operator.RestartService (server, "SMTP")
```

If the variable "server" resolved to "NYC_PDC," then this plan fragment can be rendered as "Restart SMTP on NYC_PDC." If "server" were unresolved, it can be rendered as "Restart SMTP on server."

In a preferred embodiment, the automation subsystem 32 includes separate "evaluation" and "execution" modes for traversing a plan object tree. The mode affects how the interface nodes are processed. Evaluation mode is used during plan activation and rendering. In this mode, query interfaces and runtime interfaces are executed, but operator interfaces are only used to produce rendering and shadow metadata. In other words, when in evaluation mode, the plan is not executed against the deployment 10. In execution mode, operators are invoked. Also, in execution mode, the queries can be re-invoked and the results can be compared against those obtained during evaluation.

Plan traversal produces context (i.e., variables are resolved, queried information is obtained, etc.) that can be serialized with the plan. This allows plans to be queued, awaiting some action, and later dequeued for additional processing. For example, a rendering agent (which can reside in the automation subsystem 32 or elsewhere within the meta-application 20) may queue a plan that requires feedback from a user. When the user eventually provides the required feedback, the agent can dequeue the plan, resolve the result variable of the feedback interface, and continue the plan.

Root Cause Analysis

In some situations and embodiments, it is possible for a problem to not have an actionable remedy (either because the problem is not linked to a remedy or because all applicable remedies have failed to correct the problem). Also, a partially triggered logic rule may in some cases suggest that something is potentially wrong with the deployment 10, but a remedy is not available until the rule is fully matched by Problem Logic. Another possibility is that many problems, some with the same severity, might be triggered at once. In these cases, the analysis subsystem 30 can be configured to perform root cause analysis to determine the actual cause of these problems (either automatically or when prompted by an administrator). The root cause analysis module 41 (FIG. 1) is preferably configured to test appropriate components of the deployment 10 to attempt to determine which component is the actual root cause of the problem or set of problems, and which problems are caused by this problematic component.

Root cause analysis is the process of analyzing and testing various components of the deployment 10 to determine (1) which component is actually causing a problem, and (2) what other problems are caused by the same misbehaving component. The root cause analysis module 41 can include algorithms that rely upon the application model 24. As explained above, the application model 24 preferably represents the various objects of the deployment 10, directed dependency relationships between the objects, and a set of troubleshooting "unit tests" for each type of object. A unit test is a test of one specific feature or element of functionality. For example, one particular unit test might send a simple email to assess whether a specific server is able to forward or store email messages.

As used herein, a "root cause" is specific physical data on a specific physical machine, the data not being caused by any other specific physical data on any machine. The curing of a root cause leads expeditiously to the cure of some or all extant abnormal conditions in the deployed application managed by the meta-application 20. The root cause analysis module 41 is preferably configured to iteratively use pattern recognition methods on the application model 24 and diagnostic unit tests to further isolate causes, including root causes, of problems existing in the application deployment 10 managed by the meta-application 20.

Value of Root Cause Analysis

The root cause analysis module 41 complements the Problem Logic algorithm by (i) finding causes of problems when Problem Logic lacks the knowledge to find the causes more directly, and (ii) isolating the root causes of problems when Problem Logic finds no causes, finds too many causes, or finds the wrong cause. Problem Logic is limited by the knowledge that is encoded into it (i.e., the knowledge in the knowledge base 22). Root cause analysis can circumvent insufficient specific knowledge and add to what Problem Logic can do by diagnosing problems using general pattern recognition principles on the application model 24. The root cause analysis module 41 partly fills in where Problem Logic knowledge is missing and where Problem Logic can use additional guidance.

If Problem Logic does not match any rules, but a problem exists, the root cause analysis module 41 can preferably detect problems that Problem Logic does not find by marking application model objects associated with partially triggered rules and applying root cause analysis strategies.

If multiple Problem Logic rules trigger simultaneously, the root cause analysis module 41 can preferably determine which problems are causing other problems. For example, in a meta-application 20 that manages a deployment 10 of Microsoft Exchange™, suppose the root cause analysis module 41 uses causal link information stored in the application model 24 to detect the following three problems: (1) SMTP service has stopped, (2) email has stopped, and (3) email is slow. Logically, the stoppage of SMTP service has likely caused the stoppage of email, which is the likely cause of the detection of slow email. If the root cause is that SMTP service has stopped, remedies specific to the problem of slow email are not worth trying until remedies for the stopped SMTP service are successful. Therefore, the root cause analysis module's pattern recognition determination of root causes and diagnostic unit testing can narrow sets of Problem Logic problems to be considered for immediate remedy execution and can prioritize remedies.

If a Problem Logic rule triggers, but Problem Logic does not offer any remedies, the root cause analysis module 41 can preferably discover curable root causes. The objects associated with the corresponding matched problem can be marked on the application model 24 and the root cause analysis module 41 can then identify and diagnose the causes of the deployment problem.

Figure 23:
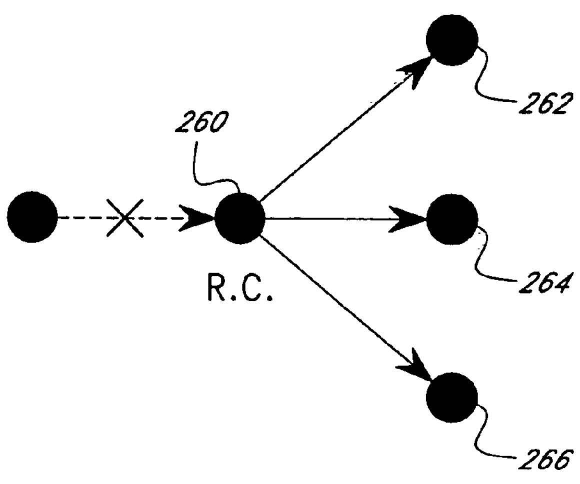
FIG. 23 is a diagram of application model objects and directed links, illustrating a root cause analysis method of investigating incriminating links to find a root cause candidate object, in accordance with one embodiment of the meta-application.
Figure 24:
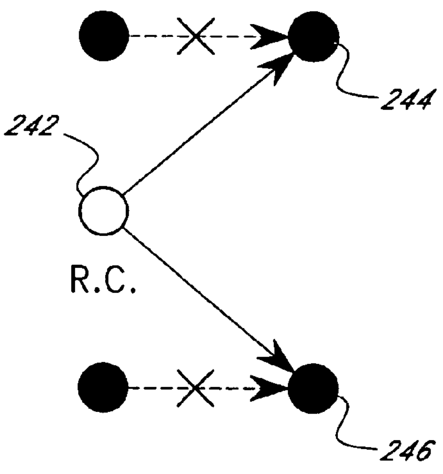
FIGS. 24 and 25 are diagrams of application model objects and directed links, illustrating root cause analysis methods of investigating bystander objects to find a root cause candidate object, in accordance with embodiments of the meta-application.

If a Problem Logic rule triggers, but an associated remedy fails to cure the problem, the root cause analysis module 41 can preferably discover other possible remedies. FIGS. 23 and 24, for example, illustrate how root cause analysis can implicate "bystander" problem objects in the application model 24, which Problem Logic may not have detected (FIGS. 23 and 24 are described below). The root cause analysis module 41 preferably conducts diagnostic unit tests and remedies on these objects, the unit tests and remedies being preferably stored in the application model 24 in association with the objects. Therefore, these root cause analysis actions may solve problems that Problem Logic would give up on.

Causes and Root Causes

For a meta-application 20, one operationally useful definition of cause, suitable for investigation, requires that a cause be discoverable, a relatively permanent record (i.e., preferably not an extremely transitory state or human participant), curable, and optionally time-stamped. A timestamp can be precise (e.g., file creation date, log file entry time, etc.), coarse (e.g., occurred after a prior Windows™ registry backup time), or nonexistent.

A cause, in the context of a meta-application 20, typically comprises specific physical data on a specific physical machine. A cause might be a bad binary, setting, file, installation, or anomalous data. Less common causes might be a service state (e.g., a service was never started), performance limit, and resource limit. For example, in the case of a meta-application 20 that manages a deployment 10 of Microsoft Exchange™, causes can arise from software bug/design, installation, permissions/security, other software, data peculiarity, networking configuration, other configuration, Active Directory, service, Metabase/MSIE, Registry, performance limit, files, hardware, and viruses or worms.

A root cause is a main cause. This means, particularly, that a root cause has no antecedent cause in any chain of causally linked causes. If a root cause is remedied, there is no reason for it to quickly reappear, because such a reason would be an upstream cause (i.e., upstream in the causality chain). On the other hand, remedied ordinary causes could reappear because upstream generating causes remain unremedied. A root cause is not necessarily an original cause, for the reason that original causes often are not discoverable. What is desirable is that a root cause be a main cause, which, if cured, leads expeditiously to the cure of a plurality (preferably all) of extant abnormal conditions in the deployment 10 managed by the meta-application 20.

Root Cause Analysis Algorithm

This section describes a preferred algorithm conducted by the root cause analysis module 41 to perform root cause analysis. As discussed above, the meta-application 20 preferably has an internalized description of the application deployment 10, referred to herein as the application model 24. A preferred approach to root cause analysis discerns root causes by examining the state of the application model 24. In a preferred embodiment, the application model 24 comprises a labeled, directed graph that includes representations of all significant deployment objects that might be implicated or affected by a problem or set of problems, including causes and root causes. Classes of objects within the application model 24 can provide diagnostic unit tests and remedies as methods that can be applied to the actual objects in the deployment 10, generally at some cost (e.g., time, space, risk, temporary loss of service, or required human assistance). Preferably, the objects in the application model 24 themselves provide history logs, dependencies, and causal links as data members.

The application model 24 provides a number of functionalities to the meta-application 20, preferably including (i) consistency, (ii) sharing, (iii) transparency, (iv) archival, and (v) database functionalities. With regard to consistency, the application model 24 preferably enforces a consistent view among Problem Logic rules, such that the application model reduces the possibility of contradictory assumptions made by the meta-application 20. Also, the Problem Logic rules preferably "speak the same language." Regarding sharing, the application model 24 reduces duplication of deployment 10 information, by maintaining a centralized, dynamically updating repository of such information. With regard to transparency, the application model 24 provides a concentrated data structure that permits easier understanding of the application deployment 10, compared to more diffusely spread out procedural knowledge. Other components of the meta-application 20 preferably have visibility into the application model 24 and can traverse its data structure. Regarding archival, the application model 24 can preferably be backed up. Recordation of the history of the application deployment state can provide numerous benefits. Finally, powerful, unpredictable queries can be run against the application model 24 as a database.

Thus, preferred root cause analysis algorithms use the application model 24 as a tool to find causes and root causes. In the preferred embodiment, an approach to root cause analysis involves iterated pattern recognition within the application model 24 to identify potential causes and root causes, and applying diagnostic unit tests to further isolate causes, including root causes, of problems existing in the deployment 10. In this general approach, application model images of root causes are identifiable as characteristic substructures of the application model data structure. One particular root cause analysis algorithm is the following:

```
Root Cause Analysis Algorithm:
while (true) {
Mark anomalous objects on the application model 24;
Use pattern-recognition to identify causes and candidate
    root causes on the marked application model 24;
Apply diagnostic unit tests on candidate root cause objects;
Report or remedy root cause objects;
}
```

A root cause analysis algorithm, such as the one above, can be called as a subroutine by the overall orchestration module 21 of the meta-application 20. For example:

```
Orchestration Algorithm:
while (true) {
if (Problem Logic can do processing) {
    Call Problem Logic;
} else if (Root Cause Analysis can do processing) {
    Call Root Cause Analysis;
} else {
    Other processing;
};
}
```

Since the Problem Logic algorithm provides very domain-specific and especially effective knowledge for quickly remedying application deployment problems, the orchestration module 21 preferably calls Problem Logic first when investigating anomalous events. In cases where Problem Logic is unable to provide actionable information relating to problems, the orchestration module 21 preferably calls a suitable root cause analysis algorithm. Since the preferred root cause analysis algorithm relies on very general pattern recognition, search, and diagnostic unit testing, it is advantageously used when Problem Logic is unable to remedy a problem.

An initial step in the preferred root cause analysis algorithm is to mark anomalous objects on the application model 24. One method of marking anomalous objects involves identifying objects implicated by Problem Logic activities. For example, objects that are bound to variables in either partially or completely triggered rules can be marked. Another method of marking anomalous objects involves modeling. For example, mathematical modeling and baselining of deployment 10 objects can identify anomalies even if no Problem Logic rules are actively operating on such objects. Skilled artisans will recognize that a variety of other methods can alternatively or additionally be used to mark anomalous objects of the application model 24. Marked objects are sometimes referred to herein as "problem objects" or "unhealthy objects."

After problem objects are "marked" on the application model 24, a following step of the preferred root cause analysis algorithm is to use pattern recognition to identify causes and candidate root causes on the marked application model. A variety of different strategies can be employed to find causes and root causes. Some of these strategies are now described. Skilled artisans will appreciate that the techniques described below are not exhaustive, and other approaches may be available.

Figure 27:
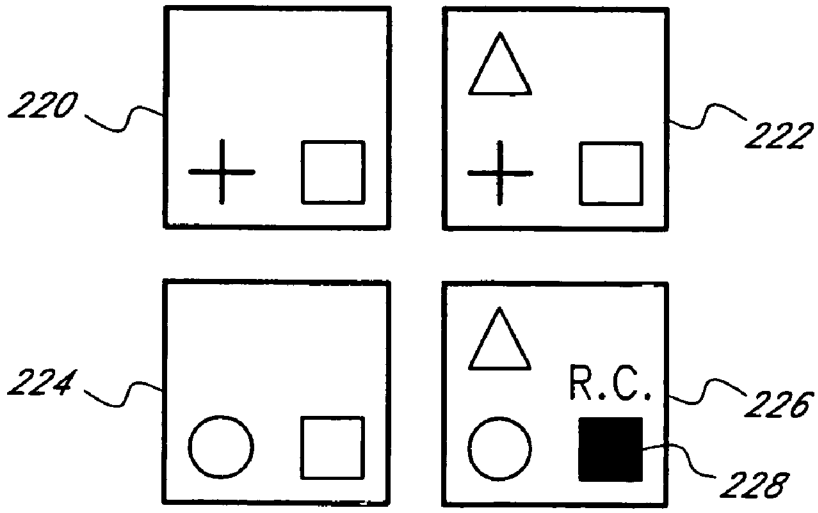
FIG. 27 is a diagram of application model objects, illustrating a root cause analysis method of finding differences between similar types of objects to find a root cause candidate object, in accordance with one embodiment of the meta-application.

One pattern-recognition technique, "configuration analysis," looks for recent property changes of marked objects of the application model 24. A related technique is to look for recent local configuration changes of objects that are "near" the marked objects. For example, FIG. 27 shows four identical application model objects 220, 222, 224, and 226. Suppose the object 226 is marked as having a problem. Comparing the configuration of the problem object 226 to all three healthy objects 220, 222, and 224, the standout dissimilarity is the small square 228 in the lower right corner. This square 228 is filled in the problem object 226 and unfilled in the healthy objects 220, 222, and 224. For example, the square 228 may represent a backed up mail queue or a disk space that is over quota. Therefore, the square 228 can be identified as a root cause candidate.

Another pattern-recognition technique, "cluster analysis," involves grouping marked objects that are near each other in the application model 24 into clusters, such as by a k-means cluster analysis algorithm (k-means clustering is known in the art). Within a cluster, a prime suspect for a root cause candidate can be identified by suitable, plausible criteria, such as by considering causal links, dependencies, temporality, application model topology, and diagnostic unit tests. Appropriate cluster analysis dimensions include numerical measurements such as performance counters, math model statistics, link distance in the application model 24, object similarity measures, and time. Further details concerning this "clustering" approach are disclosed in U.S. Provisional Patent Application No. 60/638,006, particularly on pages 70-73 and Appendix A thereof.

Figure 25:
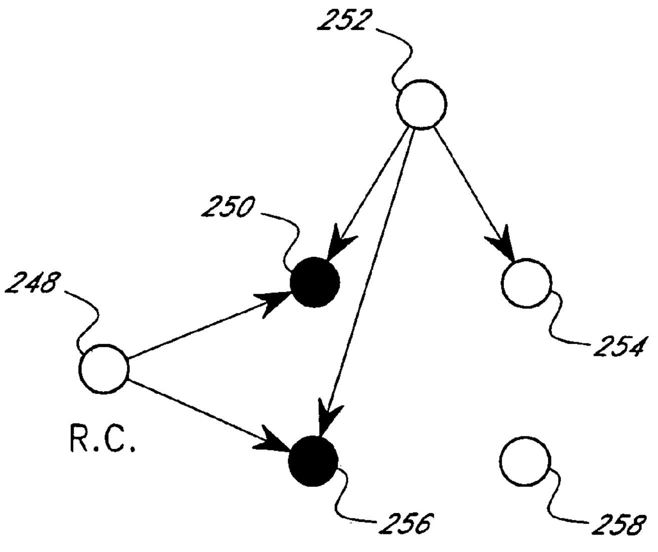
Figure 26:
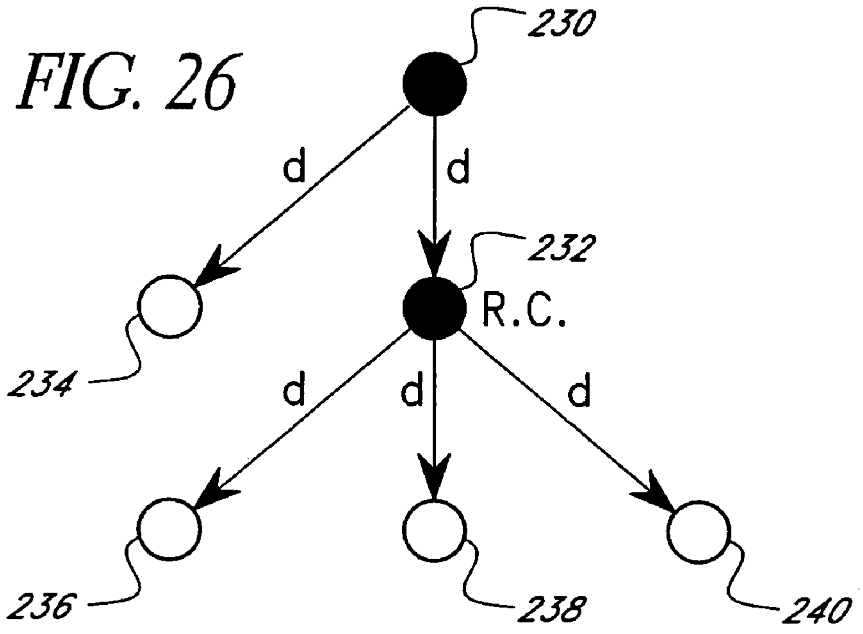
FIG. 26 is a diagram of application model objects and directed dependency links, illustrating a root cause analysis method of investigating incriminating dependency links to find a root cause candidate object, in accordance with one embodiment of the meta-application.

Another pattern-recognition technique, "link analysis," involves investigating incriminating links or other information relating objects in the application model 24. FIG. 23 illustrates an example, involving unhealthy objects 260, 262, 264, and 266. The object 260 has directed links to the other three objects. Further, there are no unhealthy objects that have directed links to the object 260 (in FIG. 23, this condition is represented by showing an unhealthy object with a directed link in a dotted line to the object 260, and by showing an "X" on the dotted line). Since the object 260 points to other unhealthy objects, but has no unhealthy objects pointing to it, the object 260 is preferably flagged a root cause candidate. FIG. 26 illustrates another example, involving application model objects 230, 232, 234, 236, 238, and 240. In this example, an arrow extending from a first object to a second object with a "d" label means that the first object depends on the second object. For example, the first object may be a component of the second object, which means that the first object depends on the second object. Diagnostic unit tests can be applied to the application model objects in the "neighborhood" (i.e., nearby in the application model 24 representation of the deployment 10) of a detected problem. Suppose the objects 230 and 232 fail their unit tests (in FIGS. 23-26, the failure of a unit test is denoted by a darkened circle, and the passing of a unit test is denoted by an unfilled circle), and the objects 234, 236, 238, and 240 pass their unit tests. The failed object 230 depends on the failed object 232. Since the failed object 232 does not depend on any other failed object, the object 232 is preferably flagged as a root cause candidate.

Another pattern-recognition technique, "self comparison," involves comparing parts of the application model 24 to other parts of the application model. The differences between healthy parts and unhealthy parts that do not show up as differences between different healthy parts are identified as causes. For example, suppose a comparison between an unhealthy object and a healthy object reveals different IP addresses and different DNS settings. Suppose also that a comparison between two healthy objects reveals different IP addresses and the same DNS setting, which happens to be different than the DNS setting on the unhealthy object. The IP address of the unhealthy object should not be considered a root cause candidate, because different healthy objects have different IP addresses. However, the anomalous DNS setting of the unhealthy object can be flagged as a root cause candidate because different healthy objects have the same DNS setting, which is different than the DNS setting of the unhealthy object. FIG. 27 (discussed above) also illustrates this approach.

Another pattern-recognition technique, "temporal comparison," is also exemplified by FIG. 27. This involves comparing the current state of the application model 24 and a previous state, to ascertain temporal differences.

Another pattern-recognition technique, "bystander analysis," involves investigating "bystander" objects. Ostensibly healthy objects (as determined, for example, by conducting successful unit tests) that are adjacent to or near a number of unhealthy objects are treated with suspicion. If an ostensibly healthy object has a common type of link (not necessarily a dependency link) to all of the unhealthy objects, and if similar healthy objects are not linked to the unhealthy objects, then the first healthy object should be investigated. For example, FIG. 24 shows a healthy object 242 having directed links to unhealthy objects 244 and 246. Suppose that there are no unhealthy objects having directed links to the objects 244 and 246. In this case, the object 242 can be flagged as a root cause candidate because it is linked with multiple unhealthy objects that have no unhealthy objects linked to them. FIG. 25 shows another example, involving ostensibly healthy objects 248, 252, 254, and 258, and unhealthy objects 250 and 256. The object 248 has directed links to objects 250 and 256. The object 252 has directed links to objects 250, 256, and 254. The object 258 has no links to the other illustrated objects. Observe that multiple ostensibly healthy objects (objects 248 and 252) point to the same unhealthy objects 250 and 256. However, since the object 248 points only to unhealthy objects, it is the preferred root cause candidate, in contrast to the object 252 that points to both unhealthy and healthy objects.

Once pattern-recognition techniques are used to identify root cause candidates, a following step in the preferred root cause analysis algorithm is to conduct increased diagnostics, troubleshooting, or remedies with respect to objects appearing in or intersecting with root cause candidate structures. Diagnostic unit tests are preferably first attempted on the root causes. If this does not resolve a problem, then diagnostic unit tests are preferably applied on non-root causes. The results are preferably fed back into the application model 24. For example, test results of the diagnostic unit tests can be cached in the history logs of the application model objects to minimize duplicate testing. Then, the root cause analysis algorithm loop is repeated. This can be done in a well-founded way to guarantee termination if necessary. In other words, the algorithm can contain some criteria for stopping. However, it is also sufficient that the root cause analysis algorithm loop act as a perpetual ongoing process, provided that there is sufficient guarantee that the algorithm can keep up with all the work that is supplied to it (and which it may generate for itself).

Diagnostic unit tests for candidate root cause objects are provided as methods of the application model object classes corresponding to the suspect objects. The diagnostic unit tests can comprise diagnostic troubleshooting methodologies (as described above in the "Encoding Diagnostic Methodologies" subsection of the "Encoding Knowledge" section) or other appropriate specific diagnostic tests (e.g., executables, tests provided by the maker of the managed application 10, meta-application shims, etc.) that provide useful output. The diagnostic unit tests preferably narrow down suspect object lists, drill down into component objects, chase causes backwards, identify new suspect objects to consider, etc. In addition to these approaches, diagnostic unit tests can possibly request additional telemetry that causes new feature information to be fed into Problem Logic for further consideration by the meta-application 20.

Once these increased diagnostics, troubleshooting, or remedies are conducted with respect to the root cause candidate objects, a following step in the preferred root cause analysis algorithm is to report or remedy the root cause objects. Root cause analysis identifies root cause objects in the application deployment 10 through inspection of the marked topology of the application model 24 and drill down unit diagnostic testing of suspect candidate root cause objects.

Root cause analysis can lead to a positive outcome in several ways. First, identifying candidate root causes leads directly to the possibility of the RCA module 41 applying problem object class remedies to the problem objects that have been identified as root causes. Second, the root cause analysis processing, through the diagnostic unit testing, may stimulate useful new feature information that will feed into Problem Logic, trigger Problem Logic rules, and resolve problems by the Problem Logic mechanism described above. Third, even if no remedy is found for some problems, root cause analysis can nevertheless provide valuable insight to a human administrator through the GUI 29. In such an "open loop," the administrator and the meta-application 20 can cooperate to semi-automatically diagnose and resolve problems by focusing on the menus of possible problem objects that the RCA module 41 reports.

Remedy outcomes (success or failure) can be stored in the history logs of the application model objects, to prevent repeated execution of remedies that have already been attempted and also to influence future repairs of identical or similar problems. Likewise, aggregate statistical information is propagated to static data members of the involved problem object classes.

An additional functional role for root cause analysis can be to further enhance the structured causality determination capabilities of Problem Logic. As successes are found during this less structured augmentation to causality determination, the knowledge of the causality can be encoded, manually or automatically, back into Problem Logic. Further, statistics on application model objects related to root causality can be tabulated for future reference by other modules and/or end users.

Encoding Knowledge

Encoding Goals

The Problem Logic encoding preferably includes encoding for logic rules and an encoding format for predicates. The predicate information in the encoding is used for problem detection purposes, but may also include data that is important for feature detection and implementing queries of the application model 24.

A preferred knowledge encoding methodology includes one or more of a number of advantageous aspects, such as the following: The encoding is preferably expressive enough to represent any possible, valid rule. The encoding can preferably naturally represent metadata associated with rule components. The encoding is preferably extensible in a backward-compatible way, to avoid having to recode all the logic rules if the encoding format is extended. The encoding preferably facilitates easy validation (preferably directly in an editing tool used to create or modify the encoding), so that an encoder can analyze an encoded rule or set of rules without actually running them through the meta-application 20 (e.g., spelling checks, basic sanity checks, predicate validity, rule triggerability, etc.). The encoding format preferably facilitates relatively easy encoding once the encoder understands the logic of a rule. In other words, the encoding should not require the encoder to prepare a complicated translation to the encoding format—it should be "natural." Also, predicates are preferably relatively easy to add (especially those that simply comprise queries for information about the deployment 10). Preferably, "super-encoders" can add predicates in a manner that allows other encoders to simply use them. In a sense, this provides a macro-capability to create simple predicates with complex underlying implementations that can be coded without the need to recompile the meta-application 20.

It will be understood that knowledge can be encoded from a large variety of different types of knowledge sources, including knowledge base articles, books, other text documents, information obtained from domain experts, orally received knowledge, and the like.

Encoding Language Formats

The encoding can be done in any suitable language. Two possible approaches for encoding the symptom logic are a "prolog-like" format and an XML format. The prolog approach has the advantage that it is easier to translate from an abstract logical understanding of a rule to a prolog rule, but only for encoders familiar with prolog. A disadvantage of prolog is that it may require a custom language (i.e., an extension of prolog) and custom tools to enter, edit, validate, and parse the language.

The XML approach has the advantage that there is already a standard (XML Schema) to describe significant parts of the Problem Logic rule XML format, and excellent pre-existing XML tools can be used to facilitate entry, editing, validation, and parsing. XML also allows for backwardly compatible extension and for adding new data to any rule component. A possible disadvantage of XML is that it takes some extra effort to translate abstract logical understanding into the XML format, unless one is very familiar with XML and the Problem Logic XML format. A hybrid approach would be to enter rules in a prolog-like language which is then translated to the XML format (in which it is easier to do normal editing, metadata editing, validation, and parsing).

In either approach, once the encoding is parsed, the output is preferably an identical parse tree, and all downstream components of the encoded knowledge are preferably completely unaware of how the knowledge was originally encoded.

Encoded knowledge, such as the knowledge stored in the knowledge base 22, can come from a variety of sources. Two important sources of knowledge are knowledge base articles and recommended diagnostic procedures extracted from human experts. These types of knowledge can be encoded manually or automatically. Manual and automated encoding methods are described below.

Encoding Process

The following is one possible procedure by which encoders can generate logic rules from knowledge sources. This description is provided in the context of encoding knowledge derived from knowledge base articles, such as Microsoft™ Knowledge Base articles. However, aspects of this procedure can also be used for encoding diagnostic methods, which are more fully described in the next subsection of this application. Also, while the following description is provided in the context of using XML as a programming language, it will be appreciated that other programming languages can be used. Skilled artisans will also understand that the encoding process can encompass additional or fewer steps than set forth below, and that the following represents only one embodiment. Some of the steps in this procedure can be partially or fully automated within software.

In a first step, the encoder preferably reads the knowledge base article or other knowledge source text in order to understand the problem and how it may be programmatically identified. This may entail identifying application model objects and telemetry predicates (if any) associated with the article. The encoder may need to review a resolution section of the article to fully identify all the components required for identification of the particular problem. The encoder may also need to run administrative tools that are referenced in the article (or related to things in the article) to learn about which objects of the application model 24 are involved, as well as the objects' relevant properties.

In a next step, the encoder preferably identifies or generates a query that will locate all relevant objects of the application model 24. This step produces application model query predicates that can be encoded in the rule. Some queries may be so common (in other Problem Logic rules) that there may already be a predicate created for it, which can be used as a shortcut.

In a next step, if it is necessary to insert a telemetry predicate into the rule, the encoder can find the correct predicate from a predicate list in the XML Schema (see "Application Model" section above). The encoder should check the argument types in the XML Schema of the predicate to determine whether it has all the required application model objects. If not, then the encoder can use the application model objects in hand to find the query that will obtain the other correct application model objects (through various relationships, such as parent-child, dependency, and others).

In a next step, the encoder preferably identifies the logic of the rule and encodes the rule using all the predicates identified in previous steps and the logical connectives described above, including but not limited to AND, OR, and THEN.

In a next step, the encoder assigns "contribution" values to each of the predicates of the rule. In one embodiment, predicates generally have a contribution of "very high" (or the like), meaning that the predicate is very important and its absence/existence should significantly lower/increase the confidence that the rule is triggered (the exact effect depends on the logic of the rule). However, there are some instances in which a predicate is obviously less important, usually because a knowledge base article uses language like "may" or "could be affected by," or the article is very vague about the importance of a particular component. If the encoder is unclear about the role of a predicate in the rule, it is best to seek clarification from an expert associated with the managed application 10. As explained above, the contribution value can intuitively be thought of as a metric that slightly modifies the behavior of an AND gate, so that a "minor" input to the AND gate does not adversely affect the confidence of a rule (by making it too low) if the input is false. Similarly, if a minor input to an OR gate is true, in some cases it should be given a low contribution value so that it does not too greatly increase the confidence of a rule.

In a next step, the encoder assigns "need" values or attributes to each predicate, which indicate if the predicate is required for the logic of the rule. Intuitively, if a predicate's need value is "required," then a false predicate can "veto" an AND gate and set its output confidence to zero, even if other predicates have non-zero confidences. Conversely, if a predicate has a high confidence and a need value of "required," it can "favor" an OR gate even if the other predicates have zero confidence. On the other hand, if a predicate's need value is "optional," then the predicate is essentially not needed. If the optional predicate is false and is an input to an AND gate, then the AND gate will not necessarily have a zero confidence. If an optional predicate is true and is an input to an AND gate, then the AND gate will have a higher confidence. For example, suppose a rule has two telemetry predicates that must be true for the rule to trigger. Suppose further that the rule includes a predicate describing a "user-generated event" that, if true, should increase the rule's confidence, and that, if not true, should not affect the rule's confidence. The desired result can be achieved by setting the need value of the user-generated event to "optional." By default, predicates should generally have need values of "required" and contribution values of "very high," which should be changed only when there is a clear need.

Once the rule is completely encoded, it can be validated against the XML Schema, which should identify typographical errors and gross syntactic errors. After XML validation, the rule can be validated for logic errors (malformed queries, incorrect triggering sequence, etc.). After these validations, the encoded logic rule is ready to be inserted into the knowledge base 22 of the meta-application 20.

XML Encoding

As explained above, XML is a preferred encoding language for the logic rules in the knowledge base 22. In a preferred embodiment, the XML encoding is split into two formats: an entry-optimized "authoring" format and a "native" format. The authoring format allows for the use of macros and shortcuts (like embedding simple child tags as attributes on a parent tag or defaulting entire sections of XML so that the encoder does not need to create them, unless the encoders wants to specialize it) to simplify the encoding and to make the encoding more brief. The authoring format provides a layer of abstraction above the native XML that can be changed independently of rules and can insulate rules from structural or best practices changes in rule encoding. The authoring XML can be transformed by XSLT into the native XML, and it is during the transformation process that macros and shortcuts are transformed to the more verbose native format.

The native format is preferably optimized to express rules in the most precise way possible to simplify the meta-application's internalization of the rules. The native format more closely resembles the structure needed by Problem Logic. While the native format can be entered and edited by an encoder, in a preferred process the encoder uses the authoring XML format. The encoder preferably very rarely works on the authoring-to-native XSL transforms. Having a transparent look at the parse tree before it goes into the meta-application 20 should also facilitate debugging, since no "extra" transformations will be done in the meta-application 20 and thus be a black box to encoders.

Thus, a preferred XML encoding process involves the steps described below. Skilled artisans will understand that the XML encoding process can encompass additional or fewer steps than set forth below, and that the following represents only one embodiment.

In a first step, encoders write the rule in authoring format, which should be a concise and easy format to use. Since an XML Schema that defines the authoring format exists, the XML entry tool can be configured to automatically validate the rule as it is authored. The authoring format is preferably specially built to allow the XML Schema to check as much of the validity of a rule as possible, so that new tags are created for each predicate instead of having a single predicate tag. This allows the XML Schema to properly validate each predicate individually.

In a next step, the authoring XML is transformed via XSLT into native format. In this step, macros and shortcuts can be expanded. Any transformation that is achievable by XSLT can help simplify authoring XML. XSL provides a convenient and relatively easy mechanism to help simplify authoring XML. For the lightweight macro-like activities of this stage, XSL should be sufficient, with the advantage that encoders can use a simplified format that reduces errors on the authoring side. If XSLT does not provide enough functionality, then additional C++ code can be provided to transform post-XSLT transformed authoring XML into native XML.

In a next step, the native XML is fed into the meta-application 20, which internalizes the rule. Preferably, an XML Schema exists to allow the meta-application 20 to validate the native XML at this stage. Then, in a next step, a command line tool can perform additional validations of the rules. For example, the command line tool can verify that a rule has a proper triggering chain, that the queries are well formed, etc. This tool can be used by encoders to ensure that the rule is optimally formed.

Further guidance is provided by U.S. Provisional Patent Application No. 60/638,006, which discloses, in Appendix B, (1) exemplary XML Schema and encoded logic rules, and (2) exemplary rule component tags for implementing query predicates.

Encoding Diagnostic Methodologies

Some sources of knowledge about the managed application 10, such as knowledge base articles and other reference materials, tend to describe problems in an ad hoc manner. For example, a knowledge base article is only relevant if the particular features described in the article are currently present within the deployment 10. If the meta-application 20 finds that a particular logical combination of conditions (i.e., a rule) exists, then the problem is matched and an associated remedy can be identified. However, since knowledge base articles represent isolated knowledge points, rules obtained from knowledge base articles often do not lend themselves to an intelligent organization or hierarchy within Problem Logic. Another limitation of knowledge base articles is that, since they are generally issued by the maker of the software application 10, they are typically not comprehensive. The software maker typically only publishes knowledge base articles when enough customers submit questions or complaints about certain problems. Thus, many types of problems are not described by knowledge base articles. Also, many knowledge base articles are relevant only to specific versions of the software, which may be superseded by a new version shortly after the knowledge base article is released.

These limitations can be substantially overcome by encoding diagnostic troubleshooting methods that human experts would use when confronted with one or more anomalous features or problems with the deployment 10. Accordingly, a preferred embodiment of the meta-application 20 employs diagnostic methods that are encoded as rules within the knowledge base 22 and then used by Problem Logic to detect problems within the deployment 10. One embodiment involves constructing separate diagnostic methods that each focus (either exclusively or non-exclusively) on one of the components of the application model 24. This approach offers a more coherent and natural way to detect problems, and it lends itself to a substantially more intelligent organization or hierarchy of rules within Problem Logic. Skilled artisans will appreciate that encoded diagnostic methods can be utilized in addition to other forms of knowledge, such as knowledge base articles, best practices, and the like.

A preferred method of encoding diagnostic troubleshooting methodologies involves creating troubleshooting decision trees in the form of computer-implemented flow charts, and then using a tool to programmatically convert the flow charts into encoded knowledge that can be used by the meta-application 20. The following describes a method in accordance with one embodiment.

In a first step, one or more individuals with a high level of expertise about an application 10 to be managed by the meta-application 20 ("troubleshooting experts") create the knowledge to be leveraged. Rules or troubleshooting methodologies are preferably diagrammatically specified in a flowchart-like structure, such that the rules are made up of a network of "decision factors" that have "yes" and "no" paths. Compared to an encoded form (e.g., XML), this diagrammatic representation of the diagnostic method is much more intuitive and easy to review, understand, and check for correctness. In one embodiment, a tool like Visio™ is used with customized plugins to facilitate the knowledge creation and encoding. In this context, each rule is a different navigation of a series of decision factors (i.e., a different combination of yes or no paths following decision factors), ending in a set of remedies/plans. The troubleshooting expert(s) can create separate trees of rules, such that each tree substantially covers one of a plurality of preferably non-overlapping "critical components" of the application model 24. In some embodiments, decision factors can be shared among trees. Also, in some embodiments decision factors can be specified at a high level for each tree creation step. Troubleshooting experts can use these "high-level decision factors," even if they were created by other troubleshooting experts, to produce a low-level specification of the decision factor, which can be encoded by a knowledge engineer who does not have full expertise about the application 10 (see next paragraph). The low-level specification preferably takes into account the inputs and outputs required for each decision factor in a tree, so that the set of decision factors for a tree will be consistent. In this context, a high-level decision factor comprises a broad, high-level statement of the decision factor, suitable for human consumption.

Figure 41:
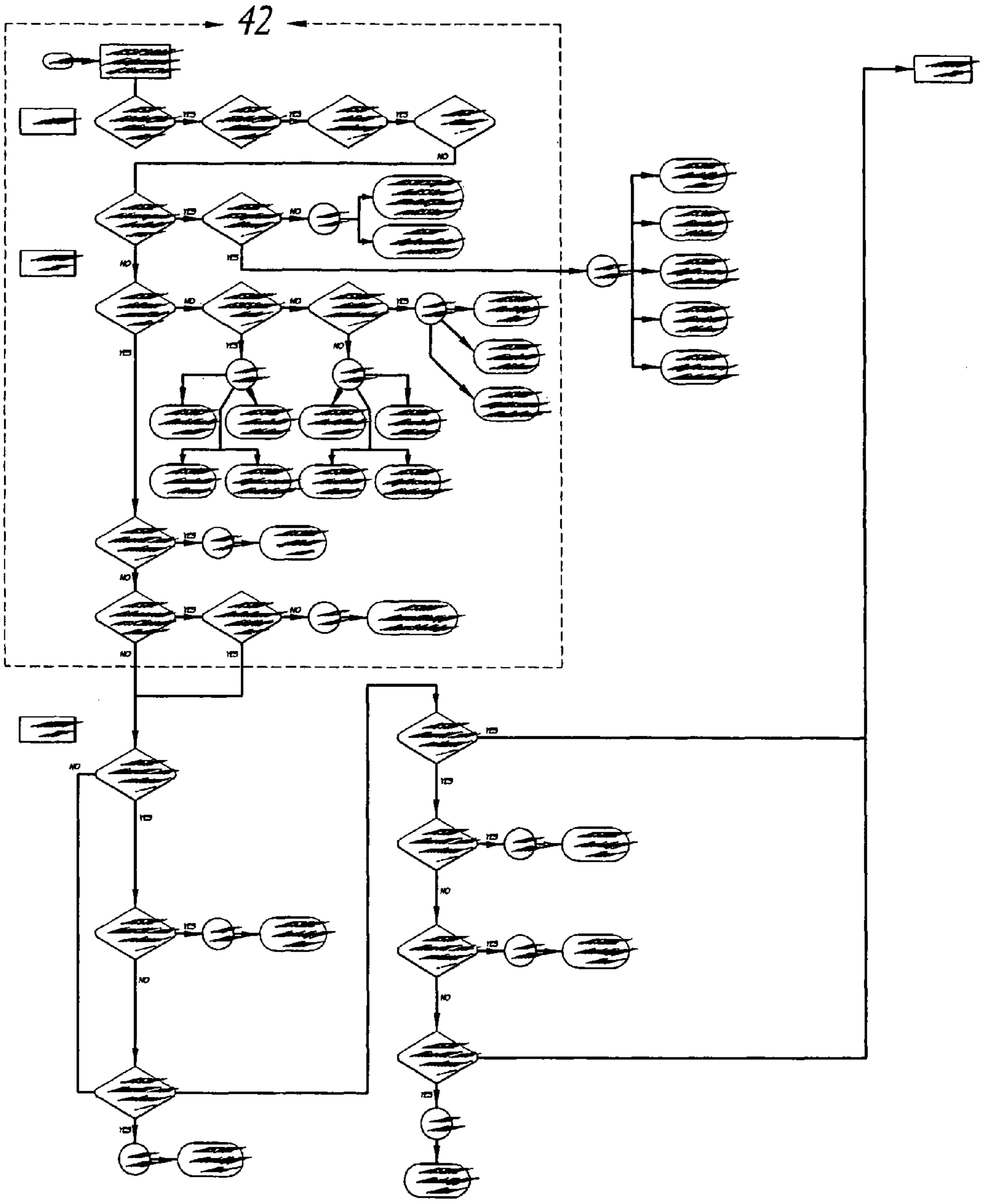
FIG. 41 is a flowchart illustrating a diagnostic method for troubleshooting a set of components of a deployment, in accordance with one embodiment.
Figure 42:
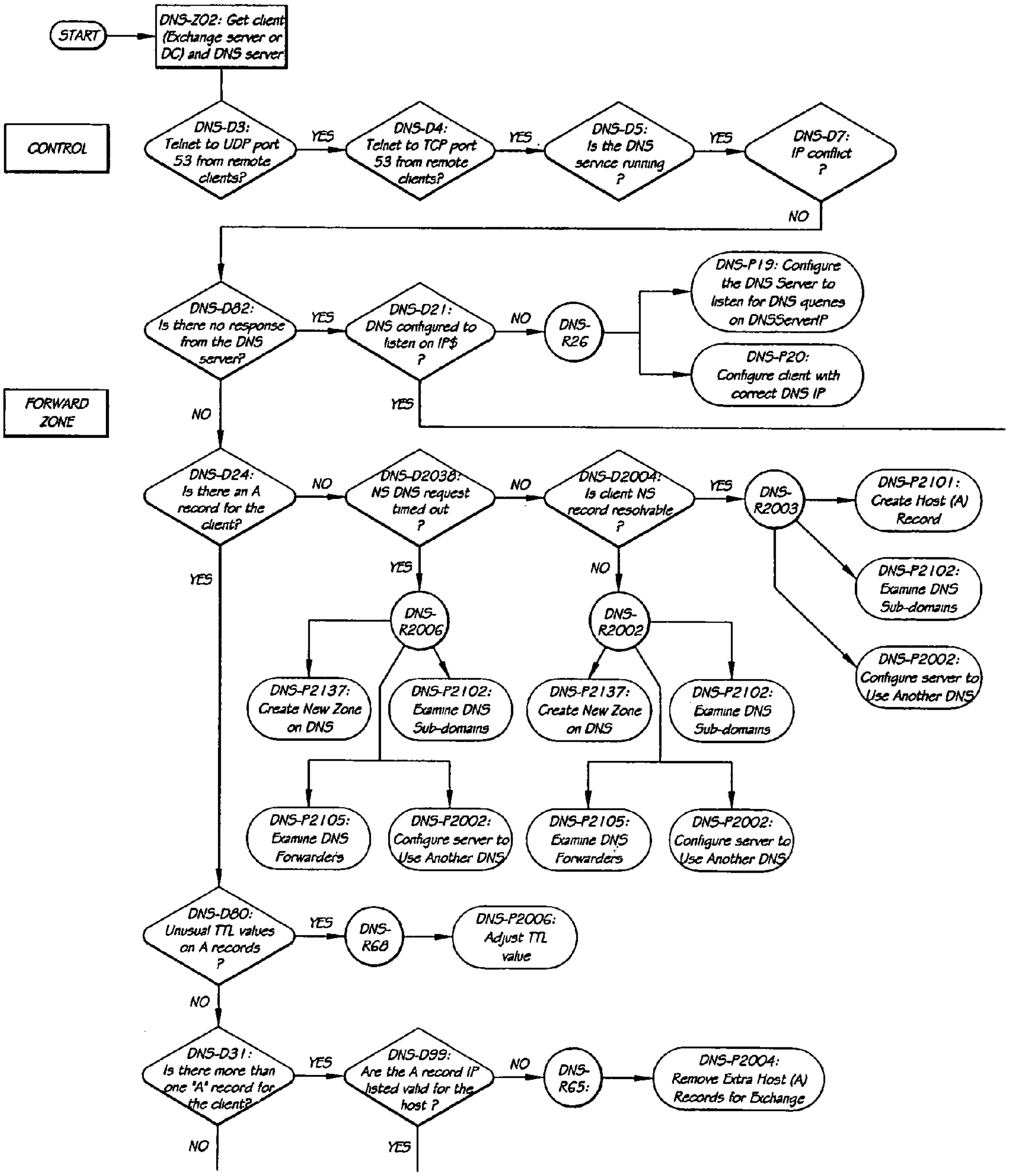
FIG. 42 is an enlarged view of a portion of FIG. 41.

FIG. 41 shows an example of a high-level flowchart that describes a diagnostic troubleshooting method for troubleshooting a component (e.g., a set of related objects) of an application model 24 for a deployment 10 of Microsoft Exchange™. The illustrated flowchart includes decision factors having "yes" and "no" paths. Those of ordinary skill in the art will appreciate that flowcharts such the one shown in FIG. 41 can be provided for a plurality of different objects or groups of objects of the application model 24. Preferably, enough flowcharts like that shown in FIG. 41 are provided so that every object in the application model 24 can be diagnosed or troubleshot by at least one of the flowcharts. Such flowcharts will typically differ depending upon the specific application 10 that is managed. FIG. 42 shows a portion of the flowchart of FIG. 41, magnified for ease of understanding.

A next step of the method comprises an intermediate encoding step, wherein the trees or flowcharts are optimized. Knowledge engineers without advanced expertise about the application 10 begin encoding the decision factors simultaneously using a suitable encoding language, thereby producing "low-level decision factors." Decision factor encoding can be reviewed by encoding experts to ensure quality. Actual implementation information, including additional inputs and outputs, may be required to produce valid rules (i.e., rules that are usable by Problem Logic), and encoders can optimize the decision factors by increasing the sharing of common data. These low-level decision factors may comprise encoded rule-fragments that may apply to various logic rules. However, each low-level decision factor is preferably encoded only once, and then a rule generation tool (see next paragraph) preferably plugs them into the various rules as required, or provides links/references from rules to encoded rule-fragments as necessary for each rule. In this manner, a meta-application 20 can contain an updatable library of low-level decision factors that are available for use as needed by various rules. The encoders can modify the knowledge flowchart (e.g., the Visio™ diagram) by inserting decision factor optimization information. In a typical scenario, each tree is owned by one knowledge engineer who does this. However, the approach preferably allows any given decision factor to be worked on by many knowledge engineers.

In a next step, the knowledge rules are generated. Once all the decision factors are encoded and reviewed, a "rule generation tool" can programmatically convert each of the computer-implemented knowledge trees (described above) and the encoded decision factors into a set of rules that completely implement the tree in an encoding language or format that can be used by the meta-application 20. The rule generation tool can have one or more of a variety of additional different functionalities, such as the following: First, since the tree represents knowledge at a high level, the rule generation tool can preferably verify knowledge consistency at a high level. Second, the tool can preferably automatically produce user-readable explanations of each rule based on the tree diagram and metadata in the decision factors. Third, the knowledge trees and the encoded decision factors preferably provide the rule generation tool with enough context to automatically perform many encoding tasks that would otherwise have to be done manually. Fourth, the tool can preferably automatically optimize rule encoding based on the known performance characteristics of the system. For example, the tool can be configured to merge decision factors to improve performance. Normally, this would involve the collaboration of multiple encoders, but the tool can perform the merging itself and thereby allow the encoders to work independently and more quickly. Fifth, the tool can preferably automatically produce rule metadata that can be used by downstream modules (e.g., the problem detector 38) to analyze the rules. In this regard, the tool can preferably specify all the decision factors at a high level so that the root cause analysis module 41 can determine if rules that the meta-application 20 matches are related to each other at a high level. Sixth, the rule can preferably automatically produce test plans and test data to make sure that the meta-application 20 can properly process the encoded knowledge. Once all the rules are generated, they can be used by the meta-application 20.

This approach offers a number of advantages. Encoding work can be divided into a number of stages that can be worked on by multiple people simultaneously. Logic decisions are made by troubleshooting experts, who produce an unambiguous tree (e.g., a Visio™ diagram) that can be more efficiently and intuitively analyzed and discussed. The rule generation tool can provide multiple functionalities, as discussed above, to improve the speed and quality of knowledge encoding. Encoding tasks that require global visibility are automated, which allows knowledge engineers to work on small self-contained tasks that can be more easily reviewed.

User Interface

As explained above, the meta-application 20 includes a user interface 29 (FIG. 1), which is preferably a graphical user interface (GUI). As explained above, the GUI 29 provides information to one or more human administrators of the meta-application 20. Such information can comprise, without limitation, a snapshot or overview of the deployment 10 (e.g., servers, processes, etc.), application model discovery processes, current status of deployment servers 12 (e.g., whether the servers 12 are healthy or problematic), detected features, detected problems, predicted future problems (so that the administrator can take some corrective action before the problem manifests itself), recommended corrective actions, currently active plans (including plan object trees), reports on the success or failure of plans, detected root-causes, and the like. The user interface 29 of the meta-application 20 can also or alternatively involve alerting administrators about relevant events through email messages or other notification methods. The user interface 29 can also be accessible over the Internet, such as by a web browser.

The meta-application 20 can be configured to leverage the output of other third party applications or operating systems that include functionality for monitoring the software application 10 (herein referred to as "third party monitoring tools"). For example, the GUI 29 can be designed to work seamlessly with MOM (Microsoft Operations Manager™). Thus, the meta-application 20 can function in two modes: "standalone mode" (without leveraging other monitoring applications) and "leveraging mode." In standalone mode, the meta-application 20 functions substantially as described above.

In a preferred embodiment of the leveraging mode, much of the meta-application 20 functions exactly as it would in standalone mode. The meta-application 20 collects telemetry from servers 12 across the network and evaluates the telemetry using feature detection algorithms and logic rules in the knowledge base 22, in order to determine problems and remedies. However, third party monitoring tools can add some additional dimensions to the solution. For example, MOM™ can act as a source of alerts related to Microsoft Exchange™. Through the Exchange™ management pack, MOM™ can determine problems that Exchange™ may be experiencing, primarily through event log notifications which can then be read by the meta-application 20. When a third party monitoring tool generates a new alert, the meta-application 20 can log a corresponding event (e.g., a feature) in the telemetry database 26, which can then be processed in the same way it would be if the meta-application were in standalone mode. Also, the meta-application 20 can use a third party monitoring tool's alerting capabilities to augment basic alerting provided by the meta-application 20 (e.g., email-based alerting). For example, MOM™ can send alerts to various devices, such as pagers, web services, and the like.

In embodiments of the leveraging mode, the meta-application 20 can synchronize its event state management with that of a third party monitoring tool. For example, as events in MOM™ are marked as "assigned," "acknowledged," or "closed," that state can be automatically replicated or reflected in the meta-application 20. Similarly, when a change is made to an event in the meta-application 20, that state change can be replicated in a third party monitoring tool. This allows IT users to work in the application of their preference, and have the relevant event state always present.

Figure 20:
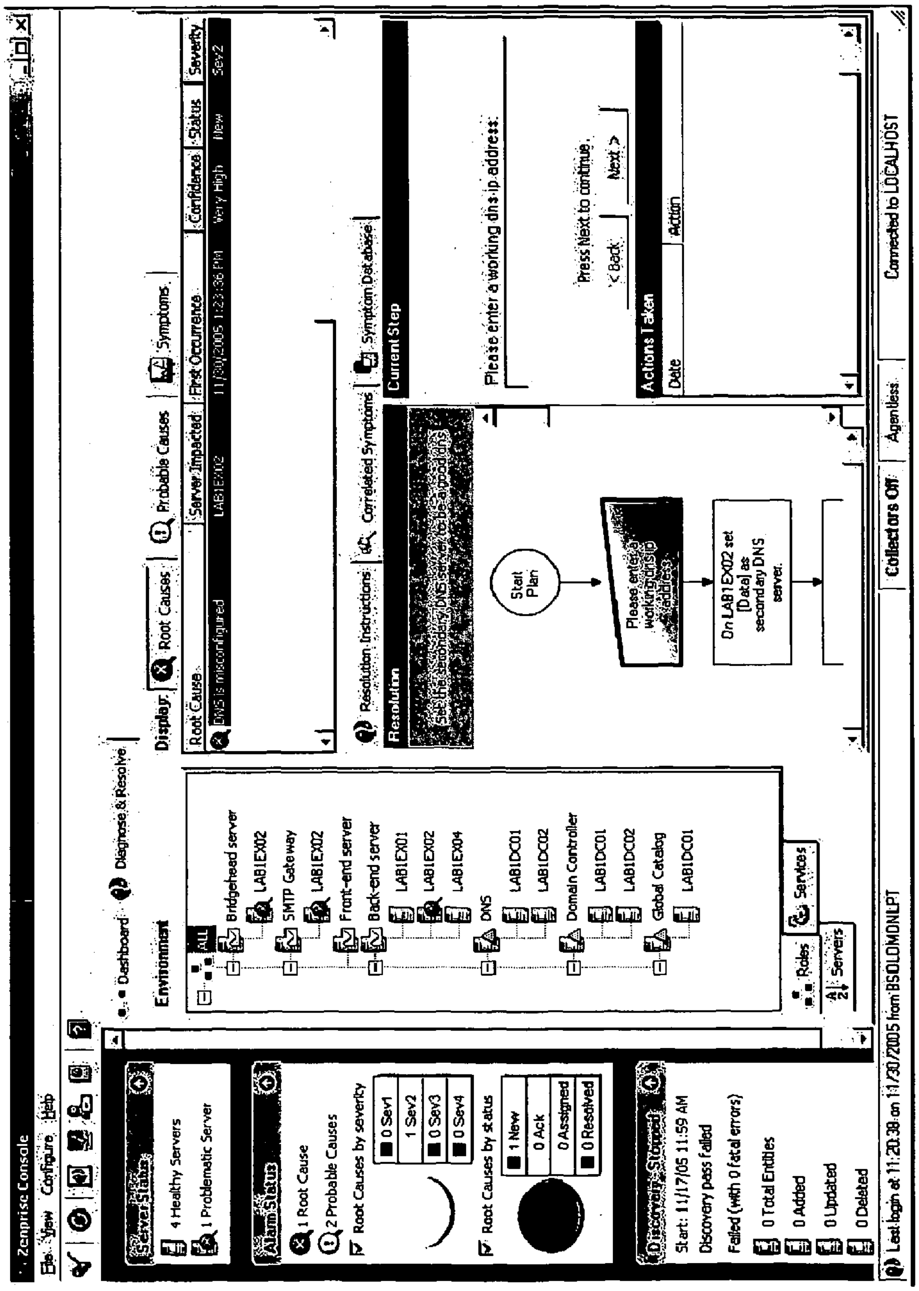
FIGS. 20 and 21 show sample screen shots of a graphical user interface of one embodiment of a meta-application.

FIG. 20 shows a GUI screen display of one embodiment of a meta-application 20, which manages a deployment 10 of Microsoft Exchange™. The screen conveys various types of information about the deployment 10. The "Environment" pane of the display screen illustrates the components of the deployment 10, as represented within the application model 24. The "Server Status" and "Alarm Status" boxes display summary information about problems (referred to in the screen display as "Root Causes") that exist or have recently been detected. More detailed information about specific problems is displayed in the "Root Cause" pane.

The "Resolution" pane shows a flow diagram of a particular plan that is currently being executed, with each block in the flow diagram corresponding to one step in the plan. The highlighted block represents the step currently being performed. In the illustrated display screen, the highlighted block states "Please enter a working dns ip address." The step currently being performed is described in the "Current Step" pane. In this example, the current step prompts the user of the meta-application 20 to enter a working DNS IP address, and the user's response to this inquiry dictates the next plan step that will be executed. Some steps within the plan are action steps that, if executed, cause a change in the state of the deployment 10.

Typically, the user of the meta-application 20 is provided with instructions for executing each action step via the GUI 29, or is given the option to specify whether the meta-application 20 should execute each such action step. The meta-application 20 can describe actions taken as the result of such action steps in an "Actions Taken" pane, and can also record them in a persistent log.

Figure 21:
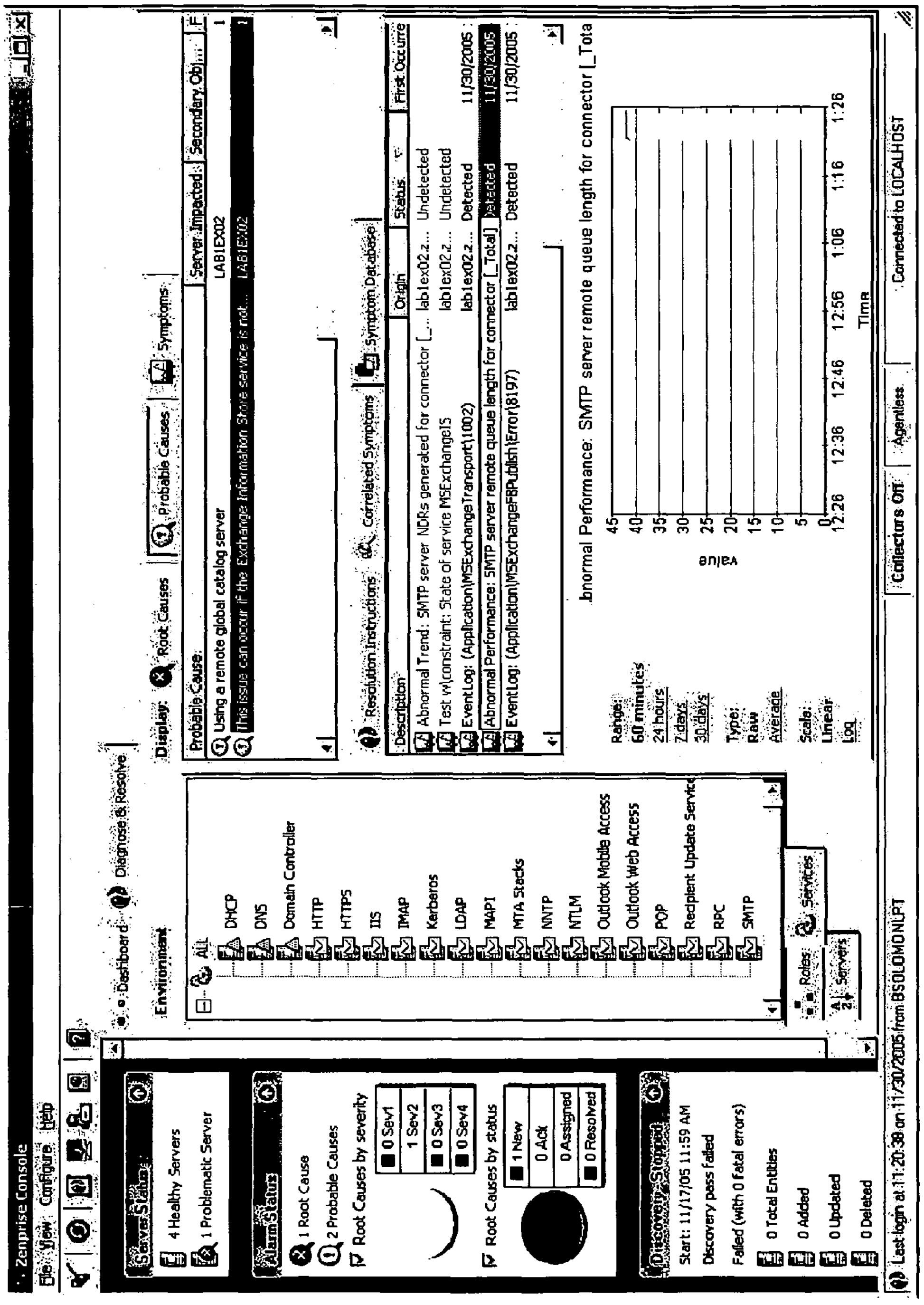

As shown in the screen display of FIG. 21, the GUI 29 can provide detailed information related to detected problems in a "Correlated Symptoms" pane. The GUI 29 can also provide an option for the user to view a knowledge source, such as a knowledge base article, associated with a problem that has been detected.

Example

This section describes an example in which a meta-application 20 uses encoded information extracted from a knowledge base article to diagnose and remedy a particular problem in a deployment 10 of Microsoft Exchange™. FIGS. 22A and 22B together show Microsoft™ Knowledge Base Article ID No. 815759. This particular article describes a problem in which public folder hierarchy messages are stuck in outgoing queues in an Exchange™ 2000 server. The article identifies, under the "SYMPTOMS" heading, two particular warning or information messages that may be logged in the application log. The articles also indicates, under the "CAUSE" heading, that the issue may occur when the "Everyone" group is explicitly denied permissions on both of two listed objects.

The knowledge base 22 of the meta-application 20 includes a logic rule that describes this problem. The rule includes two inexpensive feature predicates corresponding to the warning log messages, two inexpensive feature predicates describing the denied permissions of the "Everyone" group on the two listed objects, and one more expensive predicate comprising a "unit test" that tests whether email messages can be sent to public folders. The rule's specific logical combination of these predicates depending upon the relationships of the predicates to the problem. However, for simplicity suppose that the rule requires all five predicates to be true (e.g., all five predicates are inputs to an AND gate).

The Problem Detector 38 hosts various analysis algorithms, one of which is Problem Logic. Problem Logic has loaded the rule associated with the knowledge base article in FIGS. 22A-B. Once the rule is loaded, Problem Logic analyzes the rule and determines that, in order to evaluate the rule for the given deployment 10, multiple feature detectors need to be started (using the procedure detailed above). Accordingly, Problem Logic initiates these feature detectors, which then notify the appropriate monitors 14 to look for the events and other features of the rule.

For purposes of this example, assume that, in a deployment 10 managed by the meta-application 20, the permissions on the public folder are misconfigured, causing the problem described in the article. As a result, the managed application 10 registers the two warning messages in the Exchange™ application log. These new log entries and picked up by a monitor 14 (FIG. 1) and sent to the meta-application 20 server 60 (FIG. 3) as telemetry. The telemetry data becomes stored in the telemetry database 26, and the feature detector 36 interprets the two error log entries as features. So two new "event" features are generated with the correct "event IDs" and other appropriate error information.

Problem Logic then receives these two new "event" features and, for each, uses a discrimination network to identify and select all the rules within the knowledge base 22 that contain an "event" feature predicate with the matching "event ID." One of the identified rules is the rule for the illustrated article. The identified Problem Logic rule(s) that contain these feature predicates react to the fact that these new features have arrived. The Problem Logic beads are advanced and appropriate variables are bound. Now, the other predicates in the identified Problem Logic rules are activated, which means that the two "denied permissions" feature predicates in the rule for the illustrated article are activated.

In this case, the permissions on the public folder are verified as being incorrect, as described in the article. Thus, two new features (corresponding to the "denied permissions predicates) are generated and the discrimination network identifies problem logic rules to update. Once again, the problem logic beads are advanced and more variables are bound. Now, in the rule for the illustrated article, the final and more expensive feature predicate is activated. This predicate causes the meta-application 20 to perform a "unit test" to verify that email messages cannot be successfully sent to public folders (i.e., the meta-application tries to send a message).

After some time, the final feature predicate triggers. This causes another feature to be generated and passed to Problem Logic. Then the discrimination network identifies Problem Logic rules to update. At this point, the rule for the illustrated article has been matched because all five feature predicates have become "true." Thus, Problem Logic generates a corresponding problem.

If this problem appears alone, it is sent directly to the remedy selector 40. The remedy selector 40 may need to "lock" aspects of the deployment 10 to prevent them from interfering with the resolution of this problem. The remedy selector 40 selects an abstract remedy associated with this problem, and then the planning module 42 instantiates and creates a deployment-specific plan designed to resolve this problem (the remedies and plans are stored as metadata associated with the rule). If this problem appears together with other problems or this problem does not have an associated remedy, the meta-application 20 may activate the root cause analysis module 41 to determine which problems are caused by the same underlying root causes.

The knowledge base article shown in FIGS. 22A-B specifies a resolution involving changing certain Active Directory (AD) settings for the "Everyone" user account. To do this, a plan takes one argument whose value was set during Problem Logic evaluation. In this case, the argument is the object of the application model 24 that represents the server that cannot send messages to the public folder server. The logic rules contains metadata necessary to render and execute the plan, such as information used to organize the order of the plans, the arguments required to correctly execute each plan, query elements for obtaining necessary information from the application model 24, and/or the actual plan steps.

After a remedy is selected, the planning module 42 constructs a plan including three strings: the name of the AD organization, the name of the AD administrative group, and the name of the AD node that contains the AD objects that need to be fixed. Next, a simple informational model is created for the sub-plans. Finally, the two sub-plans are called to actually change the user permissions on the problematic objects.

The GUI 29 renders the plan for presentation to a human administrator, and the administrator can execute the plan. Alternatively, the execution engine 44 can automatically execute the plan on the administrator's behalf. While the plan is executed, the analysis subsystem 30 keeps active the feature predicates of the logic rule used to match this problem, in order to be able to determine when/if the problem gets cured. When all of the features that caused this problem become inactive (no longer are triggered), the problem expires and is considered resolved. If the features remain triggered, this plan is optionally "reversed" and the next possible solution plan is executed. If all possible plans are exhausted, then this fact is reported to the system administrator and he/she notifies the meta-application 20 if/when the problem is ever corrected.

As discussed above, if a problem appears together with other problems or a problem does not have an associated remedy, the root cause analysis (RCA) module 41 may be activated to determine which of the problems are caused by the same underlying root causes. The meta-application 20 can then recommend that the problems be addressed in order of causality, and/or can dynamically create a plan to heal the root cause. In this example, mail messages bound for public folders cannot be sent, which causes the outbound message queues to grow steadily as more and more messages bound for a public folder accumulate. This can impact performance and trigger other types of problems that are actually caused by the problem described in the illustrated knowledge base article.

Suppose that the above-described clustering pattern recognition approach is used for root cause analysis. In this example, the RCA module 41 groups several other problems together with the problem described in the illustrated knowledge base article. For example, other problems that might potentially appear include those related to excessive storage media use related to growing queues, and/or related to excessive CPU usage as attempts are constantly being made to empty the queues unsuccessfully. The RCA module 41 creates a multidimensional space in which the problems are plotted, in which the dimensions of the space represent aspects such as independent functional flows, connectivity, frequency of connectivity access, uniqueness of identity, time passage, dependence, statistical confidence, and the like. The above-described clustering analysis (e.g., k-means clustering) is then performed.

In this case, the axes in the generated multidimensional space include an axis marked with redundant Exchange™ servers, an axis capturing the various components of the Exchange™ application (including the outbound message queue), and an axis representing the physical components of the computer (such as disk and CPU). The RCA module 41 finds that the root problem addressed in this flow and its derivatively caused problems have coordinates close to one another along these axes and identical coordinates along other axes in the space irrelevant to them. These problems are clustered together for further analysis. By analyzing the common attributes of the clustered problems (e.g., common application model components, temporal closeness or earliness, closeness or earliness in functional or data flows, and/or physical/containment closeness), the RCA module identifies two possibilities for the root-cause candidate: the root public folder object (the object with incorrect permissions causing this problem), or the outbound message queues on some of the Exchange™ servers.

The RCA module 41 first considers an outbound message queue object as the root-cause candidate, and tests the objects upon which the outbound message queue object depends. These objects are the network interface of the server and the inbound message queue object of the public folder server. The meta-application 20 conducts unit tests for the outbound message queue and the inbound message queue. Suppose both unit tests fail. The RCA module 41 then considers the inbound message queue object as the root-cause candidate and tests the objects upon which the inbound message queue depends. One of these objects is the public folder object. Suppose the public folder's unit test fails. The RCA module 41 now considers the public folder object as the root-cause candidate. Finally, the RCA module 41 tests the objects upon which the public folder object depends. In this example, suppose all of the unit tests for these objects pass. The RCA module 41 then identifies the public folder object as the component at the root cause of the identified problems. At this point, the meta-application 20 reports the groupings of problems, associated root-cause candidate objects, and unit test results to the administrator, so that the administrator can take an appropriate action.

Although a meta-application has been disclosed in the context of certain embodiments and examples, it will be understood by those skilled in the art that the invention extends beyond the specifically disclosed embodiments to other alternative embodiments and/or uses and obvious modifications and equivalents thereof. Further, as will be recognized from the foregoing, the disclosed meta-application embodies a multitude of distinct inventions, many of which can be practiced separately and independently of others. Accordingly, the invention is not intended to be limited by the specific disclosures of preferred embodiments herein.

What is claimed is:

1. A system for monitoring and analyzing a deployment of a software application, comprising:

a monitor for gathering time-variant state metric data from the deployment, the monitor associated with a computer system that runs components of the software application, the monitor configured to gather state metric data for at least one deployment state metric from the computer system; and a non-transitory computer-readable medium that stores a numerical chart feature detector that, when executed by a processor, analyzes a numerical telemetry signal that comprises state metric data gathered by the monitor, said numerical chart feature detector configured to use a threshold and a prescribed sustain period to detect the presence of a feature based on the numerical telemetry signal, the feature representing a condition or behavior of the software application that is known to be associated with a potential problem of the deployment of the software application;

wherein the threshold comprises a zero-confidence level representing substantially zero confidence in the existence of a feature, a trigger-confidence level representing a prescribed intermediate confidence in the existence of a feature, and a full-confidence level representing a substantially maximum confidence in the existence of a feature;

wherein the numerical chart feature detector is configured to detect a feature when the telemetry signal exceeds the trigger-confidence level and remains in excess of the zero-confidence level subsequently throughout the prescribed sustain period immediately after exceeding the trigger-confidence level;

wherein an occurrence of the feature is represented by at least a name, confidence value, and time of occurrence.

2. The system of claim 1, wherein the numerical chart feature detector is capable of detecting multiple features after the telemetry signal exceeds the trigger-confidence level and before the telemetry signal falls below the zero-confidence level, each feature having a respective confidence value.

3. The system of claim 1, wherein the sustain period is a prescribed sustain time representing a minimum time required to sustain a positive confidence deviation before the feature is detected.

4. The system of claim 1, wherein the sustain period is a prescribed number of sustain samples comprising the minimum number of points required to sustain a positive confidence deviation before the feature is detected.

5. The system of claim 1, wherein the system is configured to compute at least the zero-confidence level and trigger-confidence level statistically from moving statistics determined from signal history.

6. The system of claim 5, wherein the system is configured to use an exponentially weighted moving average to obtain moving mean and standard deviation statistics for computing at least the zero-confidence level and trigger-confidence level.

7. The system of claim 1, wherein the zero-confidence level, trigger-confidence level, and full-confidence level are absolutely prescribed.

8. The system of claim 1, wherein the numerical chart feature detector uses both a low threshold and a high threshold, each of which includes a respective zero-confidence level, trigger-confidence level, and full-confidence level.

9. The system of claim 1, wherein the system is configured to use a smoothing average window to preprocess the numerical telemetry signal prior to analysis of the numerical telemetry signal by the numerical chart feature detector.

10. The system of claim 1, wherein the numerical chart feature detector is a control chart feature detector.

11. The system of claim 1, wherein the numerical chart feature detector is a trend chart feature detector that passes the derivative of a smoothed input signal into a control chart feature detector.

12. The system of claim 11, wherein the numerical chart feature detector detects a rising or descending trend in the behavior of the numerical telemetry signal.

13. The system of claim 1, wherein the numerical chart feature detector comprises a seasonal control chart feature detector that uses moving statistics that are based at least partly on a periodic distance function and kernel smoothing.

14. The system of claim 13, wherein the telemetry signal fluctuates approximately cyclically and the seasonal control chart feature detector computes a cyclically varying normalcy band of the telemetry signal.

15. The system of claim 1, wherein the system increases and decreases monitoring of time-variant state metrics based at least in part on whether the feature is detected by the numerical chart feature detector.

16. The system of claim 1, wherein the system comprises analysis subsystem monitors that are configured to use post-processors to apply filtering, aggregation, and/or transformation to the collected state metric data to generate a telemetry signal to the numerical chart feature detector.

17. The system of claim 1, further comprising a problem detector that diagnoses problems with the deployment, at least in part, by programmatically using features of the deployment detected by the numerical chart feature detector.

18. The system of claim 1, further comprising an automation subsystem that automatically selects remedies and executes the remedies to resolve problems with the deployment, at least in part by programmatically using features of the deployment detected by the numerical chart feature detector.

19. The system of claim 1, further comprising a graphical user interface that displays data regarding features detected by the numerical chart feature detector.

20. A method of monitoring and analyzing a deployment of a software application, comprising:

receiving a numerical telemetry signal that comprises time-variant state metric data collected by a monitor that runs on a computer of said deployment; and analyzing the numerical telemetry signal to determine whether a feature exists, the feature representing a condition or behavior of the software application that is known to be associated with a potential problem of the deployment;

wherein analyzing the numerical telemetry signal comprises detecting the feature when the numerical telemetry signal exceeds a trigger-confidence level and then remains in excess of a zero-confidence level throughout a prescribed sustain period, said zero-confidence level corresponding to a substantially zero confidence in the existence of the feature, said trigger-confidence level corresponding to an intermediate confidence that is between the zero-confidence level and a full-confidence level;

said method performed by a computer system.

21. The method of claim 20, wherein detecting the feature comprises outputting a name, confidence value, and time of occurrence.

22. The method of claim 20, wherein the method comprises detecting multiple features after the numerical telemetry signal exceeds the trigger-confidence level and before the telemetry signal thereafter falls below the zero-confidence level, each feature having a respective confidence value.

23. The method of claim 20, wherein the sustain period is specified in terms of time.

24. The method of claim 20, wherein the sustain period is specified in terms of a number of telemetry signal samples.

25. The method of claim 20, further comprising computing at least the zero-confidence level and trigger-confidence level statistically from moving statistics determined from signal history.

26. The method of claim 20, further comprising using a smoothing average window to preprocess the numerical telemetry signal prior to using said confidence levels to determine whether the feature exists.

27. The method of claim 20, wherein analyzing the numerical telemetry signal further comprises accounting for seasonality by using moving statistics that are based at least partly on a periodic distance function.

28. The method of claim 20, wherein the telemetry signal fluctuates approximately cyclically, and the method comprises computing a cyclically varying normalcy band of the telemetry signal, and using the cyclically varying normalcy band to assess whether the feature exists.

29. The method of claim 20, further comprising causing the collection of telemetry data associated with a monitored state metric to be increased or decreased based on whether the feature is detected.

30. The method of claim 20, further comprising, by said computer system, using features generated from said analysis of the numerical telemetry signal, in combination with other detected features, to determine whether a problem exists in the deployment.

31. The method of claim 30, further comprising automatically selecting and executing a remedy associated with the problem.

32. The method of claim 30, wherein the zero-confidence level and trigger-confidence level vary with time.

33. The method of claim 20, further comprising, by said computer system, using at least features generated from said analysis of the numerical telemetry signal to predict a future problem in the deployment.

34. A non-transitory computer-readable medium that comprises executable code that, when executed by a computer system, causes the computer system to analyze a deployment of a software application by a process that comprises:

receiving a numerical telemetry signal that comprises time-variant state metric data collected by a monitor that runs on a computer of said deployment; and analyzing the numerical telemetry signal to assess whether a feature exists, the feature representing a condition or behavior of the software application that is associated with a potential deployment problem;

wherein analyzing the numerical telemetry signal comprises detecting the feature when the numerical telemetry signal exceeds a trigger-confidence level and then remains in excess of a zero-confidence level throughout a prescribed sustain period, said zero-confidence level corresponding to a substantially zero confidence in the existence of the feature, said trigger-confidence level corresponding to an intermediate confidence that is between the zero-confidence level and a full-confidence level.

35. The computer-readable medium of claim 34, wherein the executable code directs the computer system to record a feature in association with a name, a confidence value, and a time of occurrence.

36. The computer-readable medium of claim 34, wherein the executable code is capable of causing the computer system to detect multiple features after the numerical telemetry signal exceeds the trigger-confidence level and before the telemetry signal thereafter falls below the zero-confidence level, each feature having a respective confidence value.

37. The computer-readable medium of claim 34, wherein the sustain period is specified in terms of time.

38. The computer-readable medium of claim 34, wherein the sustain period is specified in terms of a number of telemetry signal samples.

39. The computer-readable medium of claim 34, wherein the executable code directs the computer system to compute at least the zero-confidence level and trigger-confidence level statistically from moving statistics determined from a signal history.

40. The computer-readable medium of claim 34, wherein the executable code directs the computer system to use a smoothing average window to preprocess the numerical telemetry signal prior to using confidence levels to assess whether the feature exists.

41. The computer-readable medium of claim 34, wherein the telemetry signal fluctuates approximately cyclically, and the process comprises computing a cyclically varying normalcy band based on the telemetry signal and using the cyclically varying normalcy band to assess whether the feature exists.

42. The computer-readable medium of claim 34, wherein the executable code directs the computer system to cause the collection of telemetry data associated with a monitored state metric to be increased or decreased based at least partly on whether the feature is detected.

43. The computer-readable medium of claim 34, wherein the executable code directs the computer system to use features detected by said analysis of the numerical telemetry signal, in combination with other detected features, to assess whether a problem exists in the deployment.

44. The computer-readable medium of claim 34, wherein the executable code directs the computer system to use features detected by said analysis of the numerical telemetry signal to predict a future problem in the deployment.

45. The computer-readable medium of claim 34, wherein the zero-confidence level and trigger-confidence level vary with time.

46. The computer-readable medium of claim 34, in combination with a computer system that is programmed, via said executable code, to perform said process.

* * * * *

UNITED STATES PATENT AND TRADEMARK OFFICE

CERTIFICATE OF CORRECTION

PATENT NO. : 7,954,090 B1
APPLICATION NO. : 11/316396
DATED : May 31, 2011
INVENTOR(S) : Qureshi et al.

It is certified that error appears in the above-identified patent and that said Letters Patent is hereby corrected as shown below:

On Title Page 2, column 2, line 36, item (56): under "Other Publications" please replace "Papavassillou," with -- Papavassiliou, --

In column 20, line 32, please replace "though" with -- thought --

In column 23, line 57, please replace "24." with -- 24 --

In column 29, line 18, please replace "Tc" with -- $T_c$ --

In column 34, line 16, please replace "y," with -- $y_i$ --

In column 34, line 65, please replace "Machine CPU" with -- Machine.CPU --

In column 44, line 6, please replace "server 1" with -- server1 --

In column 49, line 4, please replace "indicateds" with -- indicates --

In column 64, line 5, please replace "A( )" with -- A ( ); --

Signed and Sealed this
Thirteenth Day of December, 2011

David J. Kappos
*Director of the United States Patent and Trademark Office*